(12) United States Patent
Tucker et al.

(10) Patent No.: US 11,807,422 B2
(45) Date of Patent: Nov. 7, 2023

(54) THERMOPLASTIC BAG WITH REINFORCED TOP

(71) Applicant: THE GLAD PRODUCTS COMPANY, Oakland, CA (US)

(72) Inventors: Edward B. Tucker, Willowbrook, IL (US); Mark D. Pszczolkowski, Pleasanton, CA (US); Abhishek Dutta, Willowbrook, IL (US); Sarah J. Steenblock, Cincinnati, OH (US); Matthew W. Waldron, West Chester, OH (US); Shaun T. Broering, Cincinnati, OH (US); Deborah K. Fix, Maineville, OH (US); David A. Bailey, Cincinnati, OH (US); Jason R. Maxwell, Willowbrook, IL (US); Michael G. Borchardt, Willowbrook, IL (US); Nancy M. Mack-Roble, Willowbrook, IL (US); Rebecca S. Reuhs, Willowbrook, IL (US); Robert T. Dorsey, Willowbrook, IL (US); Kyle T. Diehl, Cincinnati, OH (US)

(73) Assignee: The Glad Products Company, Oakland, CA (US)

( * ) Notice: Subject to any disclaimer, the term of this patent is extended or adjusted under 35 U.S.C. 154(b) by 140 days.

(21) Appl. No.: 17/226,508

(22) Filed: Apr. 9, 2021

(65) Prior Publication Data
US 2022/0324616 A1    Oct. 13, 2022

(51) Int. Cl.
*B65D 33/02*    (2006.01)
*B65D 33/28*    (2006.01)
(Continued)

(52) U.S. Cl.
CPC .............. *B65D 33/02* (2013.01); *B32B 5/022* (2013.01); *B32B 27/12* (2013.01); *B65D 33/28* (2013.01); *B32B 2439/06* (2013.01)

(58) Field of Classification Search
CPC .......... B65D 33/02; B65D 33/28; B32B 5/022
See application file for complete search history.

(56) References Cited

U.S. PATENT DOCUMENTS

| 3,797,733 | A | * | 3/1974 | Ibing | ..................... B65D 33/02 383/119 |
| 4,592,938 | A | | 6/1986 | Benoit | |

(Continued)

FOREIGN PATENT DOCUMENTS

WO    WO 2020/139547 A1    7/2020

OTHER PUBLICATIONS

International Search Report & Written Opinion as received in PCT/US22/71524 dated Jun. 23, 2022.

*Primary Examiner* — Derek J Battisti
(74) *Attorney, Agent, or Firm* — Keller Preece PLLC

(57) ABSTRACT

The present disclosure relates to a reinforced thermoplastic bag (e.g., comprising a bag-in-bag). In one or more embodiments, the reinforced thermoplastic bag includes a reinforced portion at a top-of-bag area where users often apply an external force to lift or carry the reinforced thermoplastic bag. In these or other embodiments, a grab-zone reinforcement insert is positioned across one or both of a hem channel region and a grab-zone along an outer surface, an inner surface, or between layers of the reinforced thermoplastic bag. In one or more embodiments, the grab-zone reinforcement insert comprises multiple layers (e.g., of a non-woven material). For example, the grab-zone reinforcement insert includes a first and second layer formed by a fold. In other implementations, the grab-zone reinforcement insert includes separate, discrete layers. In one or more embodi- (Continued)

ments, at least a portion of the grab-zone reinforcement insert is positionally affixed via a hem seal.

20 Claims, 39 Drawing Sheets

(51) Int. Cl.
  *B32B 27/12* (2006.01)
  *B32B 5/02* (2006.01)

(56) References Cited

U.S. PATENT DOCUMENTS

| | | | |
|---|---|---|---|
| 2007/0104905 A1 | 5/2007 | Floyd, Jr. et al. | |
| 2011/0081103 A1 | 4/2011 | Hall | |
| 2013/0188891 A1* | 7/2013 | Maxwell | B65F 1/002 |
| | | | 383/114 |
| 2016/0083146 A1* | 3/2016 | Han | B65D 33/08 |
| | | | 53/413 |
| 2018/0319545 A1* | 11/2018 | Reeves | B65D 33/02 |
| 2019/0322422 A1* | 10/2019 | Lee | B31B 70/826 |
| 2022/0089329 A1* | 3/2022 | Forsblom | B65D 33/20 |

* cited by examiner

THERMOPLASTIC BAG WITH REINFORCED TOP

BACKGROUND

Among their many applications, thermoplastic bags are used as liners in trash or refuse receptacles. Such liners can be found at many locations from small household kitchen garbage cans to larger, multi-gallon drums located in public places and restaurants. Bags that are intended to be used as liners for such refuse containers are typically made from low-cost, pliable thermoplastic material. When the receptacle is full, the thermoplastic liner holding the trash can be removed for disposal and replaced with a new liner.

Increasing manufacturing costs for thermoplastic liners have led to a trending effort to decrease material usage (e.g., by making thinner webs). As a result, some conventional thermoplastic liners are prone to tearing, ruptures, and other issues at the top of the bag. For example, when grabbing conventional thermoplastic liners by a drawstring to pull the thermoplastic liner up and out of a trash receptacle, the weight of the trash combined with the upwards pulling force from the drawstring can cause a conventional thermoplastic liner to tear the hem channel. Similarly, for instance, when grasping a conventional thermoplastic liner by a top portion, a grasping hand (e.g., fingers) can puncture or overly stretch (leading to subsequent failure of) the thermoplastic liner. In turn, such compromising of the top of the bag can lead to trash spillage, require an adjusted/awkward carrying position or method, etc.

For some conventional thermoplastic liners, the decrease in material can also trigger undesirable visual cues (e.g., that less material is used and therefore the thermoplastic liner must be weak or cheaply made). Regardless of actual material properties, these conventional thermoplastic liners can visually convey material properties indicative of low durability and strength.

BRIEF SUMMARY

Aspects of the present disclosure relate to a reinforced thermoplastic bag with improved top-of-bag strength performance. In particular, one or more implementations of the reinforced thermoplastic bag include a reinforcing strip of thermoplastic, non-woven, and/or other material applied to a grab-zone where users grasp when lifting or carrying the reinforced thermoplastic bag. In some cases, the reinforcing strip is folded one or more times. For example, the reinforcing strip can be folded back onto itself (e.g., as part of a hem-folding operation to provide reinforcement to a hem channel region of the reinforced thermoplastic bag). Further, the reinforcing strip can extend from the hem channel region, past a hem seal, and across a grab-zone of the reinforced thermoplastic bag. In this region of the grab-zone below the hem seal, the reinforcing strip is folded in one or more implementations to create multiple layers providing extra thickness at certain portions of the grab-zone. In other embodiments, one or more layers (e.g., separate, discrete layers) of the reinforcing strip are not folded. In these or other embodiments, the reinforcing strip is implemented with single-ply or multi-ply thermoplastic bags. In certain implementations, an extended hem skirt can also reinforce the grab-zone.

In addition to the foregoing, a method for forming a reinforced thermoplastic bag may include non-continuously laminating portions and/or layers of the reinforced thermoplastic bag together. In one or more implementations, the reinforcing strip is non-continuously laminated to portions of the grab-zone of the reinforced thermoplastic bag. Examples of non-continuously lamination include adhesive bonding, ultrasonic bonding, thermal bonding, embossing, ring rolling, SELFing, applying a combination of pressure and tackifying agents embedded in one or more films, and combinations thereof. Further, the method can include joining respective side edges of first and second sidewalls to form a bag configuration. The method can additionally include forming a bottom fold or a closed bottom edge to join the first and second sidewalls at a bottom portion of the reinforced thermoplastic bag.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1A:
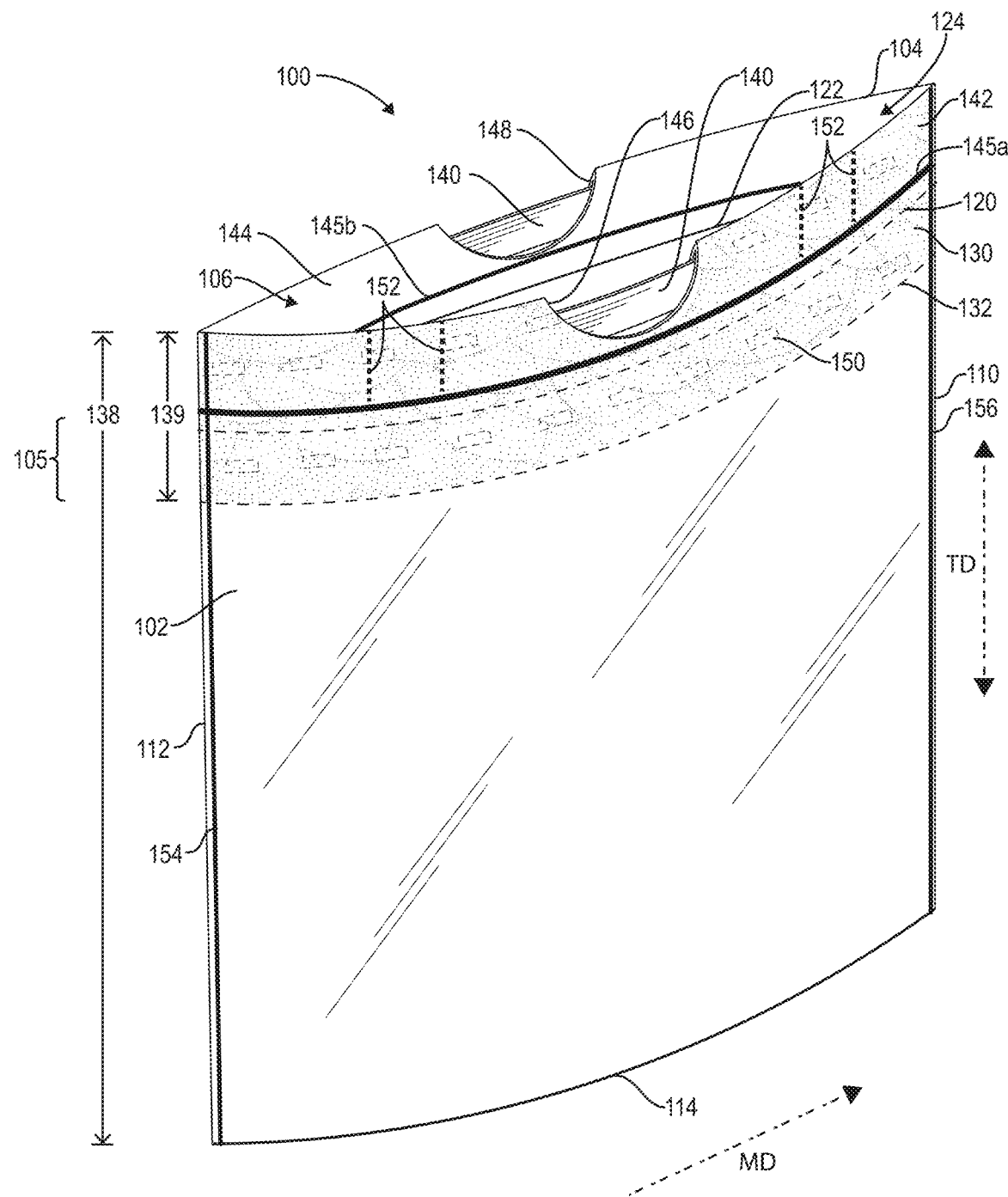
FIGS. 1A-1B illustrate respective reinforced thermoplastic bags in accordance with one or more embodiments.

This disclosure describes one or more embodiments of a reinforced thermoplastic bag with increased strength. In particular, the reinforced thermoplastic bag can include a grab-zone reinforcement structure positioned across a grab-zone of the trash bag. For example, in one or more embodiments, the grab-zone reinforcement structure includes at least a 1-layer reinforcement strip that reinforces a hem forming a hem channel in the reinforced thermoplastic bag. Thus, when cinching a draw tape (or carrying the trash bag by the draw tape) disposed within the hem channel, the grab-zone reinforcement structure reduces/prevents tearing of the hem (e.g., along hem holes for accessing the draw tape). Additionally or alternatively, a single or multi-layered grab-zone reinforcement structure is positioned across a portion of the grab-zone below a hem seal (e.g., to prevent grasping fingers from damaging the reinforced thermoplastic bag). In these or other embodiments, various configurations for applying the grab-zone reinforcement structure are herein contemplated. For example, in one or more implementations, at least a portion of the grab-zone reinforcement structure is positioned across an inside surface and/or across an outside surface of the reinforced thermoplastic bag. Additionally or alternatively, at least a portion of the grab-zone reinforcement structure is positioned between layers of the reinforced thermoplastic bag.

To illustrate, the reinforced thermoplastic bag in one or more embodiments utilizes a non-woven strip for the grab-zone reinforcement structure. Utilizing a non-woven strip for the grab-zone reinforcement structure has several advantages. For example, because the non-woven strip is a separate piece of material (e.g., that can be added during a hem-folding operation), no retrofitting of manufacturing assemblies is required. In addition, the non-woven strip imparts material properties (e.g., targeted material properties such as puncture toughness or tensile strength) that differ from other portions of the reinforced thermoplastic bag. Further, the non-woven strip with added color and distinct fibers provides a highly visual element on or between layers (e.g., transparent layers) in the grab-zone to provide a connotation of strength and durability.

In one or more embodiments, the grab-zone reinforcement structure comprises a single layer of reinforcing material across a grab-zone of the reinforced thermoplastic bag. The single layer of reinforcing material can be advantageous because a single reinforcing layer reduces additional manufacturing operations and additional material consumption while nonetheless providing positionally-targeted strength and durability. For instance, the single layer of reinforcing material may span from a hem seal (where secured) down towards a bottom fold (e.g., for at least 2-3 inches). In other embodiments, the single layer of reinforcing material is even more manufacturing friendly by being secured to the reinforced thermoplastic bag independent of a hem seal and extending from proximate the hem seal down towards the bottom fold for a predetermined distance.

In one or more embodiments, the grab-zone reinforcement structure is folded. By folding the grab-zone reinforcement structure, additional layer(s) are added to further improve strength and durability relative to a single layer of reinforcement. Further, in one or more implementations, the grab-zone reinforcement structure comprises a partial fold where an end portion of the grab-zone reinforcement structure is not secured at the hem seal. In contrast, one or more embodiments of the grab-zone reinforcement structure utilize a full fold where the end portion of the grab-zone reinforcement structure proceeds from the fold until secured at the hem seal. By utilizing either a partial fold or a full fold, the grab-zone reinforcement structure can selectively reduce material consumption and operational requirements, thereby imparting increased manufacturing friendliness.

Similar to a non-woven strip, in additional or alternative embodiments, the grab-zone reinforcement structure comprises stretch wrap or shrink wrap (e.g., for likewise applying a dissimilar material with targeted material properties and/or aesthetically denoting improved strength). For example, securing stretch wrap or shrink wrap to the reinforced thermoplastic bag in the grab-zone can make this portion of the reinforced thermoplastic bag more difficult to overly stretch or puncture with grasping fingers. In addition, the stretch wrap or shrink wrap can be applied at or near final stages of manufacturing (e.g., via thermal/ultrasonic means of attachment) to circumvent any need for retrofitting existing manufacturing assemblies.

In one or more implementations, the grab-zone reinforcement structure is colored or patterned to visually impart or increase a perception of strength and durability at the grab-zone of the reinforced thermoplastic bag. In these or other embodiments, one or more layers of the reinforced thermoplastic bag are translucent to facilitate visibility of the grab-zone reinforcement structure when positioned between layers or across an inside layer of the reinforced thermoplastic bag. For example, when superimposing a translucent outer layer of reinforced thermoplastic bag over one or more colored portions of the grab-zone reinforcement structure, the reinforced thermoplastic bag can visibly show that the grab-zone is a reinforced area.

Further, in one or more implementations, the reinforced thermoplastic bag utilizes a break-away perforation in the hem and/or a hem-channel reinforcement portion of the grab-zone reinforcement structure. By utilizing a break-away perforation, the reinforced thermoplastic bag can facilitate an intentional point of failure at the break-away perforation when stretching an opening of the reinforced thermoplastic bag. For example, the break-away perforation allows the opening of the reinforced thermoplastic bag to more easily stretch around a trash receptacle and helps to avoid undesired deformation elsewhere at the hem or the grab-zone.

In certain embodiments, the reinforced thermoplastic bag comprises an extended hem skirt. For example, in some embodiments, an outer sidewall layer of the reinforced thermoplastic bag forms an extended hem skirt by extending several inches past a hem skirt composed of the inner sidewall layer. In other embodiments, the inner sidewall layer of the reinforced thermoplastic bag forms the extended hem skirt by extending several inches past a hem skirt composed of the outer sidewall layer. Still, in other embodiments, both the inner and outer sidewall layers can form the extended hem skirt. Similarly, the grab-zone reinforcement structure alone, or in combination with one or more sidewall layers, can form the extended hem skirt. Utilizing an extended hem skirt in these implementations can provide a number of advantages. As an example, flexibly allowing any of the sidewall layers and/or the grab-zone reinforcement structure to form the extended hem skirt can increase manufacturing flexibility to make the reinforced thermoplastic bag utilizing conventional bag making machines. In a similar vein, some implementations utilizing an extended hem skirt can reduce the amount of material needed to reinforce the grab-zone.

As illustrated by the foregoing discussion, the present disclosure utilizes a variety of terms to describe features and benefits of a reinforced thermoplastic bag. Additional detail is now provided regarding the meaning of these terms. For example, as used herein, the term "grab-zone" refers to a portion of a thermoplastic bag that is subjected to an applied load (e.g., stretching or poking from grasping fingers, a lifting force to lift or carry the thermoplastic bag, etc.). In particular, the grab-zone includes a top portion of a thermoplastic bag (e.g., below a hem seal). For example, the grab-zone extends from a first side edge to an opposing second side edge and from the hem seal a first distance toward the bottom fold. In other embodiments without a drawstring or hem seal, the grab-zone extends from a first side edge to an opposing second side edge and from proximate (e.g., immediately adjacent to or within a threshold distance from) the top opening a second distance toward the bottom fold.

As used herein, the terms "lamination," "laminate," and "laminated film," refer to the process and resulting product made by bonding together two or more layers of film or other material. The term laminate is also inclusive of coextruded multilayer films comprising one or more tie layers. The term "bonding," when used in reference to bonding of multiple layers may be used interchangeably with "lamination" of the layers. As a verb, "laminate" means to affix or adhere (by means of, for example, adhesive bonding, pressure bonding (e.g., ring rolling, embossing, SELFing, bond forming due to tackifying agents in one or more of the films), ultrasonic bonding, corona lamination, and the like) two or more separately made film articles to one another so as to form a multi-layer structure. For example, a means of sealing in one or more implementations comprises application of heat and pressure to a sidewall comprising multiple layers plus a reinforcing strip (e.g., a non-woven insert positioned between plies in conversion before hem folding). To illustrate a means of sealing, a system forming the disclosed reinforced thermoplastic bag may perform metal-metal embossing or rubber-metal embossing in one unit or two units close-coupled. In one or both cases, the system may pre-heat one or more films and/or preheat an outside surface of drive rolls. As a noun, "laminate" means a product produced by the affixing or adhering via one or more implementations described above.

In one or more implementations, the lamination or bonding between a bag and a reinforcing feature, such as the grab-zone reinforcement structure of the present disclosure, may be non-continuous (i.e., discontinuous or partially discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film (or alternatively, random bonded areas broken up by random un-bonded areas).

As similarly used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article. Alternatively, partially discontinuous lamination can include two or more layers substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

As also used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces without integrity loss. Similarly, materials and structures that are flexible can conform to the shape of contacting objects without integrity loss. For example, a thermoplastic bag disclosed herein may include web materials which exhibit an "elastic-like" behavior in the direction of applied strain without the use of added traditional elastic. As used herein, the term "elastic-like" describes the behavior of web materials which when subjected to an applied strain, the web materials extend in the direction of the applied strain. When the applied strain is released, the web materials return, to a degree, to their pre-strained condition.

Film Materials

In one or more implementations, the bag and/or the grab-zone reinforcement structure of the present disclosure comprise thermoplastic films. As an initial matter, one or more layers of such films can comprise any flexible or pliable material comprising a thermoplastic material and that can be formed or drawn into a web or film. Each individual film layer may itself include a single layer or multiple layers. Adjuncts may also be included, as desired (e.g., pigments, slip agents, anti-block agents, tackifiers, or combinations thereof). The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof.

In at least one implementation of the present invention, the film can include linear low density polyethylene. The term "linear low density polyethylene" (LLDPE) as used herein is defined to mean a copolymer of ethylene and a minor amount of an alkene containing 4 to 10 carbon atoms. In addition, a LLDPE includes a density from about 0.910 to about 0.926 g/cm$^3$, and a melt index (MI) from about 0.5 to about 10. For example, one or more implementations of the present invention can use an octene co-monomer, solution phase LLDPE (MI=1.1; ρ=0.920). Additionally, other implementations of the present invention can use a gas phase LLDPE, which is a hexene gas phase LLDPE formulated with slip/AB (MI=1.0; ρ=0.920). One will appreciate that the present invention is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present invention.

One will appreciate in light of the disclosure herein that manufacturers may form the individual films or webs to be non-continuously bonded together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, bilayer, or multilayered films. In any case, the resulting film can be discontinuously bonded to another film at a later stage to provide the benefits associated with the present invention.

Alternative to conventional flat extrusion or cast extrusion processes, a manufacturer can form the films using other suitable processes, such as, a blown film process to produce monolayer, bilayer, or multilayered films. Such layers are subsequently discontinuously bonded with another film layer at a later stage. If desired for a given end use, the manufacturer can orient the films by trapped bubble, tenterframe, or other suitable processes. Additionally, the manufacturer can optionally anneal the films.

The extruder used in one or more implementations includes a conventional design using a die to provide the desired gauge. Some useful extruders are described in U.S. Pat. Nos. 4,814,135; 4,857,600; 5,076,988; 5,153,382; each of which are incorporated herein by reference in their entirety. Examples of various extruders that may be used in producing the films of the present invention include a single screw type modified with a blown film die, an air ring, and continuous take off equipment.

In one or more implementations, a manufacturer can use multiple extruders to supply different melt streams, which a feed block can order into different channels of a multichannel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

Figure 1B:
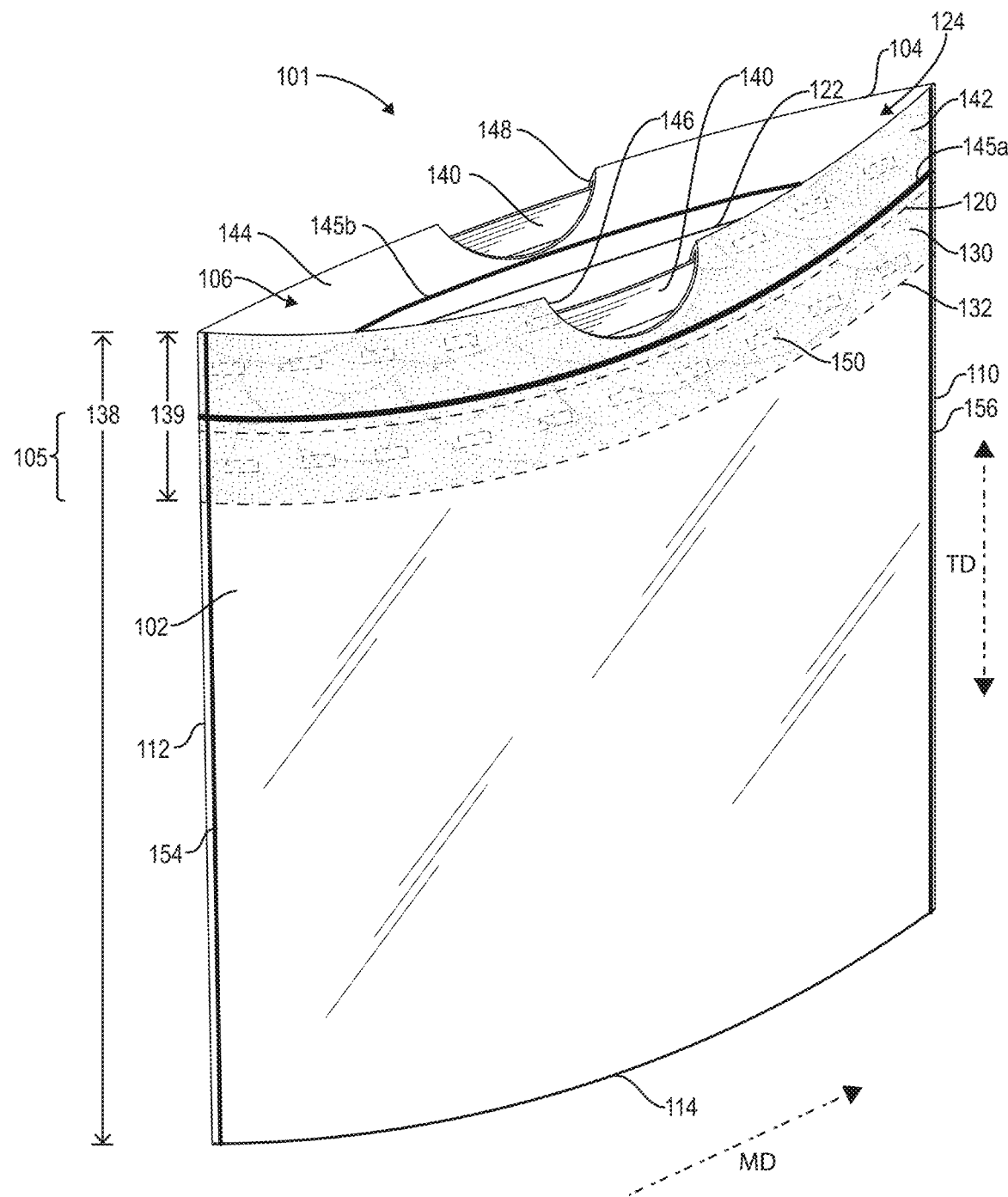

Additional detail will now be provided regarding a reinforced thermoplastic bag in relation to illustrative figures portraying example embodiments and implementations of the reinforced thermoplastic bag. For example, FIGS. 1A-1B illustrate respective reinforced thermoplastic bags 100, 101 in accordance with one or more embodiments. With respect to FIG. 1A, the reinforced thermoplastic bag 100 may be used as a liner for a garbage can or similar refuse container. The reinforced thermoplastic bag 100 can include a first thermoplastic sidewall 102 and an opposing second thermoplastic sidewall 104 opposite the first thermoplastic sidewall 102 to provide an interior volume 106. The first and second thermoplastic sidewalls 102, 104 may be joined along a first side edge 110, an opposing second side edge 112, and a closed bottom edge 114. The closed bottom edge 114 may extend between the first and second side edges 110, 112. In one or more implementations the first and second thermoplastic sidewalls 102, 104 are joined along the first and second side edges 110, 112 and along the closed bottom edge 114 by any suitable process, such as heat sealing. In alternative implementations, the closed bottom edge 114, or one or more of the first and second side edges 110, 112 can comprise a fold.

At least a portion of the respective first and second thermoplastic sidewalls 102, 104 may remain un-joined to define an opening 124 located opposite the closed bottom edge 114. The opening 124 may be used to deposit items into the interior volume 106. Furthermore, the reinforced thermoplastic bag 100 may be placed into a trash receptacle. When placed in a trash receptacle, a top portion of the first and second thermoplastic sidewalls 102, 104 may be folded over the rim of the receptacle.

First and second top edges 120, 122 of the first and second thermoplastic sidewalls 102, 104 may be un-joined or unattached to each other. In particular, the first and second top edges 120, 122 can be folded back into the interior volume 106 and may be attached to the thermoplastic bag 100 via respective hem seals 145a, 145b and/or side seals 154, 156 (e.g., at the first and second side edges 110, 112). For example, one or more implementations can include a draw tape 140 to close or reduce the opening 124. To accommodate the draw tape 140 the first top edge 120 of the first thermoplastic sidewall 102 may be folded back onto the interior surface of the first thermoplastic sidewall 102, thereby forming a first hem channel disposed within a first hem 142. Similarly, the second top edge 122 of the second thermoplastic sidewall 104 may be folded back onto the interior surface of the second thermoplastic sidewall 104, thereby forming a second hem channel disposed within a second hem 144.

As shown by FIG. 1A, in one or more implementations, the draw tape 140 extends loosely through the first and second hem channels of the first and second hems 142, 144. To access the draw tape 140, first and second notches 146, 148 may be disposed through the respective first and second hems 142, 144. Pulling the draw tape 140 through the first and second notches 146, 148 will constrict the first and second hems 142, 144 thereby closing or reducing the opening 124. The draw tape closure may be used with any of the implementations of a reinforced thermoplastic bag described herein.

Figure 3A:
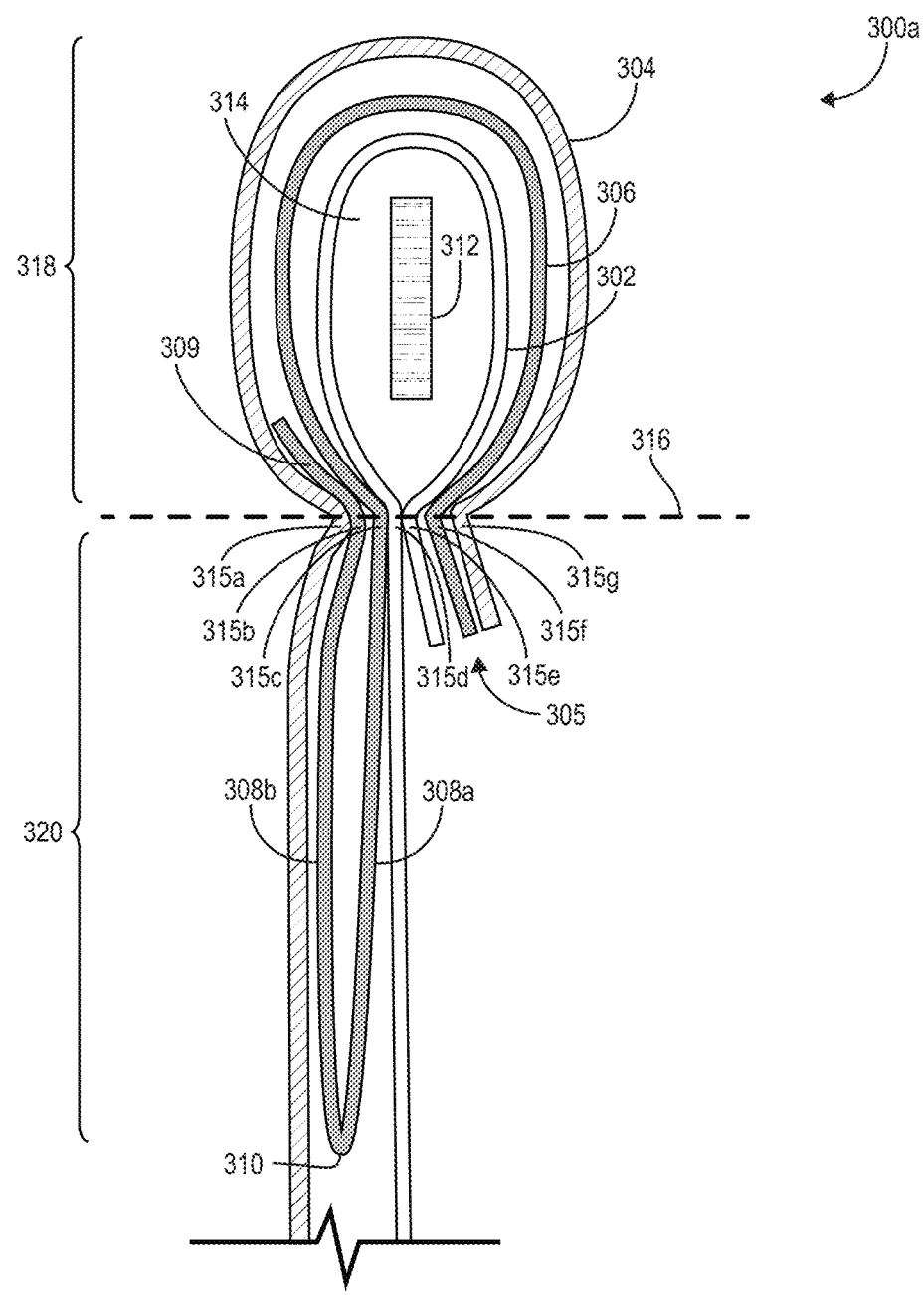
FIGS. 3A-3AA illustrate respective upper cross-sectional views of sidewalls implementing a grab-zone reinforcement structure in accordance with one or more embodiments.
Figure 3B:
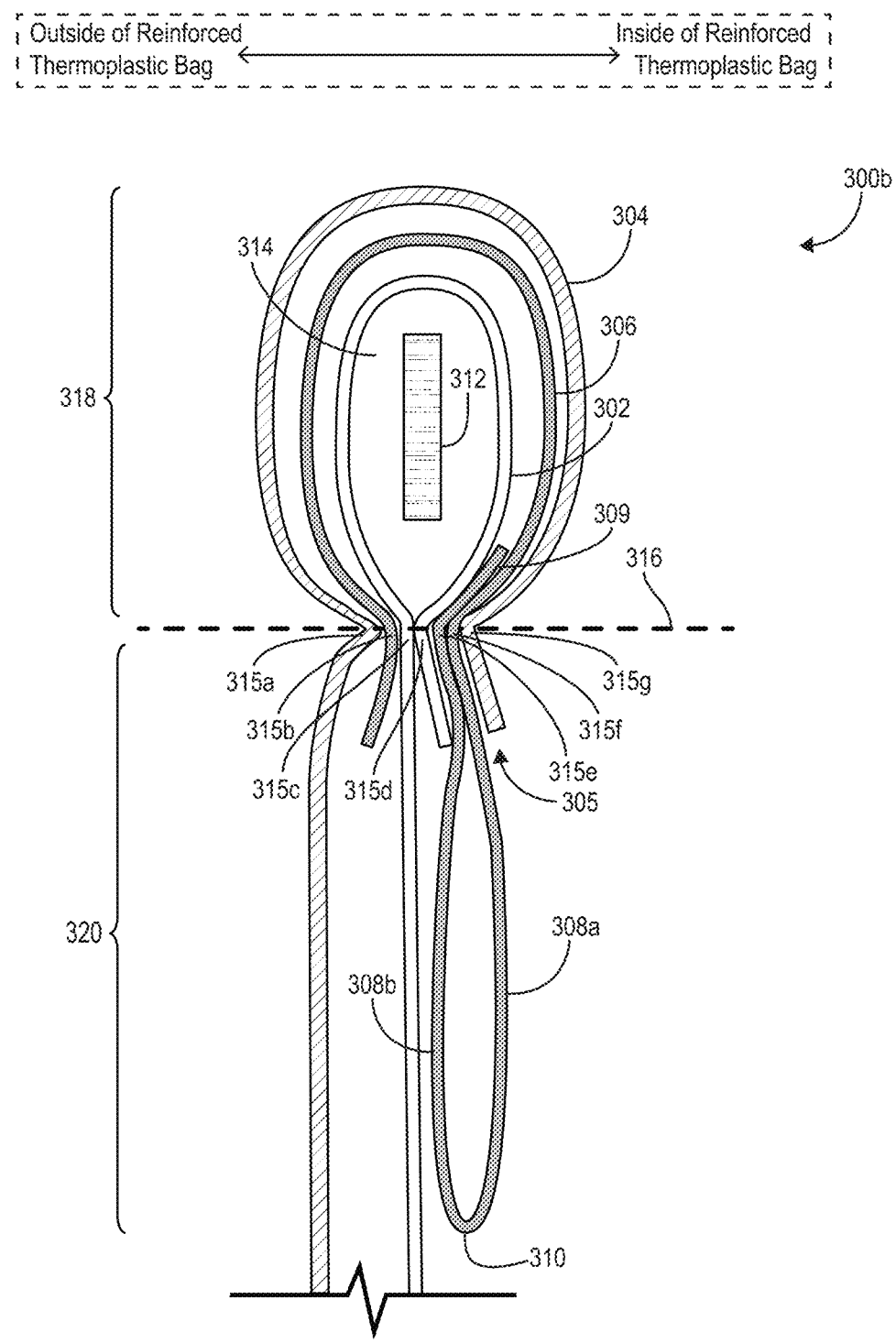
FIG. 3BB illustrates a front view of a reinforced thermoplastic bag with a grab-zone reinforcement structure secured by contact areas in accordance with one or more embodiments.
Figure 3C:
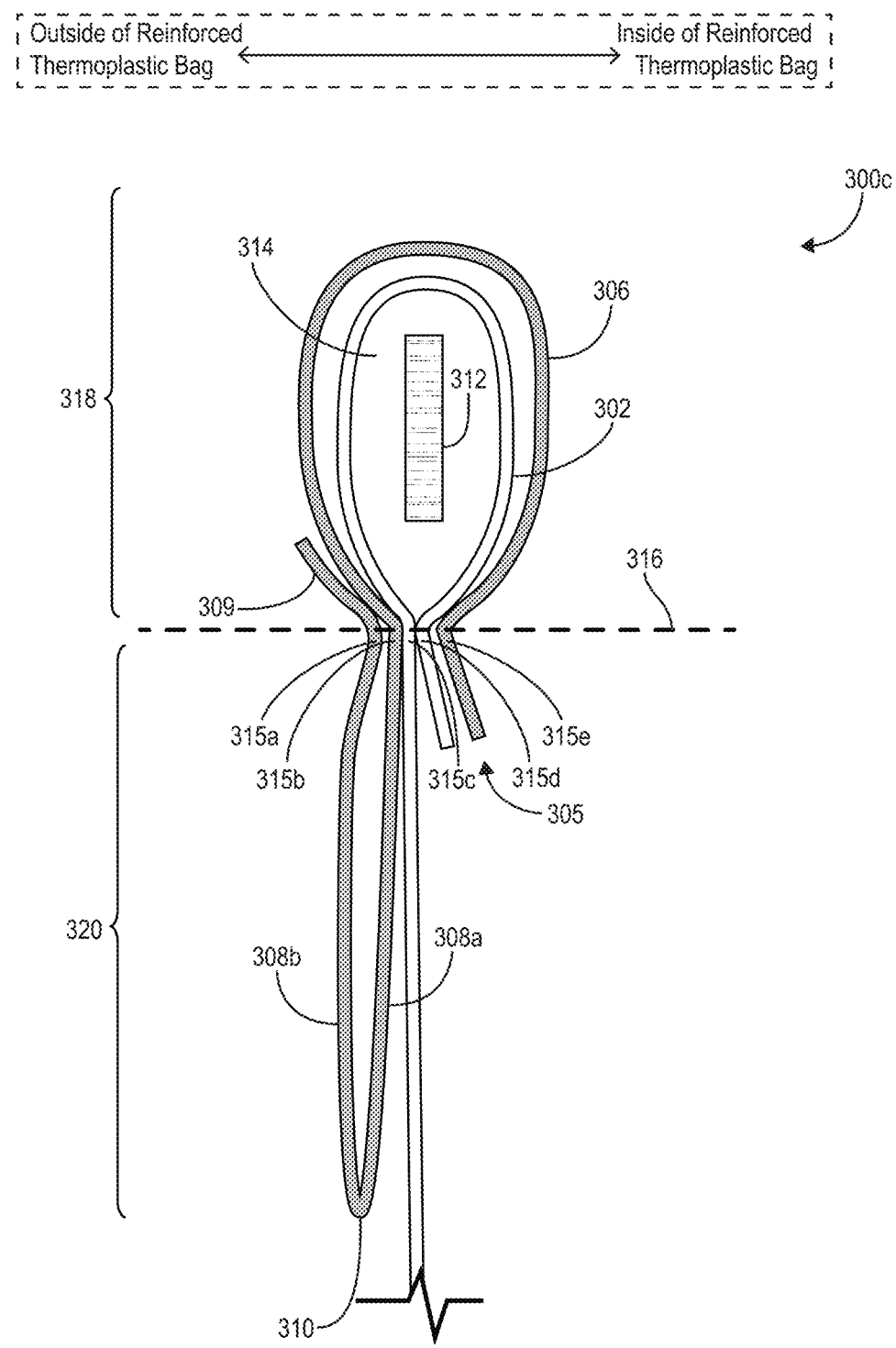
Figure 3D:
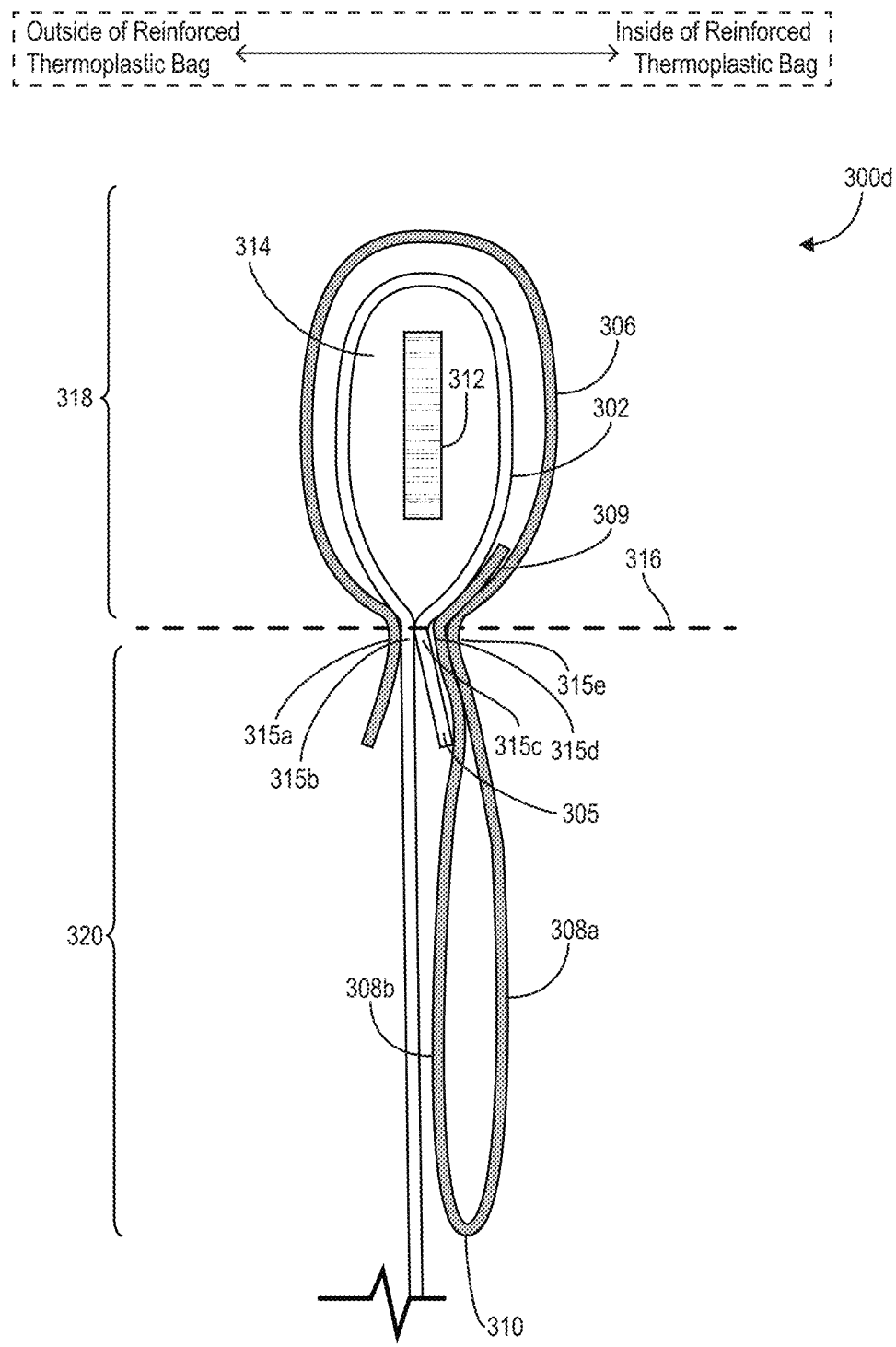
Figure 3E:
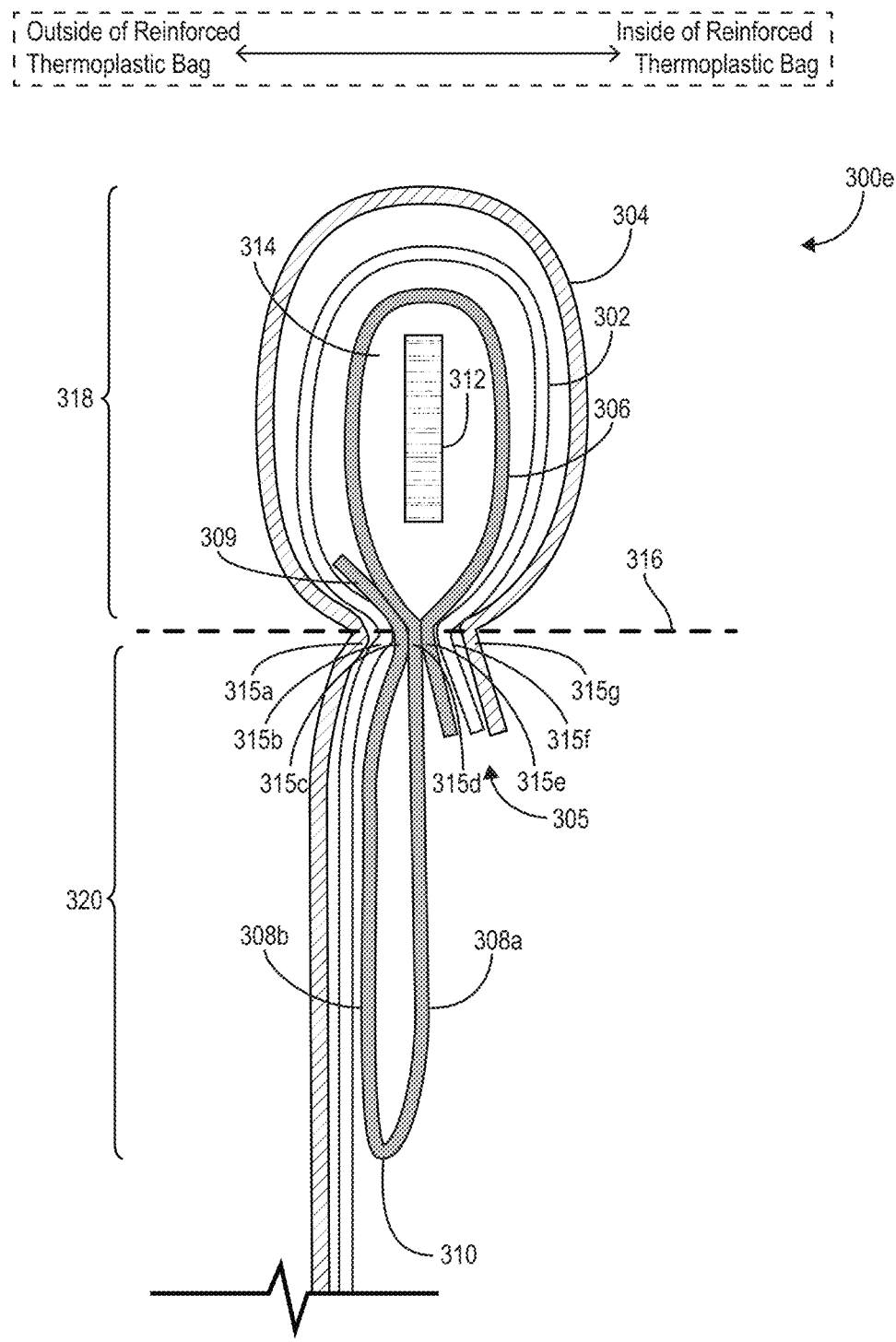
Figure 3F:
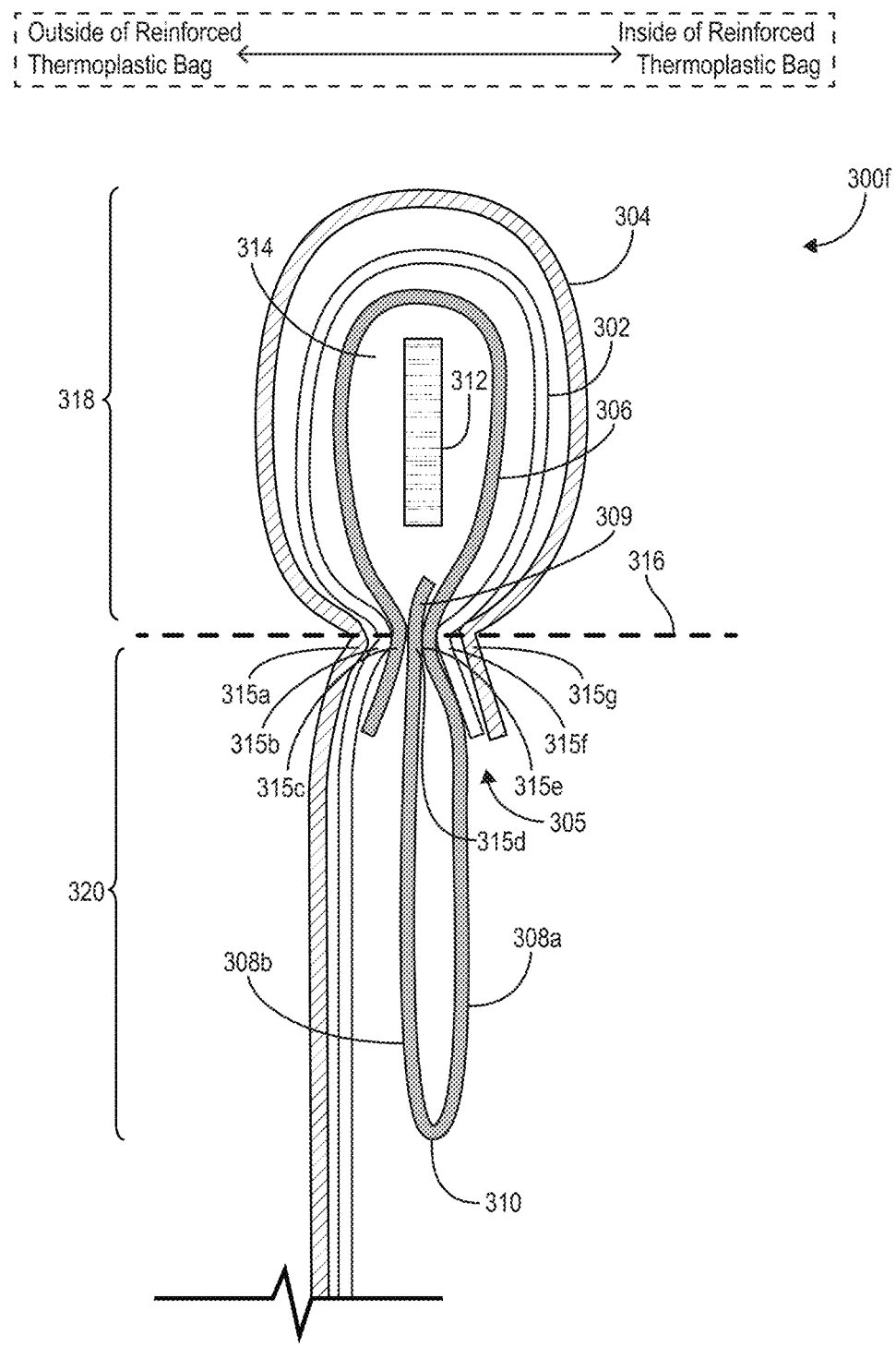

To strengthen the thermoplastic bag 100 (e.g., to reduce ruptures or punctures), the thermoplastic bag 100 may include a thermoplastic reinforcing feature for application to a grab-zone 105 of the reinforced thermoplastic bag 100. In particular, FIG. 1A shows that the thermoplastic bag 100 includes a grab-zone reinforcement structure 130 applied to at least a portion of the grab-zone 105. In these or other embodiments, the grab-zone reinforcement structure 130 can comprise one or more separate, strips/layers of material (e.g., a thermoplastic a film as described above, a nonwoven layer, etc.) that may be attached to the thermoplastic bag 100 within the grab-zone 105. FIGS. 3A-3S illustrate various embodiments of the grab-zone reinforcement structure 130 and modes for attaching the grab-zone reinforcement structure 130 to the reinforced thermoplastic bag 100. However, in one or more embodiments, as shown in FIG. 1A, the grab-zone reinforcement structure 130 is non-continuously bonded (e.g., via a plurality of non-continuous bonds 150) to the first thermoplastic sidewall 102. Additionally or alternatively, the grab-zone reinforcement structure 130 is attached to the first thermoplastic sidewall 102 via the side seals 154, 156 that join the first and second thermoplastic sidewalls 102, 104 along the first and second side edges 110, 112. Although not illustrated in FIG. 1A, another grab-zone reinforcement structure 130 may likewise be attached to the second thermoplastic sidewall 104.

In one or more implementations, the grab-zone 105 for each of the first and second thermoplastic sidewalls span between an adjustable grab-zone boundary 132 and the hem seal 145a. In addition, the grab-zone 105 can span between the first and second side edges 110, 112. Accordingly, in one or more implementations the grab-zone reinforcement structure 130 extends between the side seals 154, 156 and coextensive with the grab-zone 105. In alternative implementations, the grab-zone reinforcement structure 130 does not extend the entire length between the side seals 154, 156 and/or does not span an entirety of the grab-zone 105. In any event, the grab-zone reinforcement structure 130 may provide extra material in the grab-zone 105 of the thermoplastic bag 100 that may be more prone to failure.

To illustrate, the grab-zone reinforcement structure 130 can extend across one or more of the first or second thermoplastic sidewalls 102, 104 a distance 139. As shown in FIG. 1A, the distance 139 for the grab-zone reinforcement structure 130 of the first thermoplastic sidewall 102 spans from proximate the opening 124 to an adjustable grab-zone boundary 132 below the hem seal 145a. In this embodiment, the grab-zone reinforcement structure 130 comprises a hem-channel reinforcement portion that extends from the hem seal 145a, folds proximate the opening 124, and extends back to the hem seal 145a (e.g., as shown in FIGS. 3A-3P and FIGS. 3X-3Y). In addition, the grab-zone reinforcement structure 130 in this embodiment spans from the hem seal 145a to the adjustable grab-zone boundary 132 (e.g., at least two or three inches below a hem skirt as described below in relation to FIGS. 3A-3P, 3R, and 3W-3Z).

In other embodiments, the distance 139 for the grab-zone reinforcement structure 130 (e.g., of the first thermoplastic sidewall 102) extends from the adjustable grab-zone boundary 132 to a position in the first hem 142 above the hem seal 145a (but not proximate the opening 124 as suggested below in relation to FIGS. 3R, 3W, and 3Z). In such embodiments, the grab-zone reinforcement structure 130 spans the grab-zone 105 for the first thermoplastic sidewall 102 and is at least partially secured to the reinforced thermoplastic bag 100 via the hem seal 145a. However, the grab-zone reinforcement structure 130 in certain embodiments does not comprise a hem-channel reinforcement portion (as described below in relation to FIGS. 3Q-3W and FIGS. 3Z-3AA).

Alternatively, the distance 139 for the grab-zone reinforcement structure 130 (e.g., of the first thermoplastic sidewall 102) extends from the adjustable grab-zone boundary 132 to a position below the hem seal 145a. In such embodiments, the grab-zone reinforcement structure 130 for the first thermoplastic sidewall 102 is secured to one or more layers of the first thermoplastic sidewall 102, but not via the hem seal 145a.

In these or other embodiments, the grab-zone reinforcement structure 130 can extend the same distance 139 along the second thermoplastic sidewall 104 as along the first thermoplastic sidewall 102. In alternative implementations, the grab-zone reinforcement structure 130 can extend different distances along the first and second thermoplastic sidewalls 102, 104. In any event, the distance 139 in some cases is between approximately 5% and 50% of a height 138 of the reinforced thermoplastic bag 100, where the height 138 is measured from the closed bottom edge 114 to the opening 124. Additionally or alternatively, in one or more implementations the grab-zone reinforcement structure 130 can extend approximately 20% of the height 138 of the reinforced thermoplastic bag 100.

In more detail, the distance 139 in one or more implementations, may have a first range of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 10 inches (25.4 cm) to about 30 inches (76.2 cm), a fifth range of about 20 inches (50.8 cm) to about 48 inches (121.9 cm), a sixth range of about 23 inches (58.4 cm) to about 33 inches (83.8 cm), and a seventh range of about 26 inches (66 cm) to about 28 inches (71.1 cm). In one implementation, the distance 139 may be 5 inches (12.7 cm). In alternative implementations, the distance 139 may be shorter or longer than the examples listed above. In any event, the distance 139 for the grab-zone reinforcement structure is less than the height 138 of the reinforced thermoplastic bag 100

By comparison, the height 138 of the reinforced thermoplastic bag 100 may have a first range of about 20 inches (50.8 cm) to about 48 inches (121.9 cm), a second range of about 23 inches (58.4 cm) to about 33 inches (83.8 cm), and a third range of about 26 inches (66 cm) to about 28 inches (71.1 cm). In one implementation, the height 138 may be 25.375 inches (64.45 cm). In alternative implementations, the height 138 may be shorter or longer than the examples listed above.

In one or more embodiments, each of the first and second thermoplastic sidewalls 102, 104 and the grab-zone reinforcement structure 130 can have a gauge or thickness (e.g., average distance between the major surfaces) between about 0.1 mils to about 10 mils, suitably from about 0.1 mils to about 4 mils, suitably in the range of about 0.1 mils to about 2 mils, suitably from about 0.1 mils to about 1.25 mils, suitably from about 0.9 mils to about 1.1 mils, suitably between about 0.2 mils to about 0.9 mils, and suitably between about 0.3 mils to about 0.7 mils. In these or other embodiments, the first and second thermoplastic sidewalls 102, 104 can have a greater thickness than the grab-zone reinforcement structure 130. In alternative implementations, the first and second thermoplastic sidewalls 102, 104 and the grab-zone reinforcement structure 130 can each have the same thickness. In yet further implementations, the grab-zone reinforcement structure 130 can be thicker than the first and second thermoplastic sidewalls 102, 104.

Additionally or alternatively, in one or more embodiments, each of the first and second thermoplastic sidewalls 102, 104 and the grab-zone reinforcement structure 130 can have a uniform or consistent gauge. In alternative implementations, one or more of the first thermoplastic sidewall 102, the second thermoplastic sidewall 104, and the grab-zone reinforcement structure 130 can be rough or uneven. Further, the gauge of one or more of the first thermoplastic sidewall 102, the second thermoplastic sidewall 104, and the grab-zone reinforcement structure 130 need not be consistent or uniform. Thus, the gauge of one or more of the first thermoplastic sidewall 102, the second thermoplastic sidewall 104, and the grab-zone reinforcement structure 130 can vary due to product design, manufacturing defects, tolerances, or other processing issues.

In particular, in one or more implementations, one or more of the first thermoplastic sidewall 102, the second thermoplastic sidewall 104, and/or the grab-zone reinforcement structure 130 is incrementally stretched. For example, in one or more implementations, one or more of the first thermoplastic sidewall 102, the second thermoplastic sidewall 104, and/or the grab-zone reinforcement structure 130 is incrementally stretched by one or more of MD ring rolling, TD ring rolling, SELFing, or other methods described in NON-CONTINUOUSLY LAMINATED MULTI-LAYERED BAGS of U.S. patent application Ser. No. 13/273,384, filed on Oct. 14, 2011 (hereafter "Fraser"), the contents of which are expressly incorporated herein by reference. Incrementally stretching one or more of the first thermoplastic sidewall 102, the second thermoplastic sidewall 104, and/or the grab-zone reinforcement structure 130 can increase or otherwise modify one or more of the tensile strength, tear resistance, impact resistance, or elasticity of the films (while also reducing the basis weight of the film).

The first thermoplastic sidewall 102, the second thermoplastic sidewall 104, and the grab-zone reinforcement structure 130 can each comprise films of thermoplastic material. In particular, the first thermoplastic sidewall 102, the second thermoplastic sidewall 104, and the grab-zone reinforcement structure 130 can comprise any of the thermoplastic materials described above or combinations thereof. In one or more implementations, the first and second thermoplastic sidewalls 102, 104 can comprise the same thermoplastic material as the grab-zone reinforcement structure 130. In alternative implementations, the grab-zone reinforcement structure 130 can comprise a different material than the first and second thermoplastic sidewalls 102, 104. For example, the material of the grab-zone reinforcement structure 130 may have a higher tensile strength, tear resistance, puncture resistance, elasticity, and/or abrasion resistance than the material of the first and second thermoplastic sidewalls 102, 104. A grab-zone reinforcement structure 130 made of stronger and/or tougher material may help further protect thermoplastic bag 100 against rupture and/or puncture.

Figure 4A:
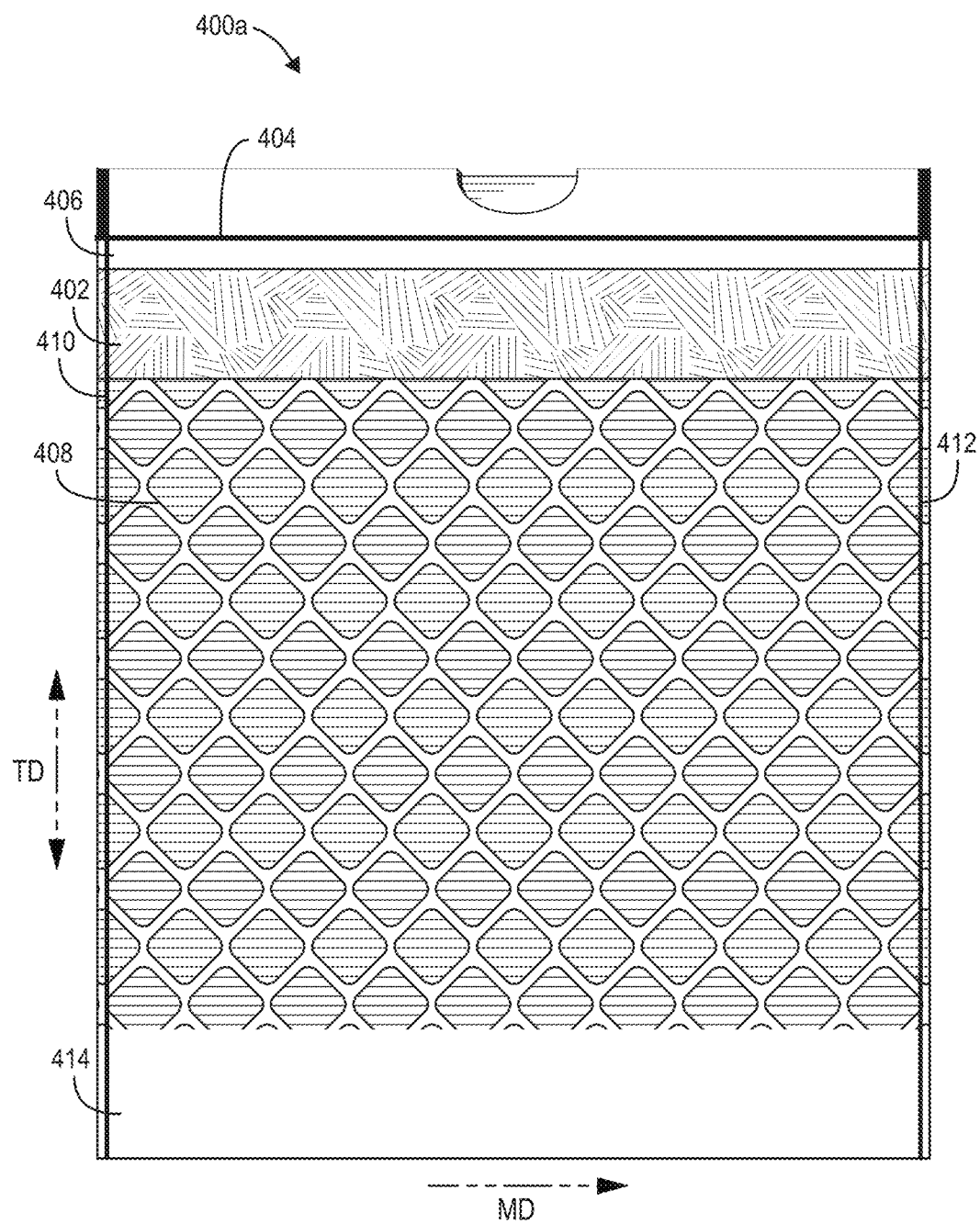
FIGS. 4A-4C illustrate yet another reinforced thermoplastic bag in accordance with one or more embodiments.
Figure 4B:
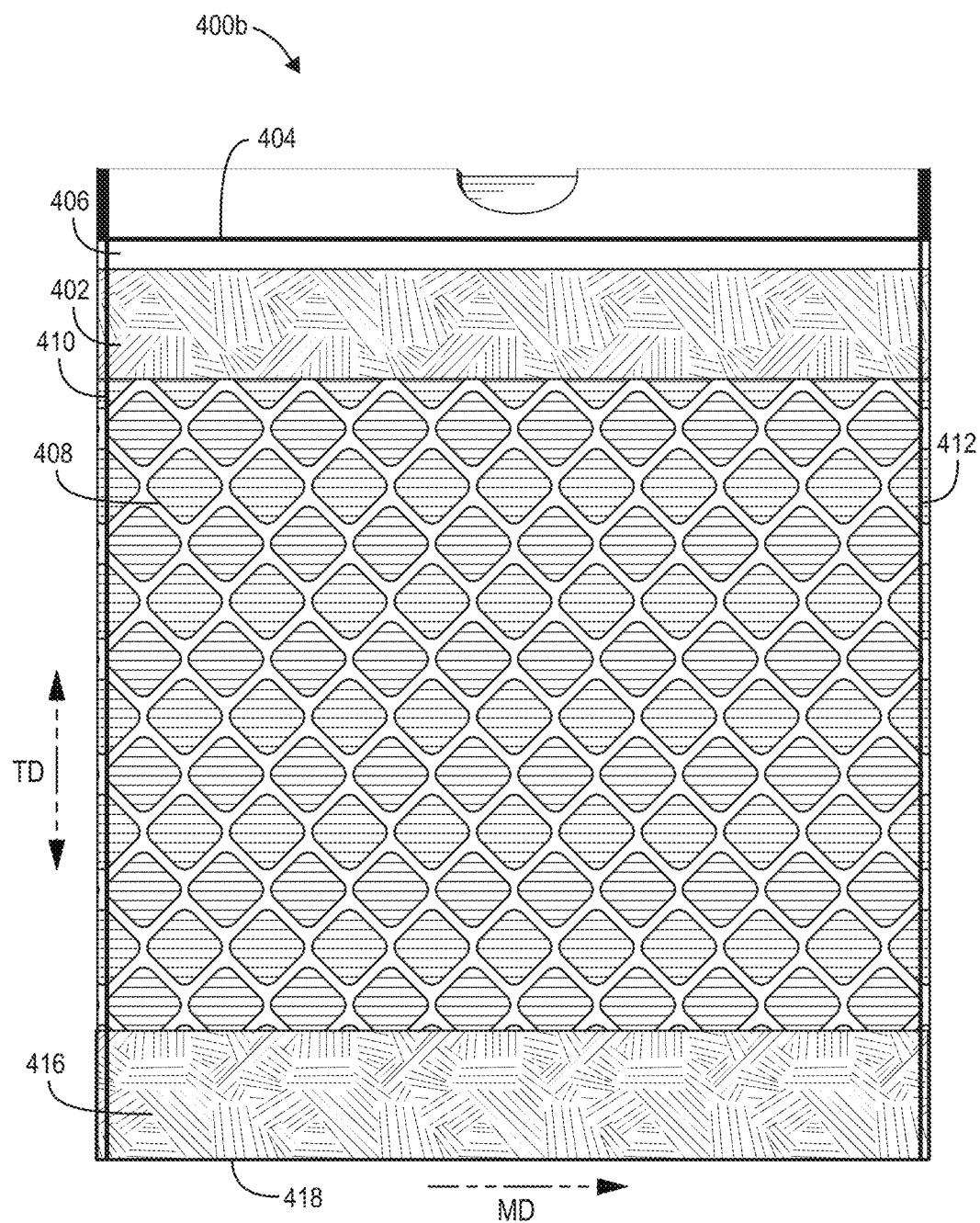
Figure 4C:
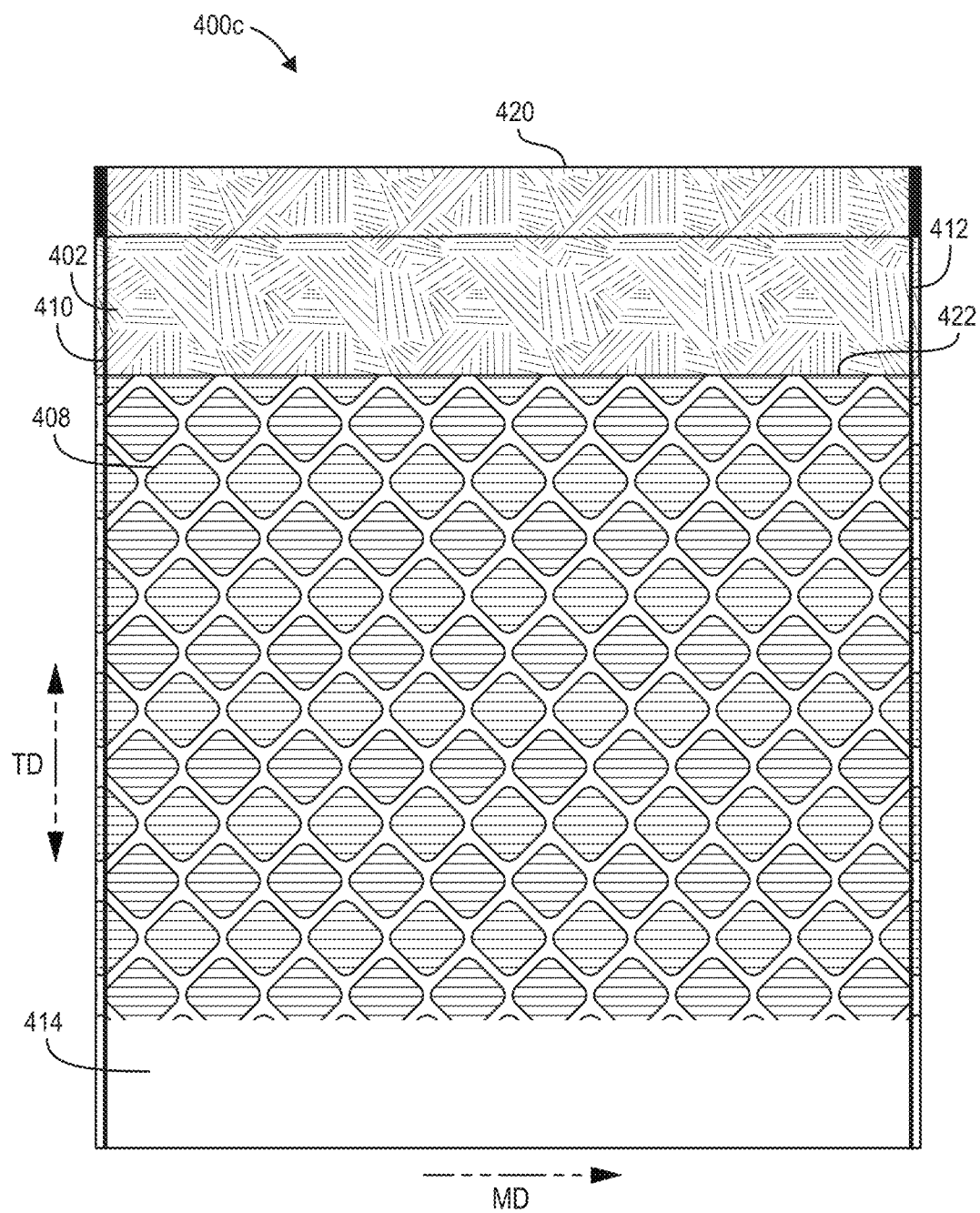

Additionally or alternatively, the material of the grab-zone reinforcement structure 130 may include a non-woven material (e.g., spun bond nonwovens comprising staple fibers and/or continuous filament fibers from polypropylene, polyester, polyethylene, etc. as expressly shown in FIGS. 4A-4C). The non-woven material may include a densely interlaced microstructure such that the grab-zone reinforcement structure 130 has an appearance of ribbon. Additionally or alternatively, the non-woven material may include individual fibers that are coarser and are organized in a looser open format similar to netting. In these or other embodiments, the non-woven fibers can bond together by means of chemical, mechanical, heat, or solvent processes. In other embodiments, the material of the grab-zone reinforcement structure 130 comprises post-consumer reclaim materials.

In addition to the forgoing, in one or more implementations the grab-zone reinforcement structure 130 and the first and second thermoplastic sidewalls 102, 104 can comprise visual features, such as color. In some cases, the visual features the of grab-zone reinforcement structure 130 and the first and second thermoplastic sidewalls 102, 104 comprise a same color. In alternative implementations, the visual features (e.g., colors) of the grab-zone reinforcement structure 130 and the first and second thermoplastic sidewalls 102, 104 can differ. For example, in one or more implementations, the first and second thermoplastic sidewalls 102, 104 can comprise a white, translucent thermoplastic material. The grab-zone reinforcement structure 130 can comprise a pigmented (e.g., non-white or colored) material. For example, in one or more implementations, the grab-zone reinforcement structure 130 can comprise a black material. In such implementations, the areas of the reinforced thermoplastic bag 100 including the grab-zone reinforcement structure 130 can (if positioned between sidewall layers or on an inner surface of the first and second thermoplastic sidewalls 102, 104) appear gray when viewed from at least one of an outside surface or an inside surface of the reinforced thermoplastic bag 100.

For instance, when the reinforced thermoplastic bag 100 is placed inside a receptacle, an inside surface of the reinforced thermoplastic bag 100 is visible within the receptacle and/or as flipped over atop rim of the receptacle. In this configuration, the respective visual features (e.g., differing colors) of the grab-zone reinforcement structure 130 and the first and second thermoplastic sidewalls 102, 104 may provide a visual signal of increased strength/durability through an inside surface of the reinforced thermoplastic bag 100. Similarly, when the reinforced thermoplastic bag 100 is held or viewed outside of a receptacle, an outside surface of the reinforced thermoplastic bag 100 is visible. In certain embodiments, the respective visual features (e.g., differing colors) of the grab-zone reinforcement structure 130 and the first and second thermoplastic sidewalls 102, 104 may provide a visual signal of increased strength/durability through an outside surface of the reinforced thermoplastic bag 100. Thus, the differing color of the areas of the reinforced thermoplastic bag 100 including the grab-zone reinforcement structure 130 can serve to visually indicate to a consumer that such areas of the reinforced thermoplastic bag 100 are provided additional strength. By visibly including color in the grab-zone reinforcement structure 130 to show through one or more sidewall layers from outside and/or inside viewing perspectives, the reinforced thermoplastic bag 100 specifically addresses a current consumer perception of conventional thermoplastic liners that use less material being insufficiently strong.

Of course, the grab-zone reinforcement structure 130, like the reinforced thermoplastic bag 100, can include numerous other material/visual properties. For example, in one or more implementations, the grab-zone reinforcement structure 130 includes odor control additives, fragrance additives, etc. to improve and/or reduce an amount of foul odor, particularly in the grab-zone 105 near the opening 124 of the reinforced thermoplastic bag 100. These control additives, perfume additives, etc. in the grab-zone 105 near the opening 124 of the reinforced thermoplastic bag 100 can activate in response to stretching or grabbing of the reinforced thermoplastic bag 100 in these areas. Additionally or alternatively, such control additives, perfume additives, etc. in the grab-zone 105 near the opening 124 of the reinforced thermoplastic bag 100 are positioned so as to exude (closest to a user's nose) a pleasant odor and/or quell (e.g., mask, render inert, etc.) unpleasant odors from garbage positioned below the grab-zone 105.

Additionally or alternatively, in one or more embodiments, the reinforced thermoplastic bag 100 includes one or more patterned portions (e.g., a patterned hem seal, a patterned sidewall, a patterning of a plurality of non-continuous bonds 150, and/or a patterned grab-zone reinforcement structure) that can serve to notify a consumer that such areas of the reinforced thermoplastic bag 100 are provided with additional strength. Like color, patterned portions selectively located at certain positions of the reinforced thermoplastic bag 100 (e.g., the grab-zone reinforcement structure 130) specifically addresses a current consumer perception of conventional thermoplastic liners that use less material is insufficiently strong or durable. Of course, the patterned portions can be associated with a variety of material properties as described above. However, the pattern-enhancing visibility of these portions can be perceived as corresponding specifically to increased strength and durability.

As previously mentioned, the grab-zone reinforcement structure 130 can be non-continuously laminated to the reinforced thermoplastic bag 100. For example, FIG. 1A illustrates that the reinforced thermoplastic bag 100 can comprise a plurality of non-continuous bonds 150 securing the grab-zone reinforcement structure 130 to thermoplastic bag 100. In particular, the plurality of non-continuous bonds 150 may include a plurality of discontinuous adhesive bonds. In alternative implementations, the plurality of non-continuous bonds 150 can comprise ultrasonic bonds, pressure bonds (i.e., bonds formed from one or more of ring rolling, SELFing, or embossing), heat seals, or a combination of pressure and tackifying agents in one or more of the films. In addition, the plurality of non-continuous bonds 150 can have additional or alternative positional configurations or design patterns than illustrated according to FIGS. 1A-1B (and FIGS. 2A-2B). For example, the plurality of non-continuous bonds 150 may not be positioned above or below the hem seals 145a, 145b.

In one or more implementations, the plurality of non-continuous bonds 150 can have a bond strength that is less than a weakest tear resistance of each of the reinforced thermoplastic bag 100 and the grab-zone reinforcement structure 130. In this manner, the plurality of non-continuous bonds 150 can be designed to fail prior to failing of the reinforced thermoplastic bag 100 or the grab-zone reinforcement structure 130. Indeed, one or more implementations include the plurality of non-continuous bonds 150 that release just prior to any localized tearing of the reinforced thermoplastic bag 100 or the grab-zone reinforcement structure 130. In particular, the plurality of non-continuous bonds 150 between the reinforced thermoplastic bag 100 and the grab-zone reinforcement structure 130 can act to first absorb forces via breaking of the plurality of non-continuous bonds 150 prior to allowing that same force to cause failure of the reinforced thermoplastic bag 100 or the grab-zone reinforcement structure 130. Such action can provide increased strength to the reinforced thermoplastic bag 100.

This is beneficial as it has been found that thermoplastic films often exhibit strength characteristics that are approximately equal to the strength of the weakest layer. Providing relatively weak bonding between the reinforced thermoplastic bag 100 and the grab-zone reinforcement structure 130 has surprisingly been found to greatly increase the strength provided by the grab-zone reinforcement structure 130. As more explicitly covered in U.S. patent application Ser. No. 12/947,025 filed Nov. 16, 2010 and entitled DISCONTINUOUSLY LAMINATED FILM, incorporated by reference herein, the MD and TD tear values of non-continuously laminated films in accordance with one or more implementations can exhibit significantly improved strength properties, despite a reduced gauge. In particular, the individual values for the Dynatup, MD tear resistance, and TD tear resistance properties in non-continuously laminated films of one or more implementations are unexpectedly higher than the sum of the individual layers. Thus, the non-continuous lamination of the reinforced thermoplastic bag 100 and the grab-zone reinforcement structure 130 can provide a synergistic effect.

More specifically, the TD tear resistance of the non-continuously laminated films can be greater than a sum of the TD tear resistance of the individual layers. Similarly, the MD tear resistance of the non-continuously laminated films can be greater than a sum of the MD tear resistance of the individual layers. Along related lines, the Dynatup peak load of the non-continuously laminated films can be greater than a sum of a Dynatup peak load of the individual layers. Thus, the non-continuously laminated films can provide a synergistic effect. In addition to the foregoing, one or more implementations of a non-continuously laminated grab-zone reinforcement structure 130 can allow for a reduction in basis weight (gauge by weight) as much as 50% in such areas of the reinforced thermoplastic bag 100 and still provide enhanced strength parameters.

Similarly, to reduce an MD load needed to stretch a top portion (e.g., the first and second hems 142, 144) of the reinforced thermoplastic bag 100 over a trash receptacle, the reinforced thermoplastic bag 100 can include one or more break-away features 152 that can tear in response to an applied load. By allowing the break-away features 152 to tear in response to an applied load, the reinforced thermoplastic bag 100 can more easily fit around the opening of a trash receptacle, thereby allowing for a more convenient bag installation.

The one or more break-away features 152 can be a notch, slit, or perforation in the grab-zone reinforcement structure 130 and optionally one or more of the first and second hems 142, 144. For example, in one or more implementations, a hem channel reinforcement portion of the grab-zone reinforcement structure 130 comprises the one or more break-away features 152 such that the hem channel reinforcement portion separates from the grab-zone reinforcement structure 130 when a load is applied to stretch the opening 124. In one or more embodiments, the one or more break-away features 152 are positioned away from the center of the bag and at an optimal distance from the first and second side edges 110, 112 (e.g., to avoid tearing of the side seals). The one or more break-away features 152 can include a series of notches, slits, or perforations. In these or other embodiments, because the reinforced thermoplastic bag 100 is typically lifted in the transverse direction, the one or more break-away features 152 do not affect load bearing while removing the reinforced thermoplastic bag 100 with trash contents. That is, because the lift strength is in the transverse direction, the break-away features 152 do not degrade lift strength by allowing the first and second hems 142, 144 to fail when stretched in the machine direction.

One will appreciate that the break-away features 152 can allow for the use of non-elastic or less stretchable grab-zone reinforcement structures 130 as compared to the materials of the first and second thermoplastic sidewalls 102, 104. In particular, non-elastic or less stretchable grab-zone reinforcement structures 130 can provide desirable strength characteristics to the grab-zone. For example, the grab-zone reinforcement structure 130 may increase stiffness in the lift direction (i.e., transverse direction) but provide more elasticity or stretchiness in the machine direction. In this manner, material properties of the grab-zone reinforcement structure 130 can advantageously impart increased durability and strength in the lift direction yet increase flexibility in the machine direction to stretch around a receptacle. Furthermore, the break-away features 152 can split the grab-zone reinforcement structures 130 to further allow the hem and optionally the grab-zone to more easily stretch around a receptacle.

In addition to the reinforced thermoplastic bag 100, FIG. 1B illustrates a reinforced thermoplastic bag 101 in accordance with one or more embodiments. The reinforced thermoplastic bag 101 is similar to the reinforced thermoplastic bag 100 of FIG. 1A. In particular, the reinforced thermoplastic bag 101 is the same as the reinforced thermoplastic bag 100 in all respects except that the reinforced thermoplastic bag 101 comprises none of the break-away features 152. By removing the break-away features 152, the reinforced thermoplastic bag 101 (e.g., the first and second hems 142, 144) in one or more implementations more tightly interfaces with a portion of a trash receptacle. In other embodiments, where an opening of the trash receptacle is comparatively smaller than the opening 124, the reinforced thermoplastic bag 101 experiences no applied load when installed within a trash receptacle. Accordingly, omitting the break-away features 152 saves manufacturing resources and reduces operational manufacturing steps to produce the reinforced thermoplastic bag 101.

As described above, the grab-zone reinforcement structure 130 can reinforce the reinforced thermoplastic bag 100 comprising a draw tape disposed within hem channels defined by respective first and second top edges 120, 122 folded onto corresponding interior surfaces of the first and second thermoplastic sidewalls 102, 104. In such embodiments, each grab-zone reinforcement structure 130 can reinforce the first and second thermoplastic sidewalls 102, 104 comprising multiple layers and/or a bag-in-bag (e.g., a first thermoplastic bag and a second thermoplastic bag positioned within the first thermoplastic bag). However, in one or more embodiments, the grab-zone reinforcement structure 130 reinforces other types of thermoplastic bags (e.g., thermoplastic bags that do not employ a draw tape, a hem seal, a bag-in-bag construction). For example, FIGS. 2A-2B illustrate respective non-drawstring reinforced thermoplastic bags 200, 201 with grab-zone reinforcement structures 130 in accordance with one or more embodiments.

Figure 2A:
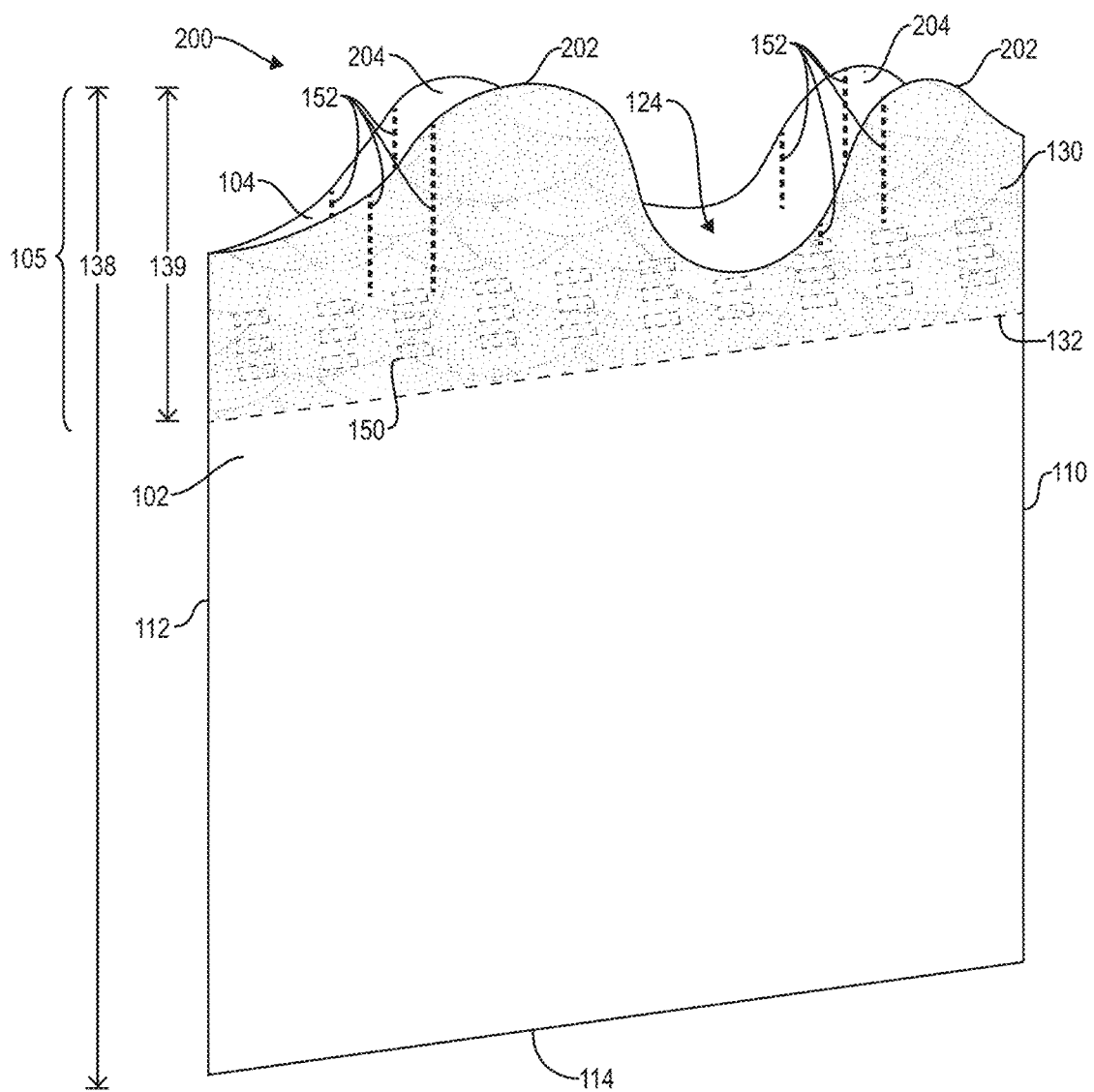
FIGS. 2A-2B illustrate respective reinforced thermoplastic bags in accordance with one or more embodiments.

As shown in FIG. 2A, the grab-zone reinforcement structure 130 is secured to the first thermoplastic sidewall 102 via the plurality of non-continuous bonds 150 described above. In addition, the grab-zone reinforcement structure 130, as similarly described above, extends toward the closed bottom edge 114 across the first thermoplastic sidewall 102 for the distance 139 from proximate the opening 124 to the adjustable grab-zone boundary 132. The grab-zone reinforcement structure 130 also extends between the first and second side edges 110, 112 in the grab-zone 105. Additionally, in one or more embodiments, the grab-zone reinforcement structure 130 comprises the one or more break-away features 152 described above (e.g., slits or perforations formed in the TD at top portions of the first and second thermoplastic sidewalls 102, 104).

As further shown, the reinforced thermoplastic bag 200 comprises alternative closure mechanisms other than a draw tape. In particular, FIG. 2A illustrates the reinforced thermoplastic bag 200 comprising flaps 202, 204 (e.g., for tying shut the opening 124). In alternative implementations, the closure mechanism can comprise adhesive tapes, a tuck and fold closure, an interlocking closure, a slider closure, a zipper closure, or other closure structures known to those skilled in the art for closing a bag.

Figure 2B:
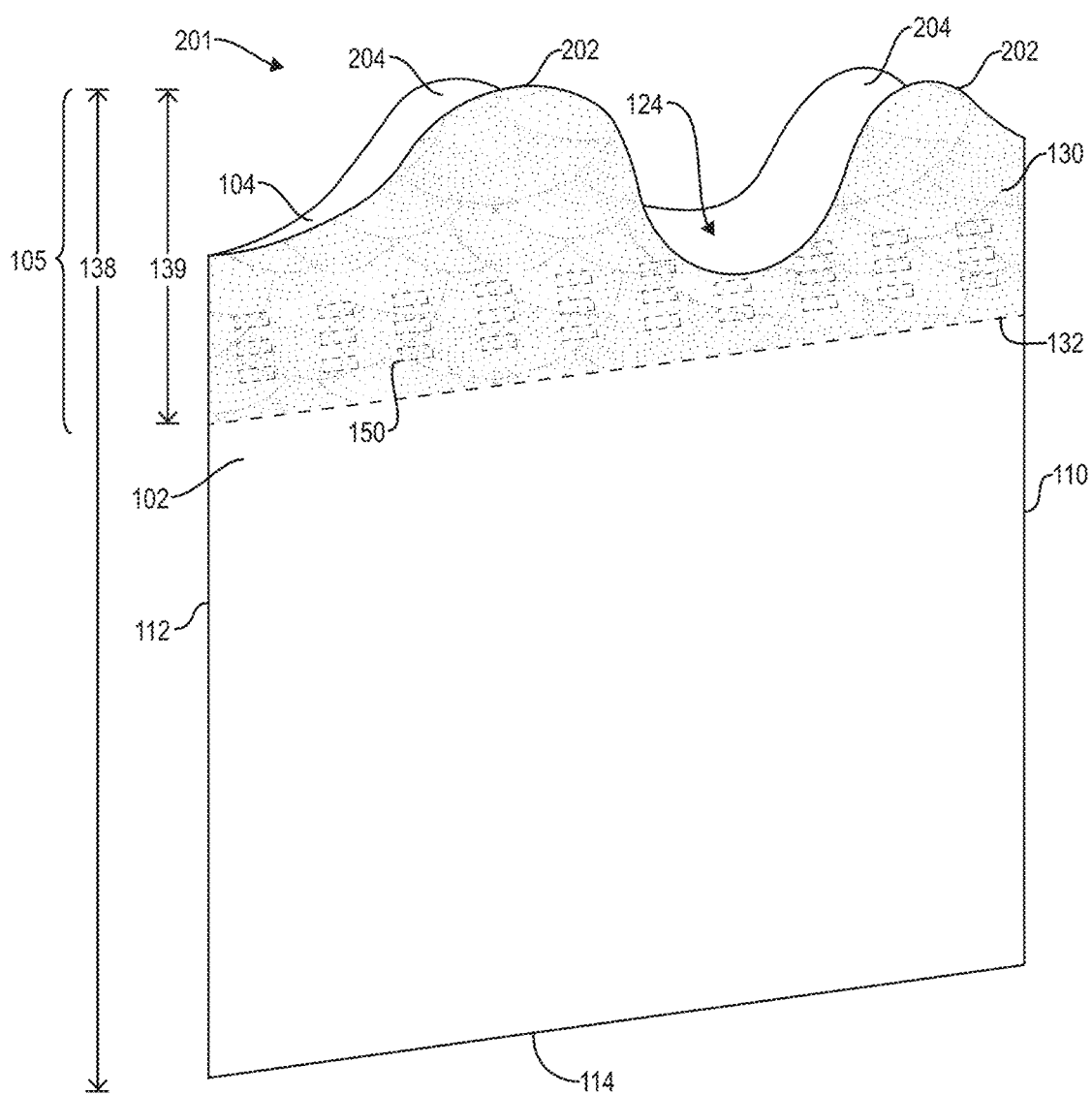

In addition to the reinforced thermoplastic bag 200, FIG. 2B illustrates a reinforced thermoplastic bag 201 in accordance with one or more embodiments. The reinforced thermoplastic bag 201 is similar to the reinforced thermoplastic bag 200 of FIG. 2A. In particular, the reinforced thermoplastic bag 201 is the same as the reinforced thermoplastic bag 200 in all respects except that the reinforced thermoplastic bag 201 comprises none of the break-away features 152. Removal of the break-away features 152 provides one or more advantages noted above with respect to FIG. 1B.

As mentioned above, a grab-zone reinforcement structure can reinforce one or more thermoplastic sidewalls, including one or more layers and/or distinct bags (e.g., for a bag-in-bag). For example, FIGS. 3A-3AA illustrate respective upper cross-sectional views of sidewalls 300a-300aa including a grab-zone reinforcement structure 306 in accordance with one or more embodiments. Opposing sidewalls to the sidewalls 300a-300aa are omitted for clarity of illustration (as are portions of a reinforced thermoplastic bag below a grab-zone 320, such as the closed bottom edge 114 shown in FIGS. 1-2). Additionally, as indicated at the top of each of FIGS. 3A-3AA, the sidewalls 300a-300aa illustrate the outside of a reinforced thermoplastic bag to the inside of a reinforced thermoplastic bag in a left-to-right direction.

In one or more embodiments, the hem channel region 318 comprises a portion of the sidewalls 300a-300aa above a hem seal 316. In contrast, the grab-zone 320 comprises another portion of the sidewalls 300a-300aa extending below the hem seal 316 a distance toward a closed bottom edge (not shown). In particular, the hem seal 316 secures the fold-over of the top edge 305 of the sidewalls 300a-300aa to an inside surface of the reinforced thermoplastic bag, thereby forming a hem channel 314 and a corresponding hem skirt that terminates at the edge 305 of the plies of thermoplastic film forming the sidewalls. Disposed within the hem channel 314 includes a draw tape 312 (e.g., as a same or similar closing mechanism described above in relation to the draw tape 140 of FIGS. 1A-1B).

In particular, FIGS. 3A-3AA illustrate a positional relationship between the grab-zone reinforcement structure 306 and one or both of a first layer 302 and an optional second layer 304 of the sidewalls 300a-300aa proximate a hem channel region 318 and/or the grab-zone 320. For example, the grab-zone reinforcement structure 306 can include a hem-channel reinforcement portion extending around the hem channel 314 from a first attachment point at the hem seal 316 to a second attachment point at the hem seal 316 (e.g., to reinforce the hem channel region 318 as shown in FIGS. 3A-3P and 3X-3Y).

Additionally, or alternatively, the grab-zone reinforcement structure 306 includes one or both of a first reinforcement layer 308a or a second reinforcement layer 308b that reinforce at least a portion of the grab-zone 320. For example, in one or more embodiments described below, the grab-zone reinforcement structure 306 comprises single-ply or dual-ply reinforcement across the grab-zone 320. Specifically, the grab-zone reinforcement structure 306 advantageously provides extra material for increased strength and durability at a portion of the grab-zone 320 below (e.g., at least two to four inches) a hem skirt formed by a fold-over of a top edge 305 of the sidewalls 300a-300aa. Thus, where the hem skirt formed by the fold-over of the top edge 305 is too short to provide adequate reinforcement to the grab-zone 320, the grab-zone reinforcement structure 306 extends at least several inches below the hem skirt toward the bottom fold (not shown) for enhanced reinforcement coverage.

As shown for the sidewall 300a of FIG. 3A, the grab-zone reinforcement structure 306 is positioned between the first layer 302 (e.g., an inner layer/bag) and the second layer 304 (e.g., an outer layer/bag) in both the hem channel region 318 and the grab-zone 320. In particular, FIG. 3A shows a first reinforcement layer 308a reinforcing the hem channel region 318 in between the first layer 302 and the second layer 304 by extending around the hem channel 314 between attachment points 315c, 315f at the hem seal 316. In this case, the first layer 302 forms a first, innermost ply bounding the hem channel 314 such that the first layer 302 is positioned proximate to the draw tape 312 between attachment points 315d, 315e at the hem seal 316. The first reinforcement layer 308a forms a second, reinforcing middle-ply bounding the hem channel 314 between attachment points 315c, 315f at the hem seal 316. In addition, the second layer 304 forms a third, outer ply bounding the hem channel 314 between attachment points 315a, 315g at the hem seal 316.

The portion of the first reinforcement layer 308a bounding the hem channel 314 can reinforce the hem channel 314. In particular, when the draw tape 312 is pulled through drawtape notches (see notches 146, 148 of FIG. 1A as an example) the extra first reinforcement layer 308a bounding the hem channel 314 can help reduce tearing of the hem channel 314 near the drawtape notches. Similarly, the extra first reinforcement layer 308a bounding the hem channel 314 can help prevent tearing or puncturing when a user grabs the hem channel 314 while when removing the reinforced thermoplastic bag from a receptacle.

Further, FIG. 3A shows the sidewall 300a includes the grab-zone reinforcement structure 306 extending across the grab-zone 320 for additional reinforcement. In particular, the first reinforcement layer 308a of the grab-zone reinforcement structure 306 extends away from attachment point 315c at the hem seal 316 to a fold 310. Additionally shown, the second reinforcement layer 308b of the grab-zone reinforcement structure 306 folds onto the first reinforcement layer 308a. Specifically, from the fold 310, the second reinforcement layer 308b extends back towards the hem seal 316 where an end portion 309 of the second reinforcement layer 308b is secured by the hem seal 316 at attachment point 315b. Attachment point 315b is positioned between attachment points 315a, 315c for the second layer 304 and the first reinforcement layer 308a, respectively.

The folded grab-zone reinforcement structure 306 extending across the grab-zone 320 provides two additional layers to strengthen the grab-zone and help prevent tearing, puncturing, rips, or other undesired damage. Furthermore, these additional layers to not require alteration to the other traditional components of the reinforced thermoplastic bag such as the hem skirt. Thus, as explained above, placement/insertion of the folded grab-zone reinforcement structure 306 does not require retrofitting of conventional components of a bag making machine.

While FIG. 3A illustrates a grab-zone reinforcement structure 306 fully folded in the grab-zone to provide two additional layers of reinforcement placed between the layers of a multi-layered thermoplastic bag, implementations of the present invention are not so limited. For example, FIG. 3B illustrates a portion of reinforced thermoplastic bag including grab-zone reinforcement structure 306 positioned in the grab-zone inside of the reinforced thermoplastic bag rather than between the layers of the sidewall. Thus, unlike FIG. 3A, the sidewall 300b of FIG. 3B comprises the grab-zone reinforcement structure 306 as additional reinforcement positioned within the bag and next to an inside surface of the reinforced thermoplastic bag (e.g., the inner surface of the first layer 302) at the grab-zone 320. For example, the first reinforcement layer 308a of the grab-zone reinforcement structure 306 extends away from attachment point 315f at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured by the hem seal 316 at attachment point 315e between attachment points 315d, 315f for the first layer 302 and the first reinforcement layer 308a, respectively.

The top of the grab-zone reinforcement structure 306 is positioned between the first layer 302 and the second layer 304 for the hem channel region 318 similar to that of FIG. 3A. In particular, FIG. 3B shows the first reinforcement layer 308a reinforcing the hem channel region 318 in between the first layer 302 and the second layer 304 by extending around the hem channel 314 between attachment points 315b, 315e at the hem seal 316. In the similar case of FIG. 3B, the first layer 302 forms a first, innermost ply bounding the hem channel 314 such that the first layer 302 is positioned proximate to the draw tape 312 between attachment points 315c, 315d at the hem seal 316. The first reinforcement layer 308a forms a second, reinforcing middle ply bounding the hem channel 314 between attachment points 315b, 315e at the hem seal 316. In addition, the second layer 304 forms a third, outer ply bounding the hem channel 314 between attachment points 315a, 315g at the hem seal 316.

In addition to positioning between layers of the sidewalls or within the reinforced thermoplastic bag, one or more embodiments include a grab-zone reinforcement structure 306 secured to the outside of the bag. FIG. 3C shows the first reinforcement layer 308a of the grab-zone reinforcement structure 306 reinforcing the hem channel region 318 over outer and inner surfaces of the first layer 302 by extending around both the first layer 302 and the hem channel 314 between attachment points 315b, 315e at the hem seal 316. In this case, the first layer 302 forms a first, innermost ply bounding the hem channel 314 such that the first layer 302 is positioned proximate to the draw tape 312 between attachment points 315c, 315d at the hem seal 316. The first reinforcement layer 308a forms a second, reinforcing outer ply bounding the hem channel 314 between attachment points 315b, 315e at the hem seal 316.

In addition, FIG. 3C illustrates the sidewall 300c comprising the grab-zone reinforcement structure 306 that extends across the grab-zone 320 for additional reinforcement to an outside surface of the reinforced thermoplastic bag (e.g., the outer surface of the first layer 302). In particular, the first reinforcement layer 308a of the grab-zone reinforcement structure 306 extends away from attachment point 315b at the hem seal 316 to a fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured by the hem seal 316 at attachment point 315a next to attachment point 315b for the first reinforcement layer 308a.

FIG. 3C further illustrates that the reinforced thermoplastic bag need not comprise a bag-in-bag or multi-layered configuration. In particular, as shown by FIG. 3C the grab-zone reinforcement structure 306 can reinforce a single layered bag. One with appreciate that many of the configurations of the grab-zone reinforcement structure can equally be used with a single layer bag or a double layer bag. For example FIG. 3D illustrates a configuration similar to that of FIG. 3B albeit with a single-layered reinforced bag. In particular, FIG. 3D shows the first reinforcement layer 308a of the grab-zone reinforcement structure 306 reinforcing the hem channel region 318 over outer and inner surfaces of the first layer 302 by extending around the first layer 302 between attachment points 315a, 315e at the hem seal 316. In this case, the first layer 302 forms a first, innermost ply bounding the hem channel 314 such that the first layer 302 is positioned proximate to the draw tape 312 between attachment points 315b, 315c at the hem seal 316. The first reinforcement layer 308a forms a second, reinforcing outer ply bounding the hem channel 314 between attachment points 315a, 315e at the hem seal 316.

In addition, the sidewall 300d of FIG. 3D comprises the grab-zone reinforcement structure 306 as additional reinforcement to an inside surface of the reinforced thermoplastic bag (e.g., the inner surface of the first layer 302) at the grab-zone 320. For example, the first reinforcement layer 308a of the grab-zone reinforcement structure 306 extends away from attachment point 315e at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured by the hem seal 316 between the first reinforcement layer 308a and the inner surface of the first layer 302 at attachment point 315d. Attachment point 315d is positioned between attachment points 315c, 315e for the first layer 302 and the first reinforcement layer 308a, respectively.

FIGS. 3A-3D each include embodiments in which the portion of the grab-zone reinforcement structure 306 that bounds the hem channel 314 is positioned about at least one layer of the top of a side wall forming the hem channel 314. In alternative embodiments, the portion of the grab-zone reinforcement structure 306 that bounds the hem channel 314 is the inner most layer of the hem channel 314. For example, FIG. 3E illustrates a sidewall 300e comprising the grab-zone reinforcement structure 306 positioned underneath both the first layer 302 and the second layer 304 within the hem channel region 318. In particular, FIG. 3E shows the first reinforcement layer 308a of the grab-zone reinforcement structure 306 forming a first, innermost reinforcing ply bounding the hem channel 314. Specifically, the first reinforcement layer 308a is positioned proximate to the draw tape 312 between distinct points of attachment at the hem seal 316 (in this case between attachment points 315d, 315e). The first layer 302 forms a second, middle ply bounding the hem channel 314 between attachment points 315b, 315f at the hem seal 316. In addition, the second layer 304 forms a third, outer ply bounding the hem channel 314 between attachment points 315a, 315g at the hem seal 316.

Similar to FIG. 3D, the sidewall 300e of FIG. 3E comprises the grab-zone reinforcement structure 306 as additional reinforcement to an inside surface of the reinforced thermoplastic bag (e.g., the inner surface of the first layer 302) at the grab-zone 320. For example, the first reinforcement layer 308a of the grab-zone reinforcement structure 306 extends away from attachment point 315d at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured at attachment point 315c by the hem seal 316 between attachment points 315b, 315d for the first layer 302 and the first reinforcement layer 308a, respectively.

In addition to variation of the positioning of the grab-zone reinforcement structure 306 relative to the layer(s) of the sidewalls of the reinforced thermoplastic bag, one or more embodiments also include variation of the configuration of the folds of the grab-zone reinforcement structure 306. For example, FIG. 3F illustrates, similar to FIG. 3E, the sidewall 300f comprising the grab-zone reinforcement structure 306 positioned underneath both the first layer 302 and the second layer 304 for the hem channel region 318. In particular, FIG. 3F shows the first reinforcement layer 308a of the grab-zone reinforcement structure 306 forming a first, innermost reinforcing ply bounding the hem channel 314 such that the first reinforcement layer 308a is positioned proximate to the draw tape 312 between attachment points 315c, 315e at the hem seal 316. The first layer 302 forms a second, middle ply bounding the hem channel 314 between attachment points 315b, 315f at the hem seal 316. In addition, the second layer 304 forms a third, outer ply bounding the hem channel 314 between attachment points 315a, 315g at the hem seal 316.

In addition, the sidewall 300f of FIG. 3F comprises the grab-zone reinforcement structure 306 as additional reinforcement to an inside surface of the reinforced thermoplastic bag (e.g., the inner surface of the first layer 302) at the grab-zone 320. For example, the first reinforcement layer 308a of the grab-zone reinforcement structure 306 extends away from attachment point 315e at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured at attachment point 315d by the hem seal 316 between attachment points 315c, 315e for the first reinforcement layer 308a. Accordingly, the end portion 309 of the second reinforcement layer 308b is positioned inside the hem channel 314 in one or more implementations.

Figure 3G:
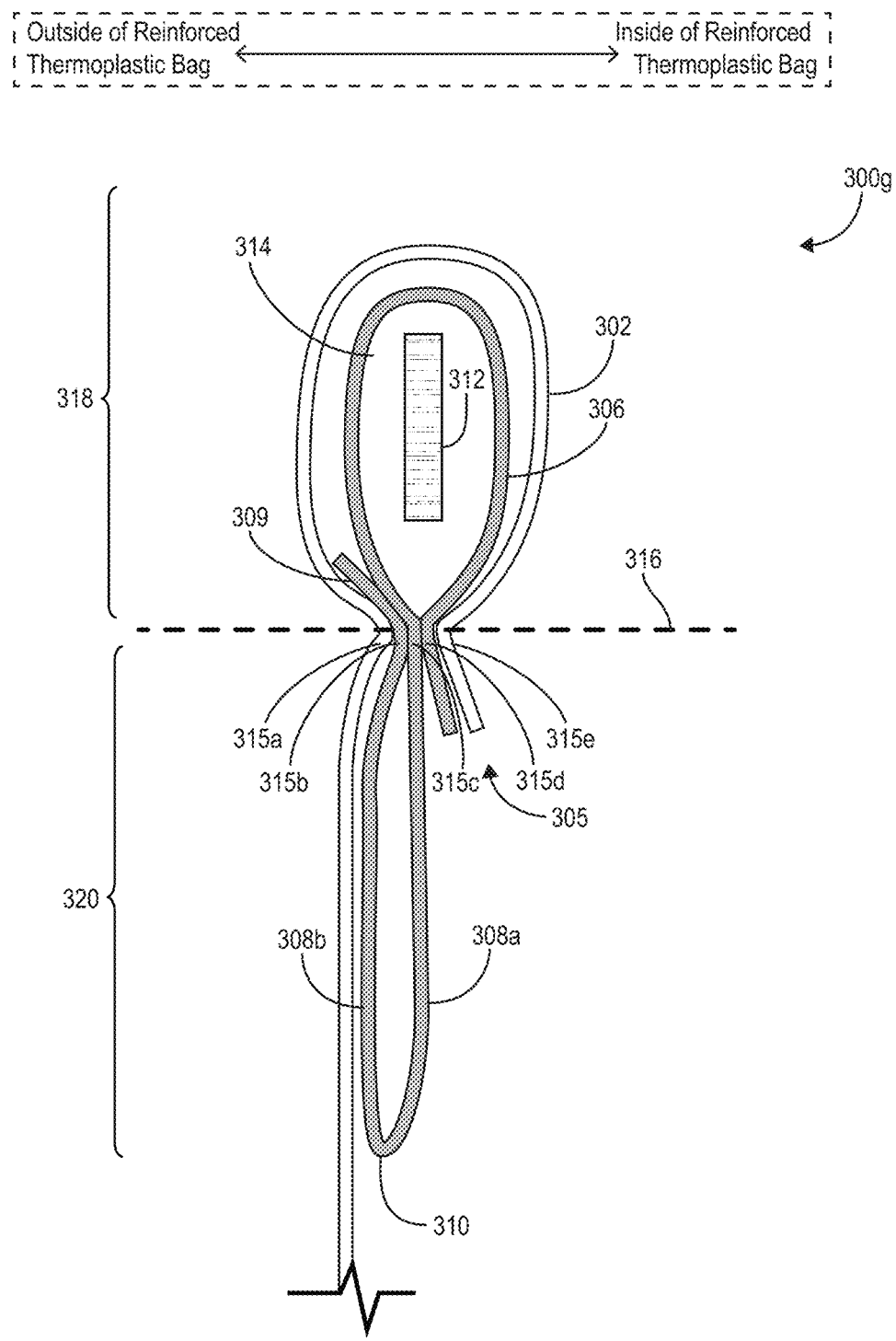

Turning to FIG. 3G an implementation is illustrated that includes the grab-zone reinforcement structure 306 as the inner most layer in the hem channel 314, similar to FIGS. 3E and 3F, albeit with a single-layered thermoplastic bag. Specifically, FIG. 3G illustrates the sidewall 300g comprising the grab-zone reinforcement structure 306 positioned underneath the first layer 302 for the hem channel region 318. In particular, FIG. 3G shows the first reinforcement layer 308a of the grab-zone reinforcement structure 306 forming a first, innermost reinforcing ply bounding the hem channel 314 such that the first reinforcement layer 308a is positioned proximate to the draw tape 312 between attachment points 315c, 315d at the hem seal 316. The first layer 302 forms a second, outer ply bounding the hem channel 314 between attachment points 315a, 315e at the hem seal 316. The sidewall 300g comprises no second layer 304.

In addition, the sidewall 300g of FIG. 3G comprises the grab-zone reinforcement structure 306 as additional reinforcement to an inside surface of the reinforced thermoplastic bag (e.g., the inner surface of the first layer 302) at the grab-zone 320. For example, the first reinforcement layer 308a of the grab-zone reinforcement structure 306 extends away from attachment point 315c at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured at attachment point 315b by the hem seal 316 between attachment points 315a, 315c for the first layer 302 and the first reinforcement layer 308a, respectively.

Figure 3H:
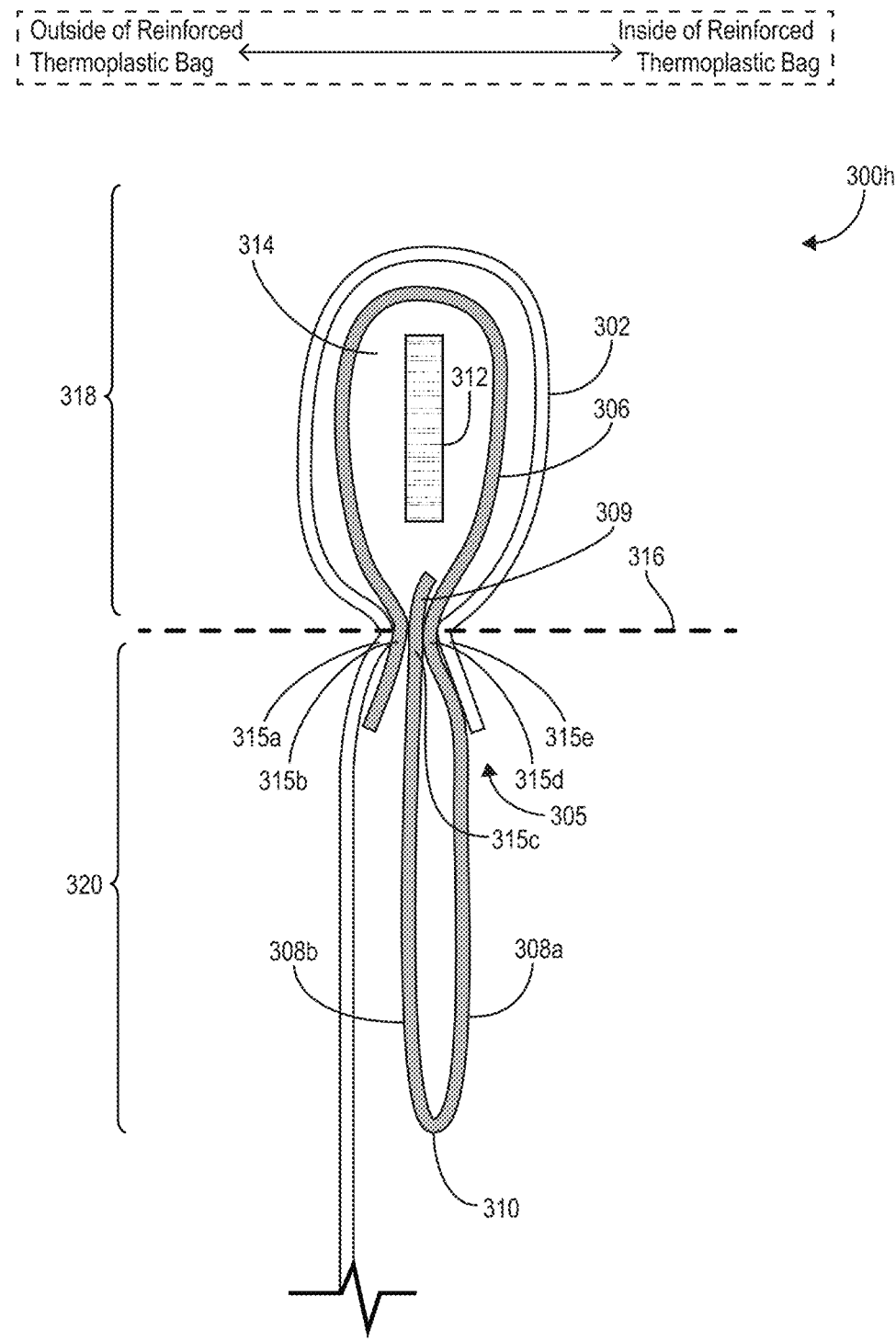
Figure 3L:
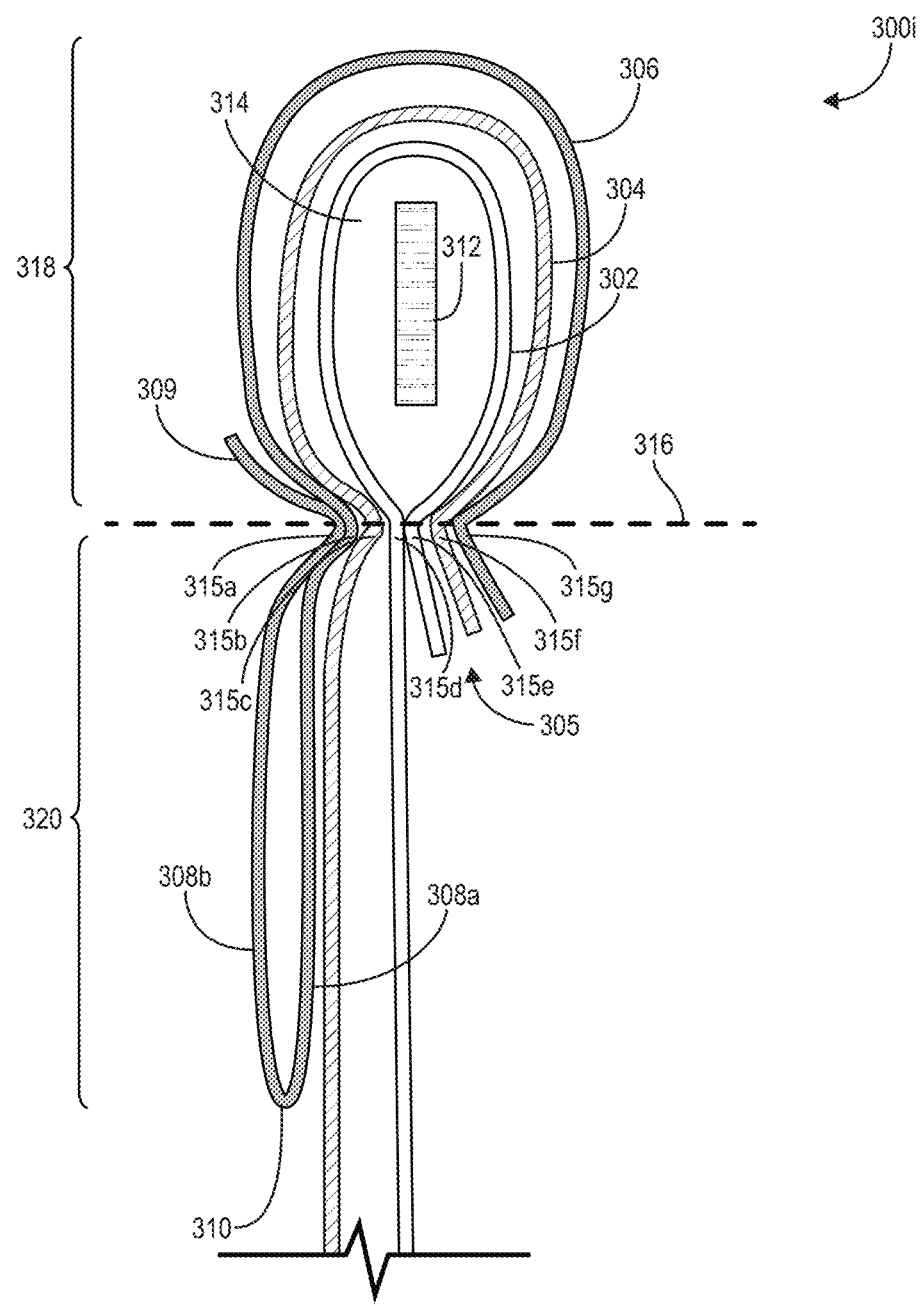

Continuing with single-layered bag embodiments, FIG. 3H illustrates a grab-zone reinforcement structure 306 in the configuration shown and described in FIG. 3F albeit with a single-layered thermoplastic bag. Specifically, FIG. 3H illustrates the sidewall 300h, which is similar to the sidewall 300f of FIG. 3F, except without the second layer 304. FIG. 3H shows the first reinforcement layer 308a of the grab-zone reinforcement structure 306 forming a first, innermost reinforcing ply bounding the hem channel 314 such that the first reinforcement layer 308a is positioned proximate to the draw tape 312 between attachment points 315b, 315d at the hem seal 316. The first layer 302 forms a second, outer ply bounding the hem channel 314 between attachment points 315a, 315e at the hem seal 316.

In addition, the sidewall 300h of FIG. 3H comprises the grab-zone reinforcement structure 306 as additional reinforcement to an inside surface of the reinforced thermoplastic bag (e.g., the inner surface of the first layer 302) at the grab-zone 320. For example, the first reinforcement layer 308a of the grab-zone reinforcement structure 306 extends away from attachment point 315d at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured at attachment point 315c by the hem seal 316 between attachment points 315b, 315d for the first reinforcement layer 308a. Thus, like the sidewall 300f, the end portion 309 of the second reinforcement layer 308b in FIG. 3H is positioned as the innermost layer of the hem channel 314.

Still further, FIG. 3I illustrates a grab-zone reinforcement structure 306 with the configuration of the one shown and described in relation to FIG. 3C albeit in use with bag-in-bag or multi-layered thermoplastic bag. Specifically, FIG. 3I illustrates the sidewall 300i comprising the grab-zone reinforcement structure 306 as a reinforcement layer over both the first layer 302 and the second layer 304 for the hem channel region 318. In particular, FIG. 3I shows the first layer 302 forming a first, innermost ply bounding the hem channel 314 such that the first layer 302 is positioned proximate to the draw tape 312 between attachment points 315d, 315e at the hem seal 316. The second layer 304 forms a second, middle ply bounding the hem channel 314 between attachment points 315c, 315f at the hem seal 316. In addition, the first reinforcement layer 308a of the grab-zone reinforcement structure 306 forms a third, outer reinforcing ply bounding the hem channel 314 between attachment points 315b, 315g at the hem seal 316.

In addition, the sidewall 300i of FIG. 3I comprises the grab-zone reinforcement structure 306 as additional reinforcement to an outside surface of the reinforced thermoplastic bag (e.g., an outer surface of the second layer 304) at the grab-zone 320. For example, the first reinforcement layer 308a of the grab-zone reinforcement structure 306 extends away from attachment point 315b at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured at attachment point 315a by the hem seal 316 next to the attachment point 315b for the first reinforcement layer 308a.

Figure 3J:
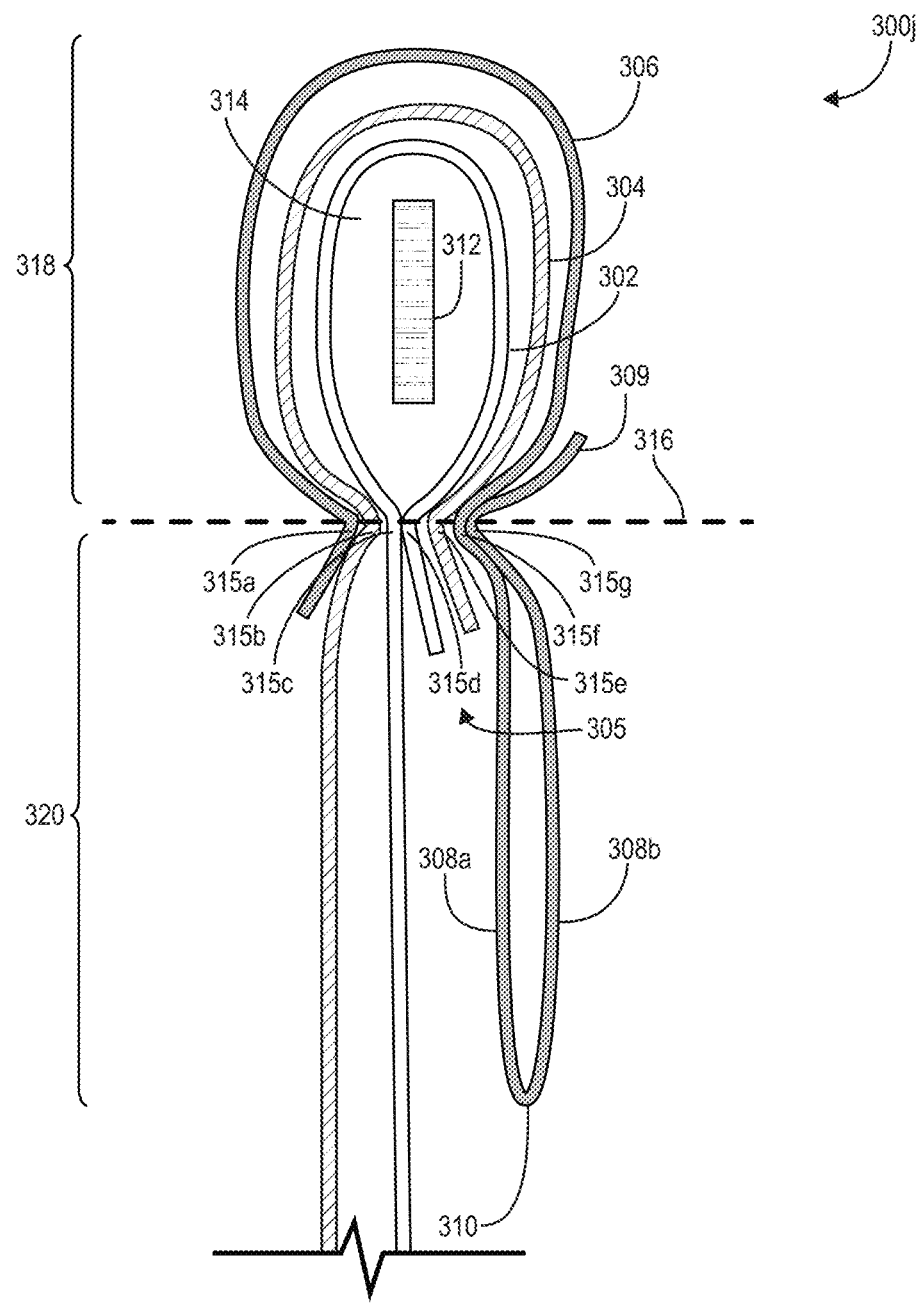

Still further, FIG. 3J illustrates a grab-zone reinforcement structure 306 with the configuration of the one shown and described in relation to FIG. 3D albeit in use with bag-in-bag or multi-layered thermoplastic bag. In particular, FIG. 3J illustrates the sidewall 300j comprising the grab-zone reinforcement structure 306 as a reinforcement layer over both the first layer 302 and the second layer 304 for the hem channel region 318. FIG. 3J shows the first layer 302 forming a first, innermost ply bounding the hem channel 314 such that the first layer 302 is positioned proximate to the draw tape 312 between attachment points 315c, 315d at the hem seal 316. The second layer 304 forms a second, middle ply bounding the hem channel 314 between attachment points 315b, 315e at the hem seal 316. In addition, the first reinforcement layer 308a of the grab-zone reinforcement structure 306 forms a third, outer reinforcing ply bounding the hem channel 314 between attachment points 315a, 315f at the hem seal 316.

In addition, the sidewall 300j of FIG. 3J comprises the grab-zone reinforcement structure 306 as additional reinforcement to an inside surface of the reinforced thermoplastic bag (e.g., an inner surface of the first layer 302) at the grab-zone 320. For example, the first reinforcement layer 308a of the grab-zone reinforcement structure 306 extends away from attachment point 315f at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 where the end portion 309 is secured at attachment point 315g by the hem seal 316 next to the attachment point 315f for the first reinforcement layer 308a.

Figure 3K:
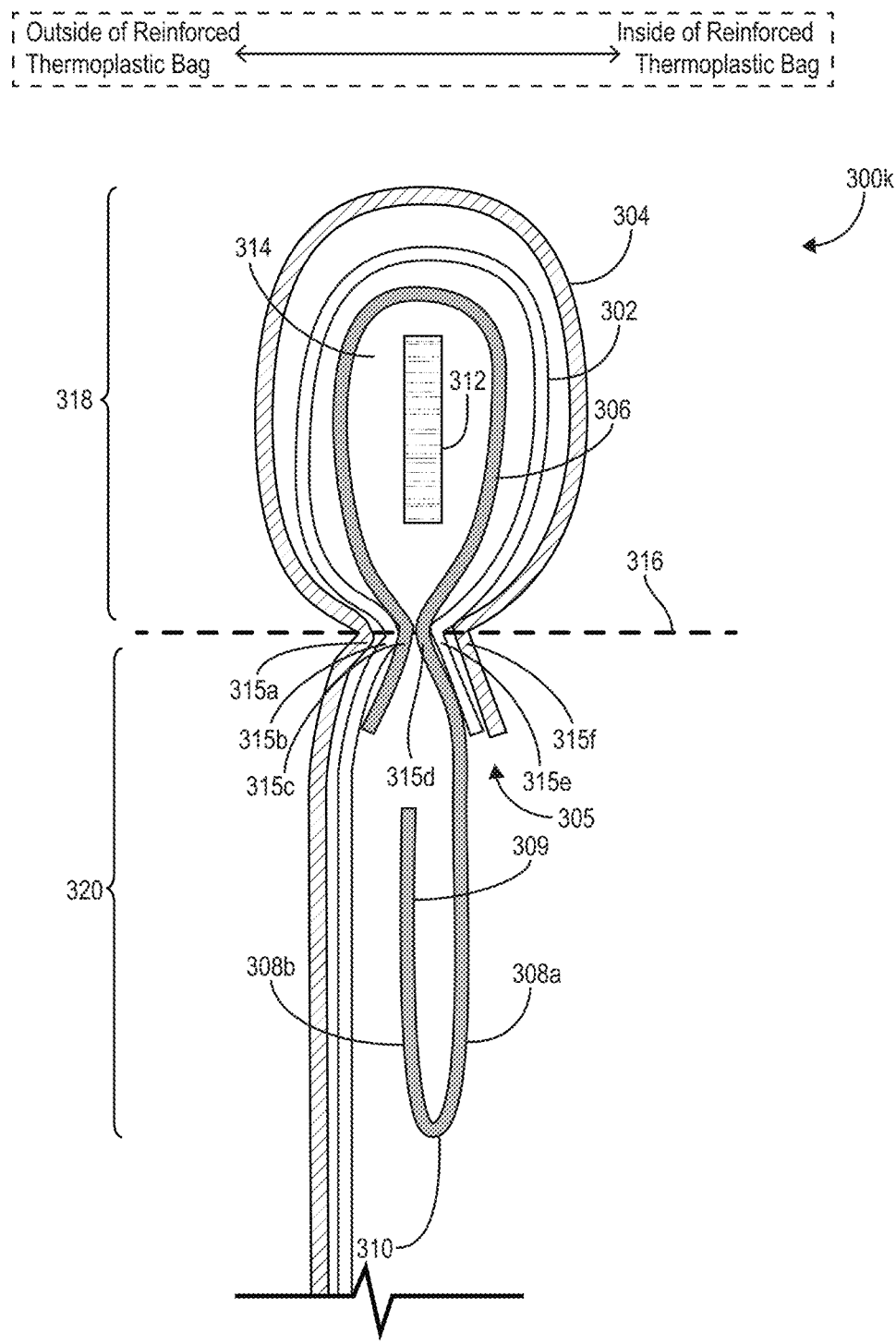
Figure 3L:
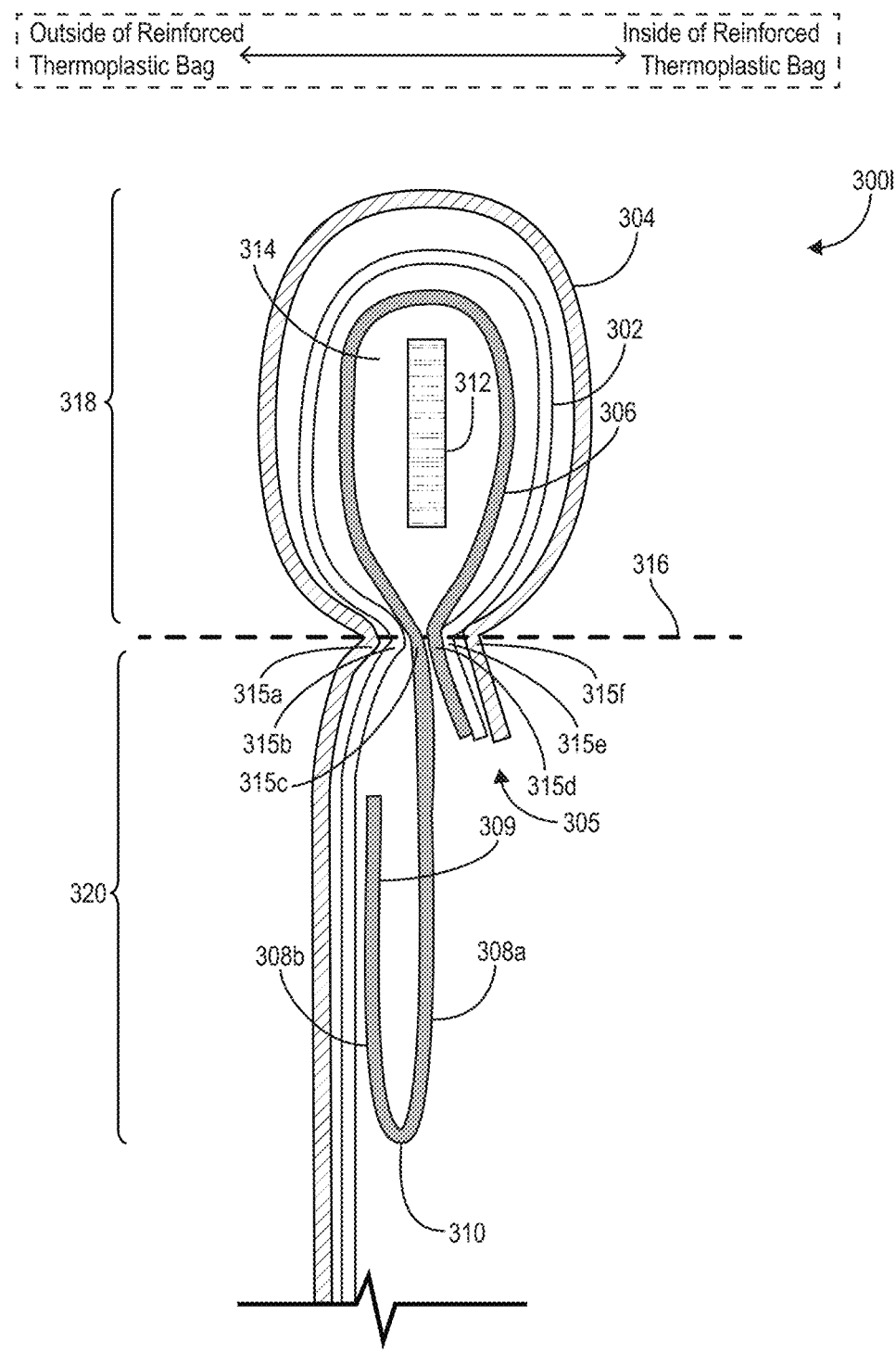

FIGS. 3A-3J illustrate implementations include a grab-zone reinforcement structure 306 fully folded in the grab-zone such that the folded end portion 309 of the grab-zone reinforcement structure 306 extends to and is secured by the hem seal 316. Such a configuration ensures that the entire grab-zone includes two reinforcement layers. In contrast, FIG. 3K illustrates an embodiment with a partially folded grab-zone reinforcement structure 306. Specifically, FIG. 3K illustrates the sidewall 300k comprising the grab-zone reinforcement structure 306 as a reinforcement layer underneath both the first layer 302 and the second layer 304 for the hem channel region 318. In particular, FIG. 3K shows the first reinforcement layer 308a for the grab-zone reinforcement structure 306 forming a first, innermost reinforcing ply bounding the hem channel 314 such that the first reinforcement layer 308a is positioned proximate to the draw tape 312 between attachment points 315c, 315d at the hem seal 316. The first layer 302 forms a second, middle ply bounding the hem channel 314 between attachment points 315b, 315e at the hem seal 316. In addition, the second layer 304 forms a third, outer ply bounding the hem channel 314 between attachment points 315a, 315f at the hem seal 316.

In addition, the sidewall 300k of FIG. 3K comprises the grab-zone reinforcement structure 306 as additional reinforcement to an inside surface of the reinforced thermoplastic bag (e.g., an inner surface of the first layer 302) at the grab-zone 320. For example, the first reinforcement layer 308a of the grab-zone reinforcement structure 306 extends away from attachment point 315d at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 such that the second reinforcement layer 308b is positioned between the first reinforcement layer 308a and the inner surface of the first layer 302.

However as mentioned, different from FIGS. 3A-3J, the end portion 309 of the second reinforcement layer 308b does not extend the full distance back to the hem seal 316 and is therefore not secured at the hem seal 316. Rather, the end portion 309 is positioned between the fold 310 and the hem seal 316 such that the second reinforcement layer 308b provides an adjustable amount of dual-ply reinforcement. While FIG. 3K illustrates the second reinforcement layer 308b extending almost the entire way from the fold 310 to the hem seal, in alternative embodiments, the second reinforcement layer 308b extends less than the entire way. For example, the second reinforcement layer 308b can terminate at the fold such that the grab-zone reinforcement structure 306 provides a single layer of reinforcement in the grab-zone 320. Alternatively, the second reinforcement layer 308b extends 10%, 20%, 30%, 40%, 50%, 60%, 70% 80%, 90%, or amounts therebetween, of the distance from the fold 310 to the hem seal 316.

Figure 3M:
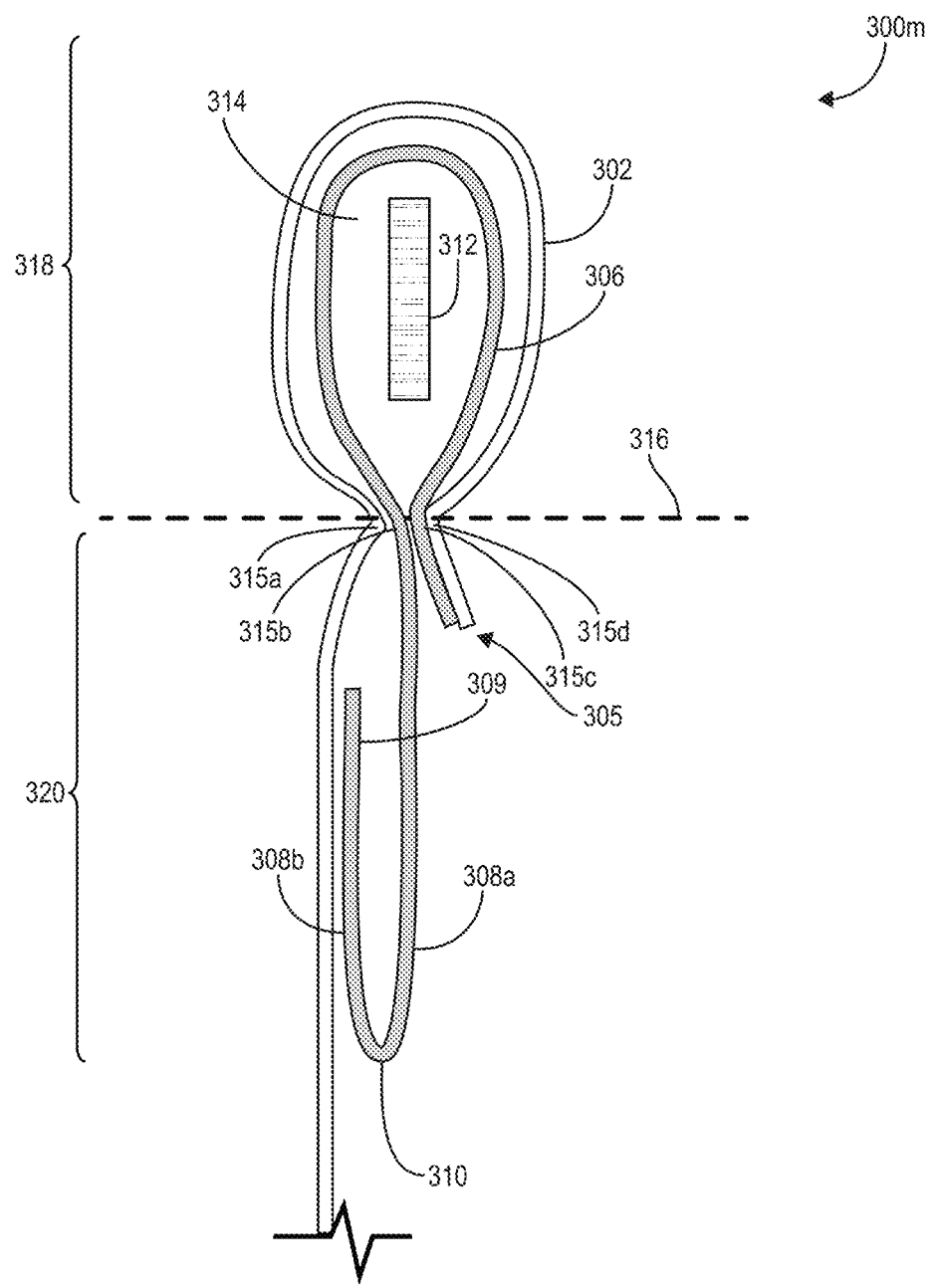

Similar to FIG. 3K, FIGS. 3L and 3M illustrate partially folded grab-zone reinforcement structures 306. For example, FIG. 3L illustrates the sidewall 300l comprising the grab-zone reinforcement structure 306 as a reinforcement layer underneath both the first layer 302 and the second layer 304 for the hem channel region 318. In particular, FIG.

3L shows the first reinforcement layer 308a for the grab-zone reinforcement structure 306 forming a first, innermost reinforcing ply bounding the hem channel 314 such that the first reinforcement layer 308a is positioned proximate to the draw tape 312 between attachment points 315c, 315d at the hem seal 316. The first layer 302 forms a second, middle ply bounding the hem channel 314 between attachment points 315b, 315e at the hem seal 316. In addition, the second layer 304 forms a third, outer ply bounding the hem channel 314 between attachment points 315a, 315f at the hem seal 316.

In addition, the sidewall 300l of FIG. 3L comprises the grab-zone reinforcement structure 306 as additional reinforcement to an inside surface of the reinforced thermoplastic bag (e.g., an inner surface of the first layer 302) at the grab-zone 320. For example, the first reinforcement layer 308a of the grab-zone reinforcement structure 306 extends away from attachment point 315c at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 such that the second reinforcement layer 308b is positioned between the first reinforcement layer 308a and the inner surface of the first layer 302.

Additionally, as with the sidewall 300k of FIG. 3K, the end portion 309 of the second reinforcement layer 308b does not extend the full distance back to the hem seal 316 and is therefore not secured at the hem seal 316. Rather, the end portion 309 of the sidewall 300l is positioned between the fold 310 and the hem seal 316 such that the second reinforcement layer 308b provides an adjustable amount of dual-ply reinforcement.

Turning now to FIG. 3M, an embodiment with a partially folded grab-zone reinforcement structure 306 with a single layer thermoplastic bag is shown. In particular, FIG. 3M illustrates the sidewall 300m, which is similar to the sidewall 300l of FIG. 3L, except without the second layer 304. FIG. 3M shows the first reinforcement layer 308a of the grab-zone reinforcement structure 306 forming a first, innermost reinforcing ply bounding the hem channel 314 such that the first reinforcement layer 308a is positioned proximate to the draw tape 312 between attachment points 315b, 315c at the hem seal 316. The first layer 302 forms a second, outer ply bounding the hem channel 314 between attachment points 315a, 315d at the hem seal 316.

In addition, the sidewall 300m of FIG. 3M comprises the grab-zone reinforcement structure 306 as additional reinforcement to an inside surface of the reinforced thermoplastic bag (e.g., an inner surface of the first layer 302) at the grab-zone 320. For example, the first reinforcement layer 308a of the grab-zone reinforcement structure 306 extends away from attachment point 315b at the hem seal 316 to the fold 310 where the second reinforcement layer 308b of the grab-zone reinforcement structure 306 folds onto the first reinforcement layer 308a. From the fold 310, the second reinforcement layer 308b extends back towards the hem seal 316 such that the second reinforcement layer 308b is positioned between the first reinforcement layer 308a and the inner surface of the first layer 302.

Additionally, as with the sidewalls 300k-300l of FIGS. 3K-3L, the end portion 309 of the second reinforcement layer 308b does not extend the full distance back to the hem seal 316 and is therefore not secured at the hem seal 316. Rather, the end portion 309 of the sidewall 300l is positioned between the fold 310 and the hem seal 316 such that the second reinforcement layer 308b provides an adjustable amount of dual-ply reinforcement. In one or more embodiments, one or more portions of the second reinforcement layer 308b as mentioned above may be secured to the inside surface of the reinforced thermoplastic bag (e.g., the inner surface of the first layer 302) using one or more bonds as described above in relation to the plurality of non-continuous bonds 150 of FIGS. 1-2. For example, in one or more embodiments, the end portion 309 (and optionally the first reinforcement layer 308a, and the second reinforcement layer 308b) is secured to the layer(s) of the sidewall via one or more non-continuous bonds such as ring rolling bonds, SELFing bonds, contact areas, adhesive bonds, pressure bonds, etc.

While FIGS. 3A-3M, illustrate grab-zone reinforcement structures 306 that are folded to provide two layers of reinforcement or between one and two layers of reinforcement, the present invention is not so limited. For example, in one or more embodiments, the grab-zone reinforcement structure is folded twice to provide three layers of reinforcement, folded three times to provide four layers of reinforcement, or folded more times to provide more than four layers of reinforcement. In still further implementations, the grab-zone reinforcement structure is not folded and provides a single layer of reinforcement.

Figure 3N:
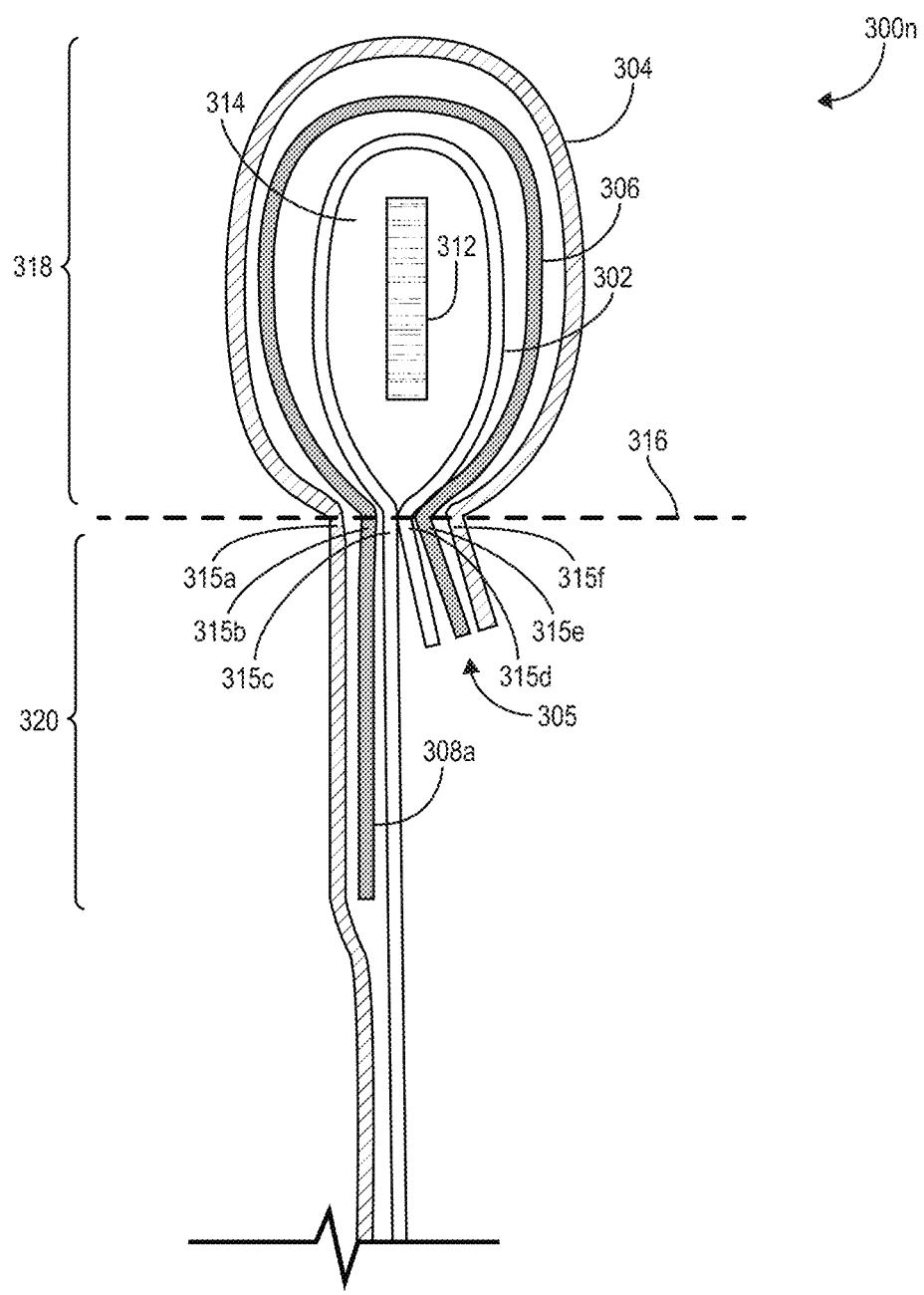
Figure 30:
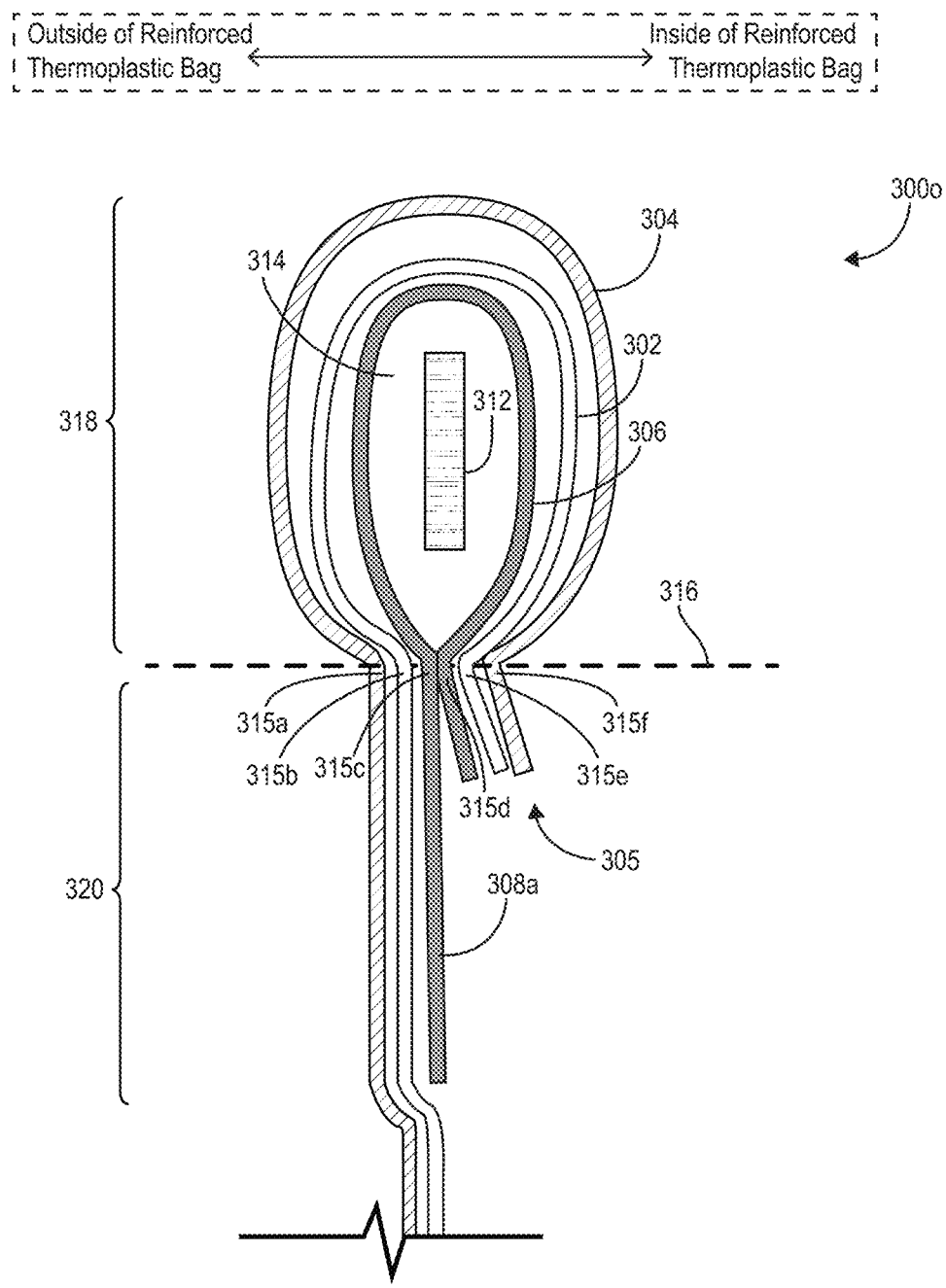

For example, FIG. 3N illustrates a grab-zone reinforcement structure that provides a single layer of reinforcement in the grab-zone 320. In particular, FIG. 3N illustrates the sidewall 300n comprising the grab-zone reinforcement structure 306 positioned between the first layer 302 and the second layer 304 for both the hem channel region 318 and the grab-zone 320. In particular, FIG. 3N shows the first reinforcement layer 308a reinforcing the hem channel region 318 in between the first layer 302 and the second layer 304 by extending around the hem channel 314 between attachment points 315b, 315e at the hem seal 316. In this case, the first layer 302 forms a first, innermost ply bounding the hem channel 314 such that the first layer 302 is positioned proximate to the draw tape 312 between attachment points 315c, 315d at the hem seal 316. The first reinforcement layer 308a forms a second, reinforcing middle ply bounding the hem channel 314 between attachment points 315b, 315e at the hem seal 316. In addition, the second layer 304 forms a third, outer ply bounding the hem channel 314 between attachment points 315a, 315f at the hem seal 316.

Further, FIG. 3N shows the sidewall 300n includes the grab-zone reinforcement structure 306 extending across the grab-zone 320 for additional reinforcement. In particular, the first reinforcement layer 308a of the grab-zone reinforcement structure 306 extends away from attachment point 315b the hem seal 316 (e.g., towards a closed bottom edge, not shown). Thus, as mentioned and as different from FIGS. 3A-3M, the sidewall 300n comprises no fold 310 in the grab-zone reinforcement structure 306. Thus, the grab-zone reinforcement structure 306 provides only single-ply reinforcement at one or both of the hem channel region 318 or the grab-zone 320 of a reinforced thermoplastic bag.

Figure 3P:
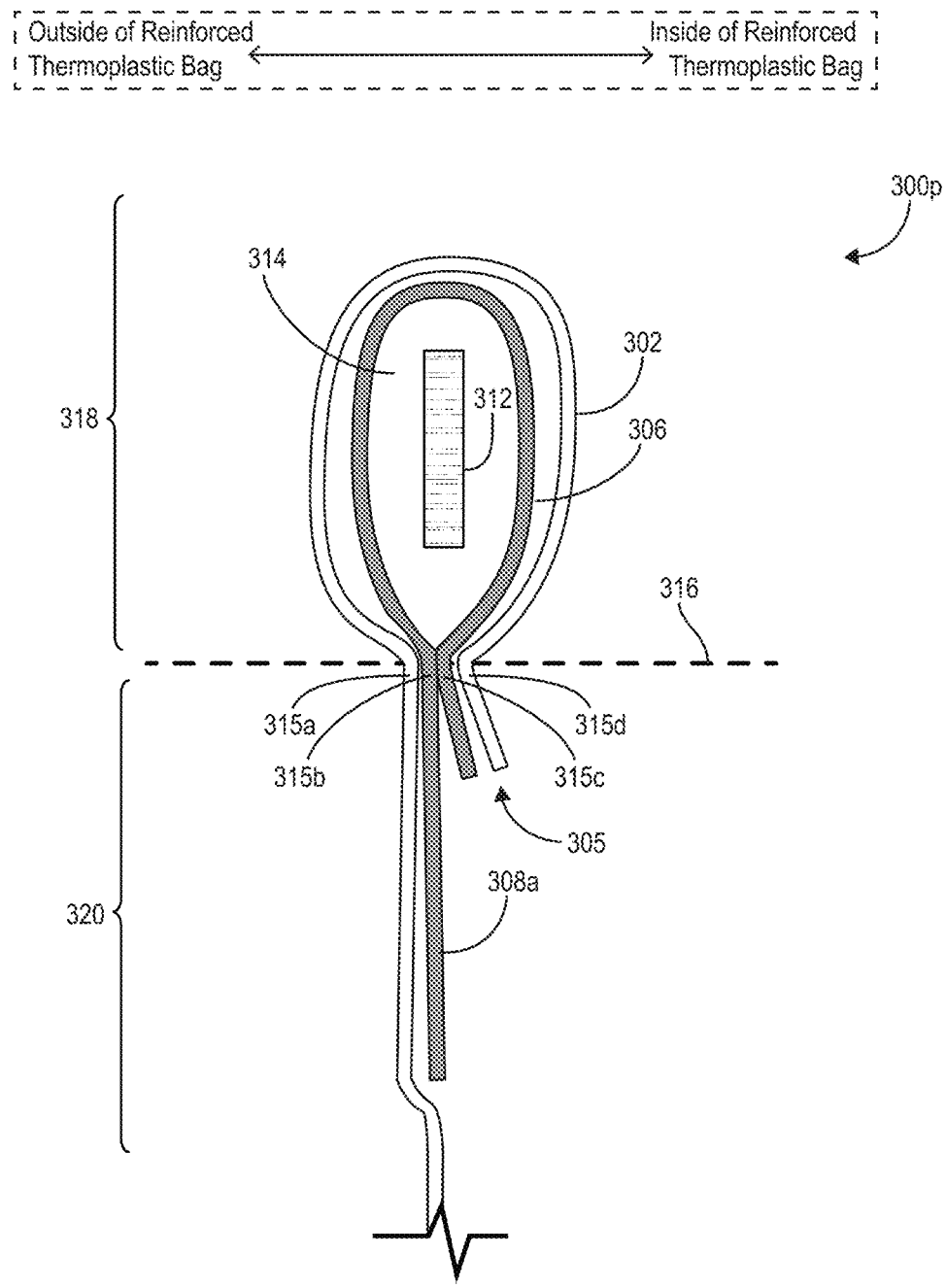

FIGS. 3O and 3P are similar to FIG. 3N in that they include a grab-zone reinforcement structure 306 without a fold that provides a single layer of reinforcement in the grab-zone 320. FIG. 3O differs from FIG. 3N in that the grab-zone reinforcement structure 306 is positioned inside of the sidewall rather than between the layers of the sidewall in the grab-zone and hem channel 314. FIG. 3P on the other hand includes grab-zone reinforcement structure 306 without a fold that provides a single layer of reinforcement in the grab-zone 320 within a single layer bag rather than a multi-layered bag as shown in FIG. 3N.

Specifically, FIG. 3O illustrates the sidewall 300o comprising the grab-zone reinforcement structure 306 positioned underneath both the first layer 302 and the second layer 304 for the hem channel region 318. In particular, FIG. 3O shows the first reinforcement layer 308a reinforcing the hem channel region 318 underneath the first layer 302 and the second layer 304 by extending around the hem channel 314 between attachment points 315c, 315d at the hem seal 316. In this case, the first reinforcement layer 308a of the grab-zone reinforcement structure 306 forms a first, innermost reinforcement ply bounding the hem channel 314 such that the first reinforcement layer 308a is positioned proximate to the draw tape 312 between attachment points 315c, 315d at the hem seal 316. The first layer 302 forms a second, middle ply bounding the hem channel 314 between attachment points 315b, 315e at the hem seal 316. In addition, the second layer 304 forms a third, outer ply bounding the hem channel 314 between attachment points 315a, 315f at the hem seal 316.

Further, FIG. 3O shows the sidewall 300o includes the grab-zone reinforcement structure 306 extending across the grab-zone 320 for additional reinforcement at an inside surface of the reinforced thermoplastic bag (e.g., an inner surface of the first layer 302). In particular, the first reinforcement layer 308a of the grab-zone reinforcement structure 306 extends away from attachment point 315c at the hem seal 316 (e.g., towards a closed bottom edge, not shown).

Similarly, FIG. 3P illustrates the sidewall 300p comprising the grab-zone reinforcement structure 306 positioned underneath the first layer 302 for the hem channel region 318. However, the second layer 304 is omitted in the sidewall 300p. In particular, FIG. 3P shows the first reinforcement layer 308a reinforcing the hem channel region 318 underneath the first layer 302 by extending around the hem channel 314 between attachment points 315b, 315c at the hem seal 316. In this case, the first reinforcement layer 308a of the grab-zone reinforcement structure 306 forms a first, innermost reinforcement ply bounding the hem channel 314 such that the first reinforcement layer 308a is positioned proximate to the draw tape 312 between attachment points 315b, 315c at the hem seal 316. The first layer 302 forms a second, outer ply bounding the hem channel 314 between attachment points 315a, 315d at the hem seal 316.

In addition, FIG. 3P shows the sidewall 300p includes the grab-zone reinforcement structure 306 extending across the grab-zone 320 for additional reinforcement at an inside surface of the reinforced thermoplastic bag (e.g., an inner surface of the first layer 302). In particular, the first reinforcement layer 308a of the grab-zone reinforcement structure 306 extends away from attachment point 315b at the hem seal 316 (e.g., towards a closed bottom edge, not shown).

Figure 3Q:
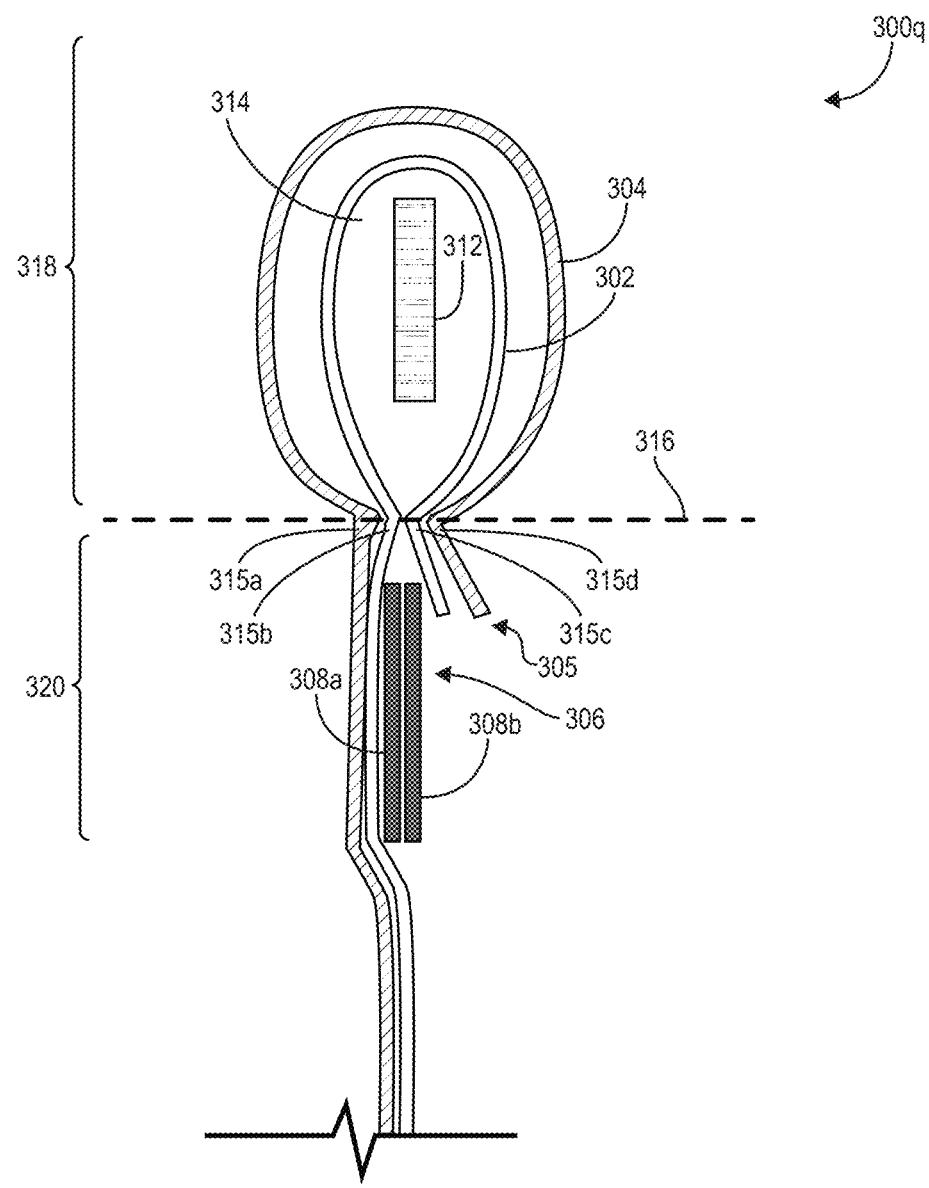

FIGS. 3A-3P illustrate grab-zone reinforcement structures that reinforce both the hem channel 314 and the grab-zone 320. The present invention, however, is not so limited. As previously mentioned, in one or more embodiments, the grab-zone reinforcement structure reinforces just the grab-zone 320. For example, FIGS. 3Q-3W and FIGS. 3Z-3AA illustrate embodiments in which the grab-zone reinforcement structure 306 reinforces the only the grab-zone. In particular, FIG. 3Q illustrates the sidewall 300q comprising no grab-zone reinforcement structure 306 in the hem channel region 318. In particular, FIG. 3Q shows the first layer 302 forming a first, innermost ply bounding the hem channel 314 such that the first layer 302 is positioned proximate to the draw tape 312 between attachment points 315b, 315c at the hem seal 316. The second layer 304 forms a second, outer ply bounding the hem channel 314 between attachment points 315a, 315d at the hem seal 316.

In addition, the sidewall 300q of FIG. 3Q comprises the grab-zone reinforcement structure 306 as additional reinforcement to an inside surface of the reinforced thermoplastic bag (e.g., an inner surface of the first layer 302) at the grab-zone 320. However, different from the foregoing embodiments, the grab-zone reinforcement structure 306 of FIG. 3Q comprises separate, discrete layers (e.g., the first reinforcement layer 308a and the second reinforcement layer 308b). For example, both the first reinforcement layer 308a and the second reinforcement layer 308b of the grab-zone reinforcement structure 306 extend a configurable distance (or different configurable distances) from below the hem seal 316 down towards a closed bottom edge (not shown). While FIG. 3Q illustrates the grab-zone reinforcement structure 306 comprising two separate layers (first reinforcement layer 308a and second reinforcement layer 308b), in alternative implementations the grab-zone reinforcement structure 306 comprises a single layer partially folded, folded in half, folded multiple times, and/or folded at multiple ends.

In certain embodiments, the first reinforcement layer 308a and the second reinforcement layer 308b comprise differing colors to provide a different appearance compared to other portions of the sidewall 300q. Indeed, as mentioned above, a different colored portion in the grab-zone 320 (such as a consumer-preferred color of grey) can provide visual cues to the consumer that the grab-zone 320 is provided additional strength and reinforcement. For instance, in certain implementations, the first reinforcement layer 308a comprises a black-colored ply, and the second reinforcement layer 308b comprises a white-colored ply. Together, the first reinforcement layer 308a and the second reinforcement layer 308b of the grab-zone reinforcement structure 306 form a visibly gray portion of the sidewall 300q at an inside surface of the reinforced thermoplastic bag. Alternatively, other color variations may apply to the first reinforcement layer 308a and/or the second reinforcement layer 308b as desired.

Additionally shown, FIG. 3Q illustrates the grab-zone reinforcement structure 306 positioned below the hem seal 316. As such, in the embodiment of FIG. 3Q, the grab-zone reinforcement structure 306 is not secured to the sidewall at the hem seal 316. The grab-zone reinforcement structure 306 of FIG. 3Q can be secured to the sidewall at the side seals (see e.g., side seals 154, 156 of FIG. 1). Alternatively, the grab-zone reinforcement structure 306 is not secured to the sidewall by the side seals. In embodiments where the grab-zone reinforcement structure 306 is not secured to the sidewall by either the hem seal 316 or the side seals, the grab-zone reinforcement structure 306 can be secured to the sidewall after formation of the hem seal 316 and the side seals. In such embodiments, the grab-zone reinforcement structure 306 can be secured to the sidewalls by one or more bonds. In particular, in one or more embodiments, one or more portions of the first reinforcement layer 308a and/or the second reinforcement layer 308b as mentioned above may be secured to each other and the inside surface of the reinforced thermoplastic bag (e.g., the inner surface of the first layer 302) using one or more bonds as described above in relation to the plurality of non-continuous bonds 150 of FIGS. 1-2.

Figure 3R:
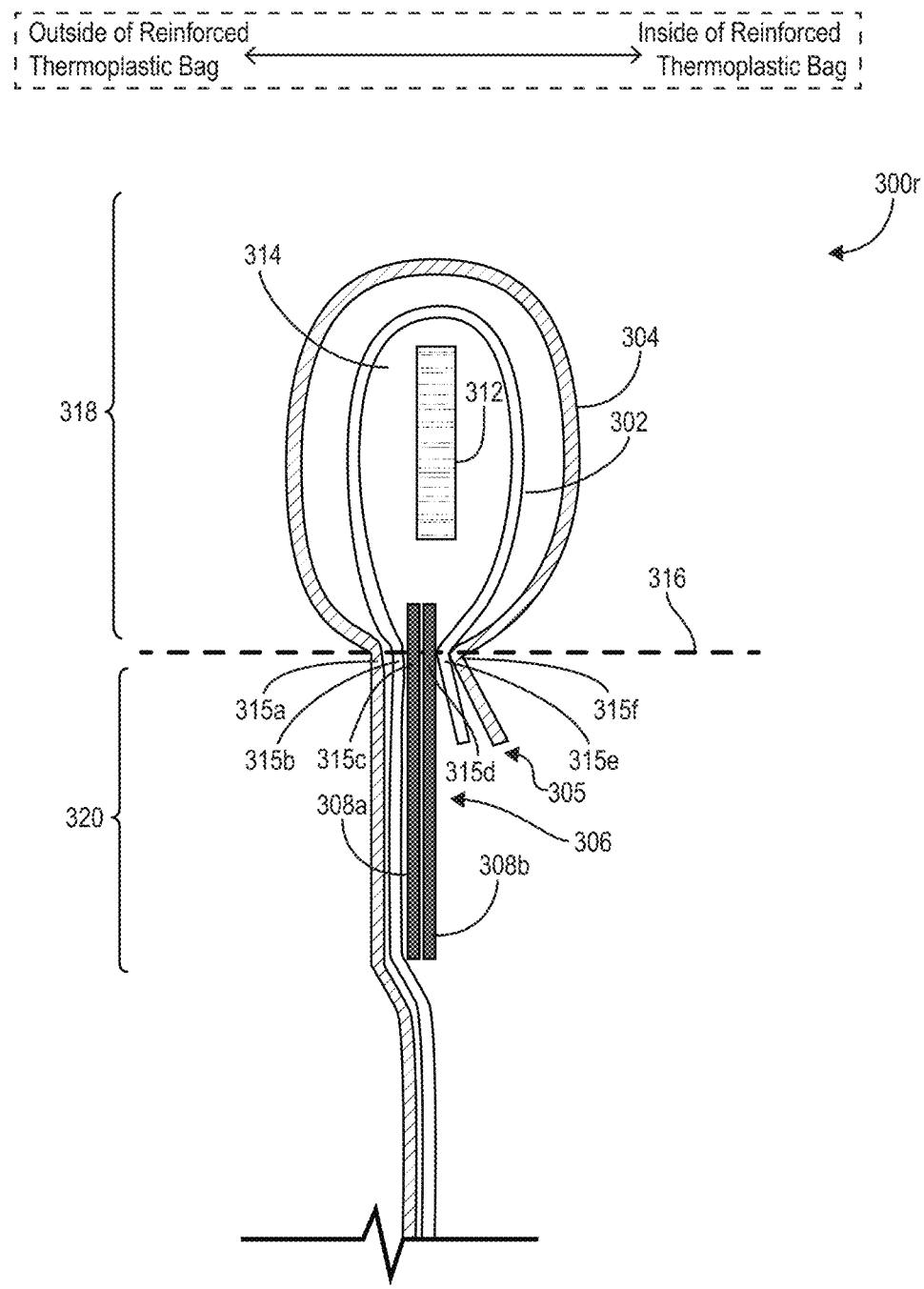
Figure 3S:
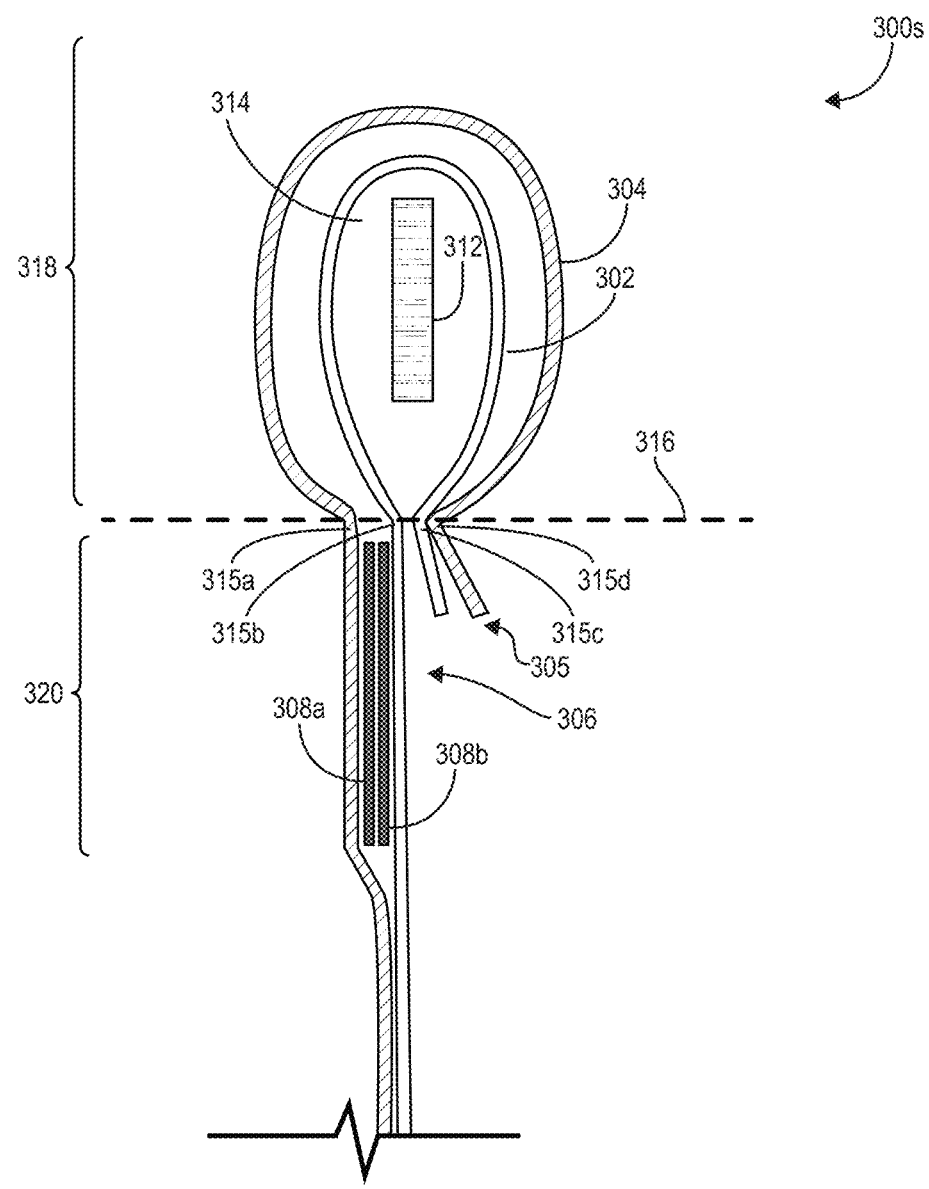

In alternative implementations the grab-zone reinforcement structure 306 is secured to the sidewall via the hem seal 316 while still only reinforcing the grab-zone 320 and not the hem channel 314 as shown in FIG. 3R. In particular, FIG. 3R similarly illustrates the sidewall 300r without reinforcement of the grab-zone reinforcement structure 306 in the hem channel region 318. In particular, FIG. 3R shows the first layer 302 forming a first, innermost ply bounding the hem channel 314 such that the first layer 302 is positioned proximate to the draw tape 312 between attachment points 315b, 315e at the hem seal 316. The second layer 304 forms a second, outer ply bounding the hem channel 314 between attachment points 315a, 315f at the hem seal 316.

In addition, the sidewall 300r of FIG. 3R comprises the grab-zone reinforcement structure 306 as additional reinforcement to an inside surface of the reinforced thermoplastic bag (e.g., an inner surface of the first layer 302) at the grab-zone 320. Further, as with the sidewall 300q of FIG. 3Q, the grab-zone reinforcement structure 306 of FIG. 3R comprises separate, discrete layers (e.g., the first reinforcement layer 308a and the second reinforcement layer 308b). Unlike FIG. 3Q, however, both the first reinforcement layer 308a and the second reinforcement layer 308b of the grab-zone reinforcement structure 306 extend a configurable distance (or different configurable distances) from respective attachment points 315c, 315d at the hem seal 316 down towards a closed bottom edge (not shown). Accordingly, in one or more embodiments, multiple discrete layers of the grab-zone reinforcement structure 306 are attached at the hem seal 316.

As mentioned above, in certain embodiments a reinforced thermoplastic bag comprises a grab-zone reinforcement structure that includes one or more layers of the grab-zone reinforcement structure 306 applied to the inside surface of the sidewall (e.g., as shown in FIGS. 3Q-3R). Similarly, in one or more embodiments, layer(s) of the grab-zone reinforcement structure 306 can also be applied in between plies as shown in FIG. 3S. In particular, FIG. 3S illustrates the sidewall 300s with the first reinforcement layer 308a and the second reinforcement layer 308b of the grab-zone reinforcement structure 306 positioned in between the first layer 302 and the second layer 304. Also different from FIG. 3R, the sidewall 300s illustrates the first reinforcement layer 308a and the second reinforcement layer 308b positioned only in the grab-zone 320 below the hem seal 316. Specifically, the first reinforcement layer 308a and the second reinforcement layer 308b are positioned in between plies below the hem seal 316 where the second layer 304 and the first layer 302 are attached at respective attachment points 315a, 315b. The fold-over of the top edge 305 is likewise secured via the hem seal 316 at attachment points 315c, 315d.

In the configuration of FIG. 3S, the sidewall 300s can provide numerous color variations to provide visual cues of reinforcement at the grab-zone 320. For example, where one or both of the first layer 302 or the second layer 304 are translucent, the first reinforcement layer 308a and the second reinforcement layer 308b as both white-colored strips can impart a visibly-increased brightness or whiteness at the grab-zone 320 when viewed from outside or inside of the reinforced thermoplastic bag.

Alternatively, in certain implementations, the first reinforcement layer 308a and the second reinforcement layer 308b are different colors to create the appearance of a particular color pigmentation for a specific viewing perspective. For instance, to create a relatively light grey pigmentation at the grab-zone 320 from an outside viewing perspective, the first reinforcement layer 308a may be white and the second reinforcement layer 308b may be black. In this same configuration, the inside viewing perspective of the grab-zone 320 may be a darker grey pigmentation. On the other hand, to create a relatively light grey pigmentation from an inside viewing perspective, the first reinforcement layer 308a may be black and the second reinforcement layer 308b may be white. Contrary, in this same configuration, the outside viewing perspective of the grab-zone 320 may be a darker grey pigmentation. In other embodiments, myriad other color combinations are within the scope of the present disclosure.

Figure 3T:
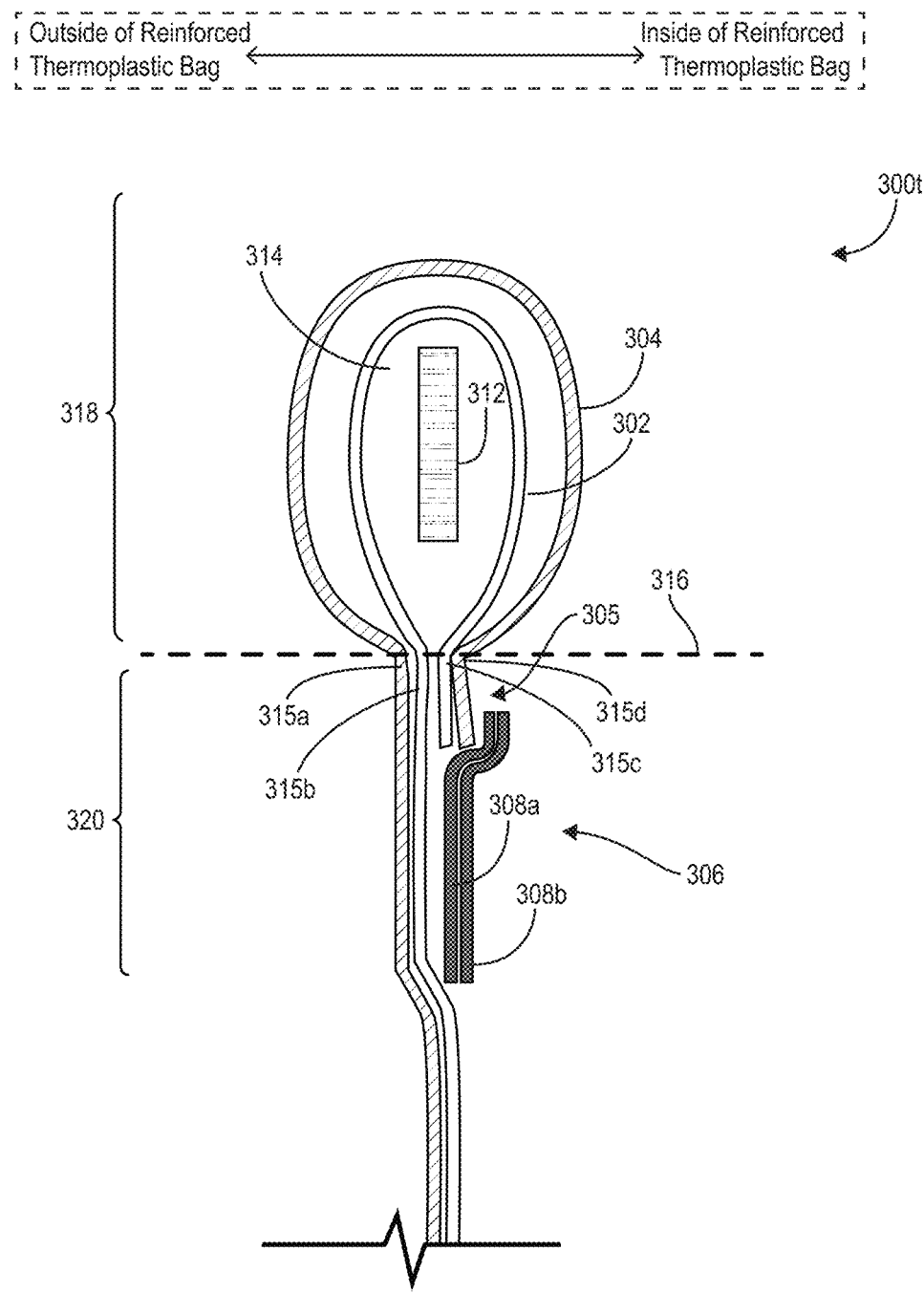

In yet another variation to FIGS. 3Q-3S depicting multiple layers of reinforcement in the grab-zone reinforcement structure 306, FIG. 3T shows the sidewall 300t comprising the first reinforcement layer 308a and the second reinforcement layer 308b attached to the inside surface of the reinforced thermoplastic bag. However, different from FIG. 3Q in particular, FIG. 3T illustrates the first reinforcement layer 308a and the second reinforcement layer 308b positioned in a manner to overlap the hem skirt (i.e., the portion of the fold-over of the top edge 305 that extends below the hem seal 316). Indeed, as shown in FIG. 3T, the first reinforcement layer 308a and the second reinforcement layer 308b are laminated to the inside surface of the first layer 302 below the hem skirt as well as the inside surface of the second layer 304 partially comprising the hem skirt. In alternative embodiments not shown, the first reinforcement layer 308a and the second reinforcement layer 308b overlap one or more layers of the hem skirt but not all (e.g., by overlapping the first layer 302 but not the second layer 304). Further, in other embodiments, (e.g., single-ply embodiments not shown in FIG. 3T), the first reinforcement layer 308a and the second reinforcement layer 308b can likewise overlap the hem skirt of a single ply.

By implementing such a configuration as shown in FIG. 3T, the sidewall 300t imparts at least a couple of advantages to the reinforced thermoplastic bag. For example, the first reinforcement layer 308a and the second reinforcement layer 308b can secure the hem skirt in such a way as to improve the strength of the hem seal 316 as indicated in experimental results in hem-pull tests. In addition, the first reinforcement layer 308a and the second reinforcement layer 308b can provide an aesthetic advantage by hiding the fold-over of the top edge 305 that in some cases includes mis-matched ply edges that would otherwise be visible at the hem skirt. For instance, the fold-over of the top edge 305 may include the first layer 302 being longer than the second layer 304 in the hem skirt. In such a case, the first reinforcement layer 308a and the second reinforcement layer 308b covers the differing lengths of the hem skirt for greater aesthetic appeal and quality assurance.

Figure 3U:
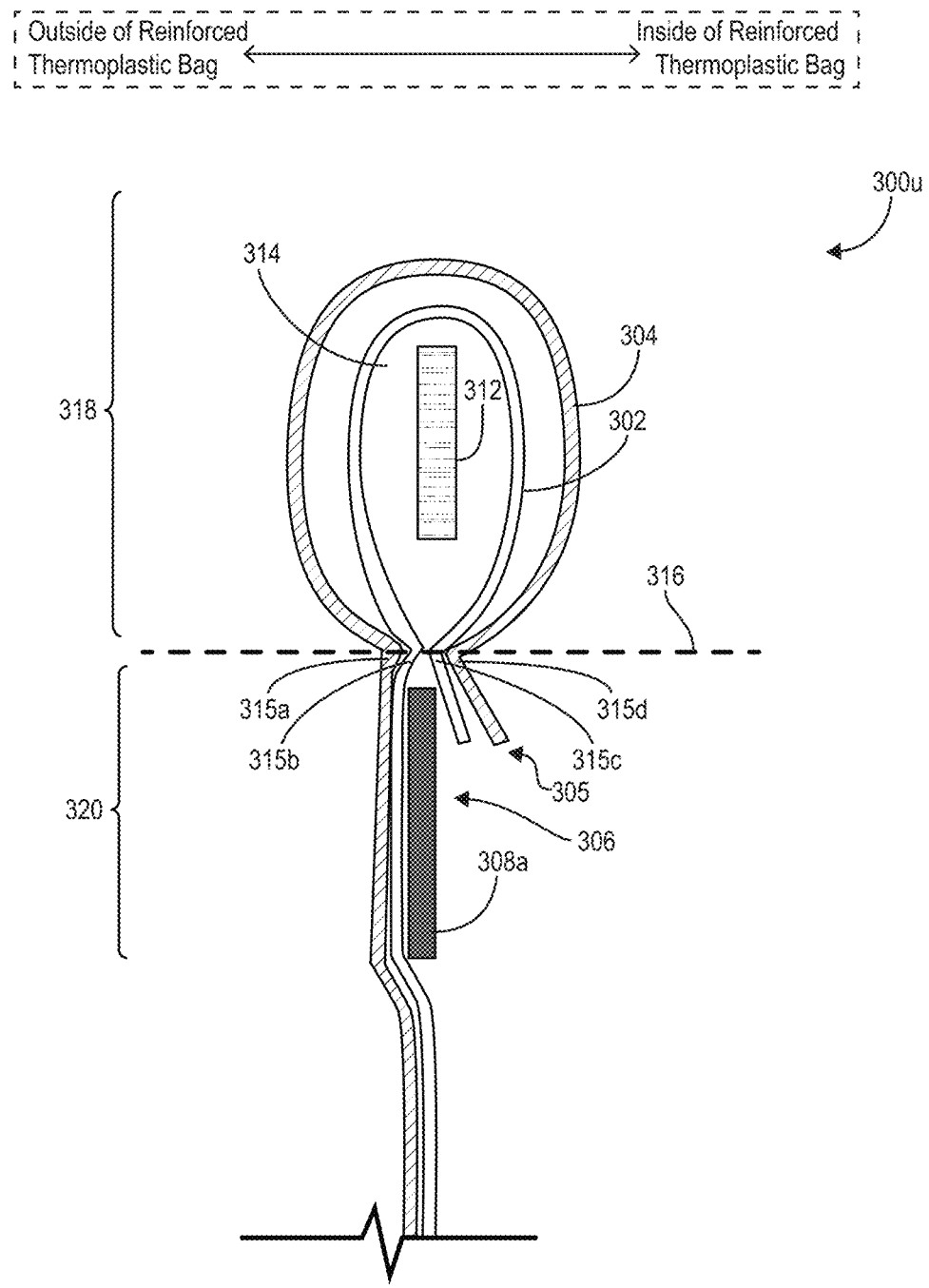

While FIGS. 3Q-3T illustrate grab-zone reinforcement structures 306 comprising two layers, in one or more embodiments, the grab-zone reinforcement structure 306 reinforces the grab-zone with a single layer as shown in FIG. 3U. In particular, FIG. 3U illustrates a single layer grab-zone reinforcement structure 306. Specifically, the sidewall 300u of FIG. 3U comprises a grab-zone reinforcement structure 306 as additional reinforcement to an inside surface of the reinforced thermoplastic bag (e.g., an inner surface of the first layer 302) at the grab-zone 320. As further shown, the grab-zone reinforcement structure 306 of FIG. 3U comprises a first reinforcement layer 308a of greater thickness compared to the layers of the sidewall 300u. Accordingly, in one or more embodiments, the grab-zone reinforcement structure 306 comprises one or more layers of a configurable thickness (e.g., for increased reinforcement). In addition, the first reinforcement layer 308a of the grab-zone reinforcement structure 306 extends a configurable distance from below the hem seal 316 down towards a closed bottom edge (not shown).

Figure 3V:
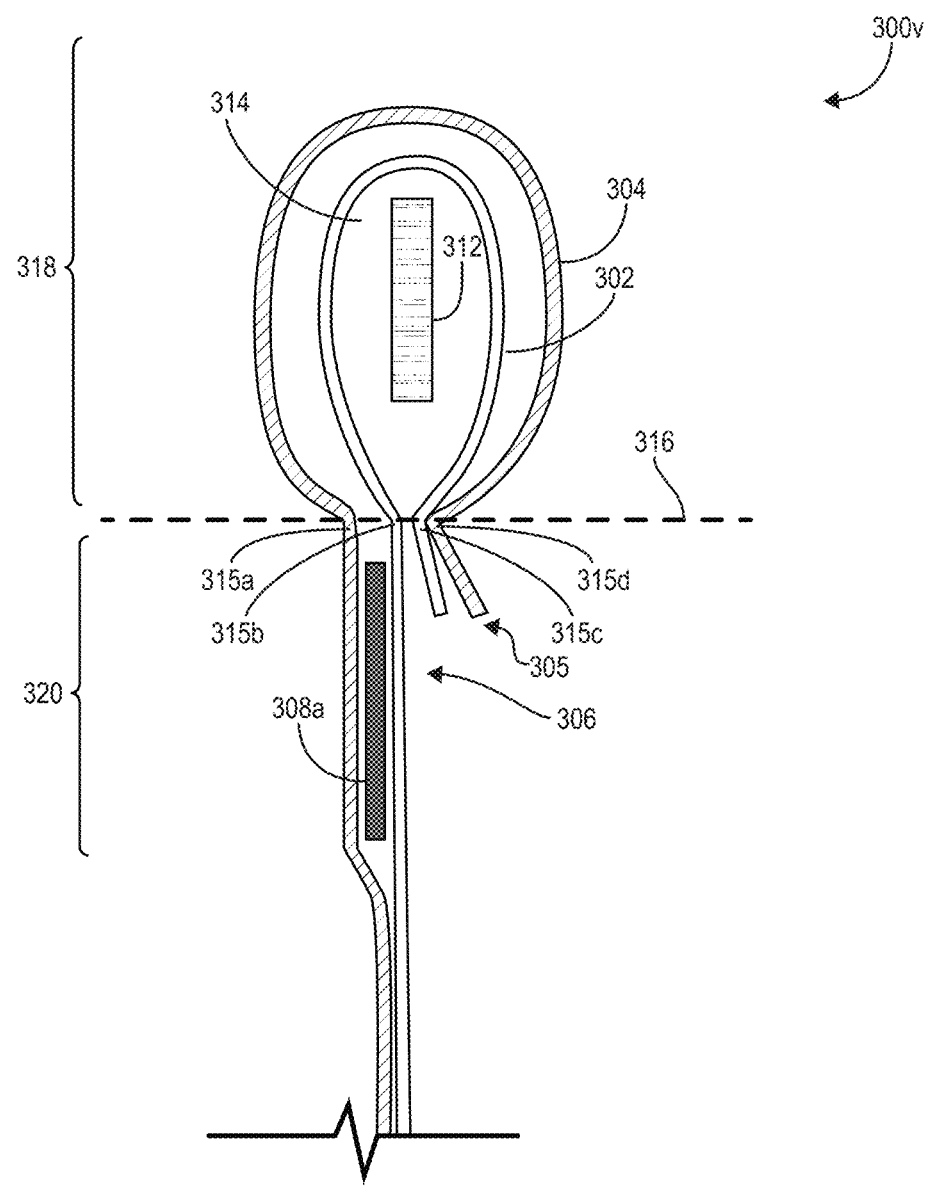

Similar to FIG. 3U, FIG. 3V also shows a single layer grab-zone reinforcement structure 306 positioned only in the grab-zone 320. However, as a different variation of FIG. 3U, the sidewall 300v of FIG. 3V comprises a first reinforcement layer 308a positioned between plies instead of positioned on the inner surface of the reinforced thermoplastic bag. Specifically, the sidewall 300v comprises the first reinforcement layer 308a sandwiched between the second layer 304 and the first layer 302 that are attached at the hem seal 316 at respective attachment points 315a, 315b. Additionally, like the first reinforcement layer 308a of FIG. 3U, the first reinforcement layer 308a in the sidewall 300v also comprises thickened reinforcement as compared to one or both of the first layer 302 and the second layer 304. However, in certain implementations, the first reinforcement layer 308a is not necessarily a thicker gauge than the first layer 302 and/or the second layer 304. Indeed, in this configuration, the first reinforcement layer 308a can be adapted to provide myriad basis weights, gauges, material formulations, color pigmentation, etc. to impart the desired degree of reinforcement and/or visual cues.

Moreover, by positioning the first reinforcement layer 308a between the first layer 302 and the second layer 304, the first reinforcement layer 308a can better maintain its positioning within the grab-zone 320 of the reinforced thermoplastic bag during manufacturing. For instance, when tracking at high speeds (e.g., over 300 feet per second) and/or when manipulated through aggressive assembly processes and operations, sometimes unattached web portions or reinforcement strips for the grab-zone reinforcement structure 306 can incidentally move to incorrect positions. However, by trapping the first reinforcement layer 308a between the first layer 302 and the second layer 304, the first reinforcement layer 308a can better hold its position in the grab-zone 320 prior to lamination and/or other securing process.

Figure 3W:
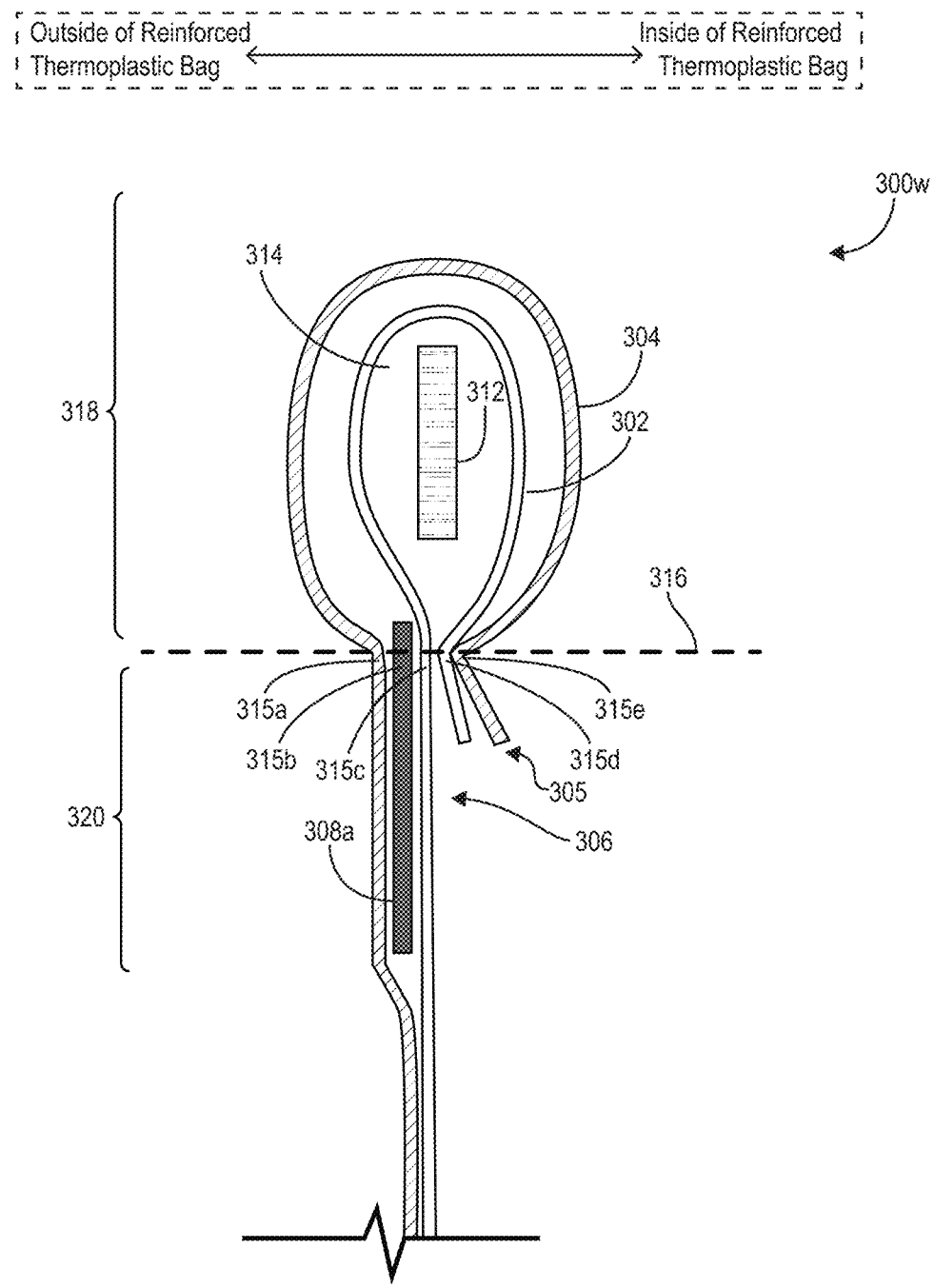

Like FIG. 3V, FIG. 3W also illustrates the sidewall 300w comprising a single layer grab-zone reinforcement structure 306 that is positioned between plies. As a variation to FIG. 3V though, FIG. 3W shows the sidewall 300w comprises a first reinforcement layer 308a attached at the hem seal 316 rather than entirely below the hem seal 316. Specifically, the first reinforcement layer 308a is attached at the hem seal 316 at attachment point 315b between attachment points 315a, 315c for the second layer 304 and the first layer 302, respectively. Although the first reinforcement layer 308a of the sidewall 300w does not reinforce the hem channel region 318, the first reinforcement layer 308a extends a configurable distance from the hem seal 316 down towards a closed bottom edge (not shown) to reinforce the grab-zone 320. This configuration can provide similar advantages as the configuration of FIG. 3V. Additionally, in certain implementations, the sidewall 300w can provide greater continuity (e.g., in sidewall gauge, color pigmentation, etc.) through the grab-zone 320 from the hem seal 316.

Figure 3X:
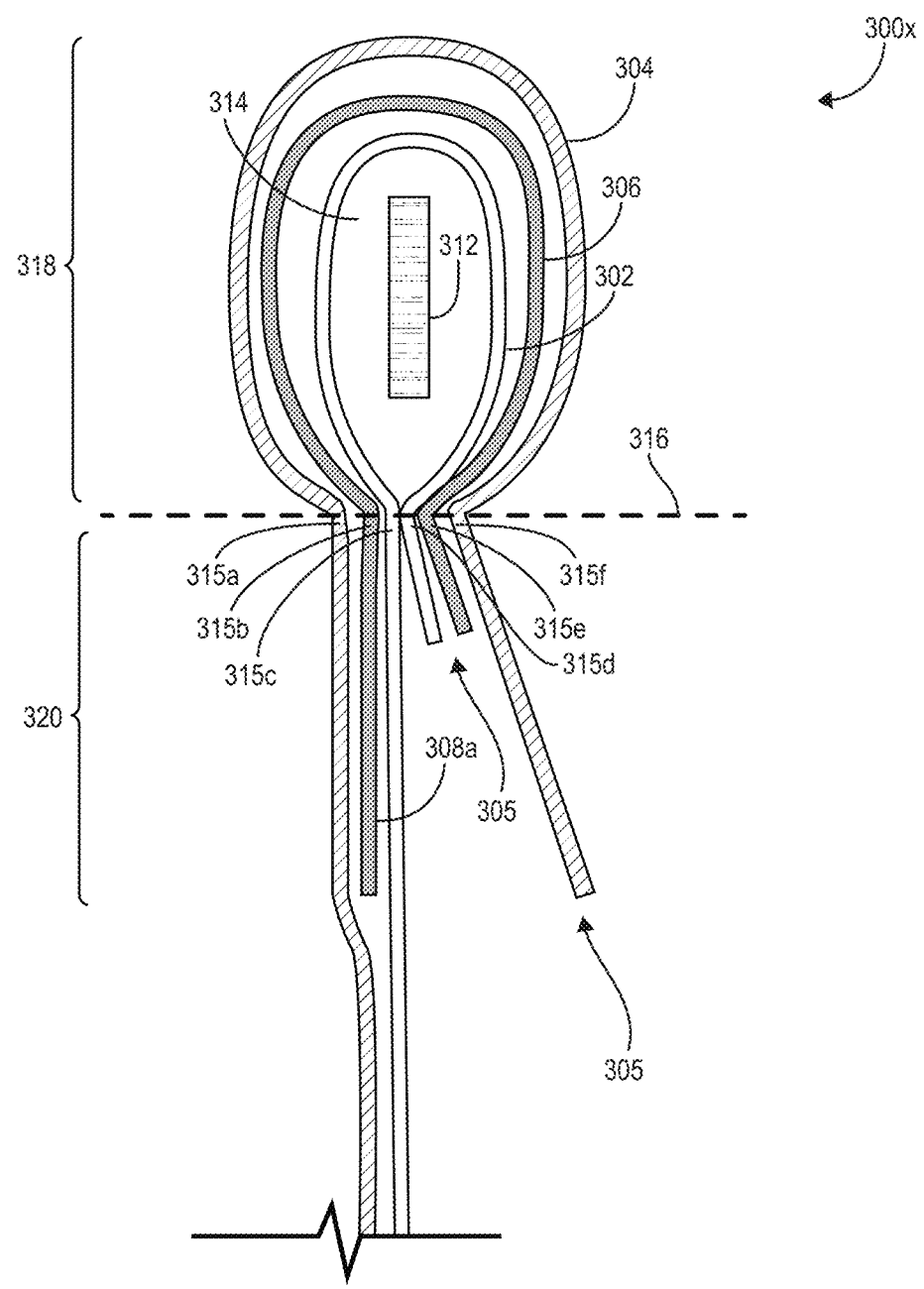
Figure 3Y:
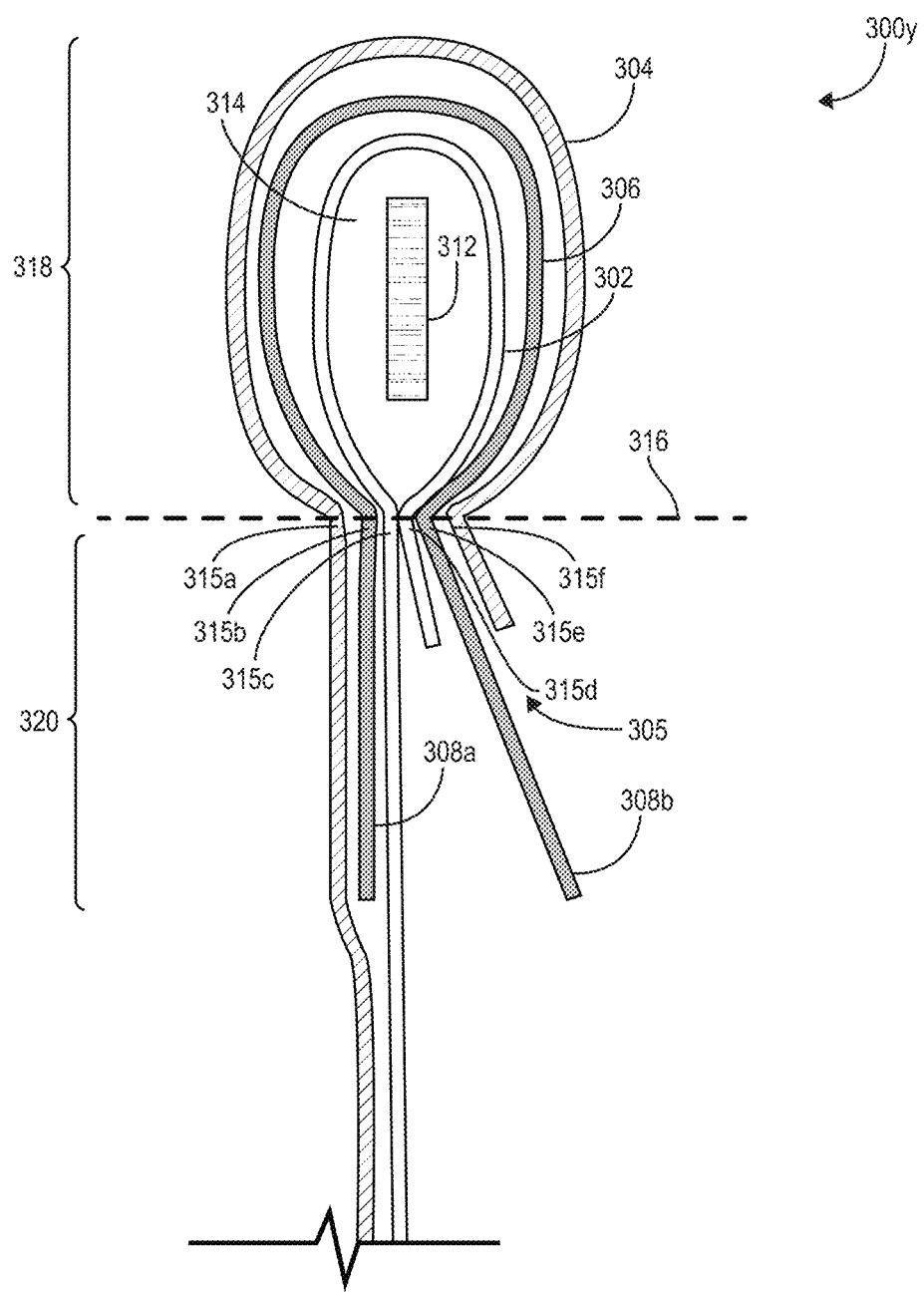

While FIGS. 3Q-3W illustrate the grab-zone reinforcement structure 306 reinforcing only the grab-zone 320, FIGS. 3A-3P illustrate the grab-zone reinforcement structure 306 reinforcing both the hem channel region 318 and the grab-zone 320. However, in the embodiments of FIGS. 3A-3P, the grab-zone reinforcement structure 306 reinforces the grab-zone 320 via one or more reinforcement layers, folds, partial folds etc. The present invention is not so limited though. In certain embodiments, the reinforced thermoplastic bag additionally or alternatively reinforces the grab-zone 320 via an extended hem as shown in FIGS. 3X-3Y. In particular, FIG. 3X illustrates the sidewall 300x comprising a 4-ply strata in the grab-zone 320 comprising each of the second layer 304, a first reinforcement layer 308a, the first layer 302, and an extended hem of the second layer 304.

With respect to the hem channel region 318 in FIG. 3X, the first layer 302 forms a first, innermost ply bounding the hem channel 314 such that the first layer 302 is positioned proximate to the draw tape 312 between attachment points 315c, 315d at the hem seal 316. The first reinforcement layer 308a forms a second, reinforcing middle ply bounding the hem channel 314 between attachment points 315b, 315e at the hem seal 316. In addition, the second layer 304 forms a third, outer ply bounding the hem channel 314 between attachment points 315a, 315f at the hem seal 316.

For the grab-zone 320, both the first reinforcement layer 308a and the second layer 304 reinforce the grab-zone 320. In particular, the first reinforcement layer 308a extends a configurable distance from the hem seal 316 down towards a closed bottom edge (not shown) to reinforce the grab-zone 320 (e.g., as provided in some of the foregoing embodiments). However, unlike the foregoing embodiments, the sidewall 300x comprises an extended hem in the form of the second layer 304 extending a configurable distance past the hem skirt down towards the closed bottom edge (not shown) to reinforce the grab-zone 320. In this configuration, the fold-over of the top edge 305 comprises the first layer 302 and the first reinforcement layer 308a forming a hem skirt below the hem seal 316. In addition, the fold-over of the top edge 305 comprises the second layer 304 forming an extended hem skirt that spans, for instance, at least two or more inches past the hem skirt towards the closed bottom edge (not shown).

Alternatively, in certain embodiments, the extended hem skirt reinforcing the grab-zone 320 comprises the first layer 302 extending a configurable distance past the hem skirt down towards the closed bottom edge (not shown). Still, in other embodiments, the extended hem skirt reinforcing the grab-zone 320 comprises both first layer 302 and the second layer 304 extending a configurable distance past the hem skirt down towards the closed bottom edge (not shown). In this manner, the reinforced thermoplastic bag can increase the amount of reinforcement applied at the grab-zone 320 to better withstand applied loads from grasping fingers.

Further, as mentioned above, the different plies can combine to provide a particular visual cue as may be desired. In view of the numerous examples provided herein, only one of many examples is mentioned here. Specifically, to provide a lighter or brighter visual cue of reinforcement at the grab-zone 320, both the first reinforcement layer 308a and the second layer 304 may comprise a white, translucent color. In this manner, the grab-zone 320 may include visually brighter or whiter pigmentation color at the grab-zone 320 compared to other portions of the reinforced thermoplastic bag from inner-bag and outer-bag viewing perspectives.

Similar to FIG. 3X, FIG. 3Y also comprises an extended hem skirt to reinforce the grab-zone 320. However, as a variation to FIG. 3X, FIG. 3Y shows the sidewall 300y comprising the grab-zone reinforcement structure 306 forming an extended hem skirt to provide double reinforcement plies in the grab-zone 320. In particular, the sidewall 300y includes a first reinforcement layer 308a providing reinforcement to the grab-zone 320 between the second layer 304 and the first layer 302 (as similarly done in FIG. 3X). Unlike FIG. 3X though, the sidewall 300y comprises an extended hem in the form of a second reinforcement layer 308b extending a configurable distance (e.g., two or more inches) past the hem skirt down towards a closed bottom edge (not shown) to reinforce the grab-zone 320. In this manner, the sidewall 300y can more efficiently utilize the grab-zone reinforcement structure 306 to provide double reinforcement layers in the grab-zone 320 without adjusting a fold-over of the top edge 305 for the first layer 302 and the second layer 304. In addition, the sidewall 300y can provide the same or similar advantages as discussed above in relation to FIG. 3X.

While the preceding discussion regarding FIGS. 3A-3Y includes various embodiments for reinforcing one or both of the hem channel region 318 or the grab-zone 320, each embodiment includes only a single hem seal. The present invention is not so limited though. Indeed, in one or more embodiments, the reinforced thermoplastic bag comprises at least one additional hem seal, such as a second hem seal, a third hem seal, etc. as may be desired. Indeed, multiple hem seals (and/or patterned bonding areas) may secure sidewall elements in any of the foregoing embodiments or other embodiments not expressly shown but are within the scope of the present disclosure. FIG. 3Z illustrates one example embodiment implementing multiple hem seals.

Figure 3Z:
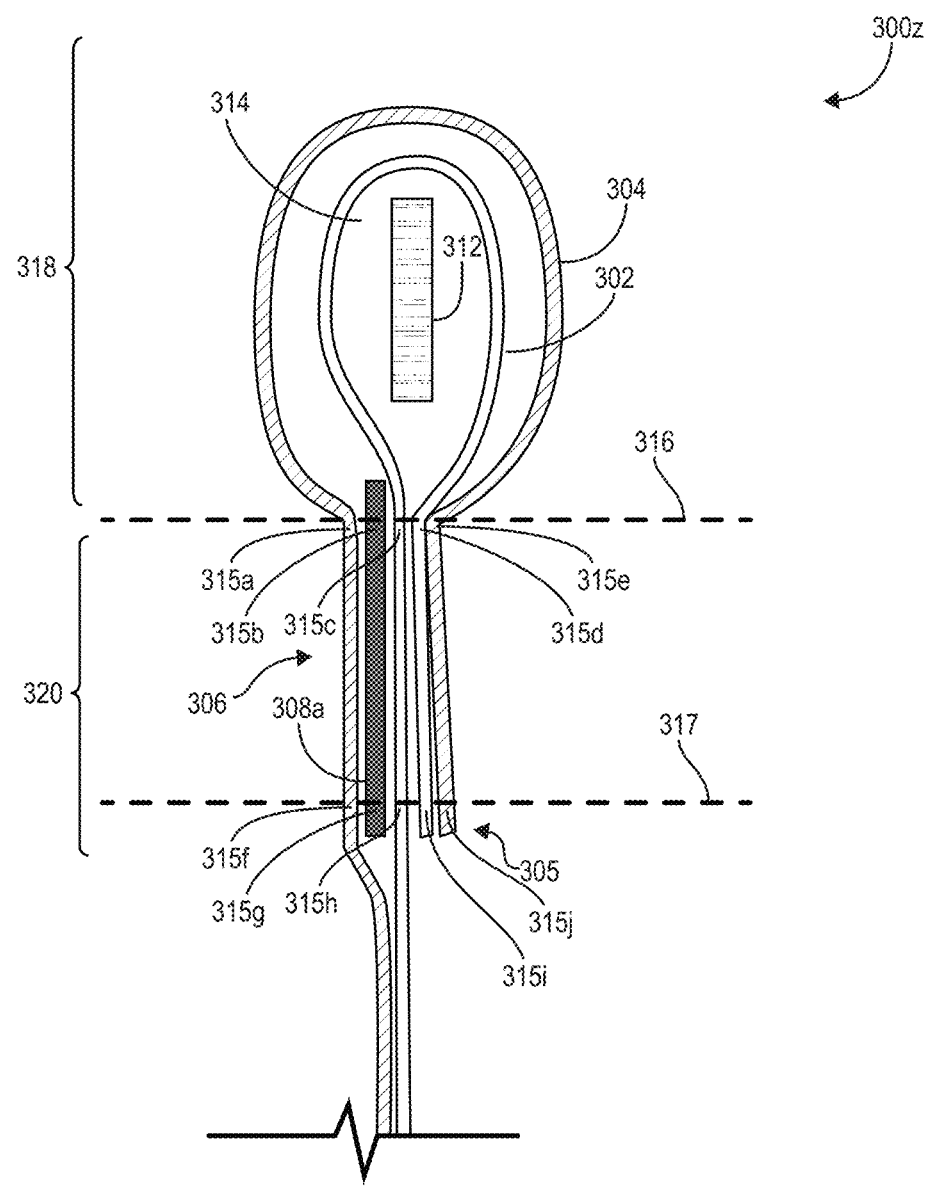
Figure 3A:
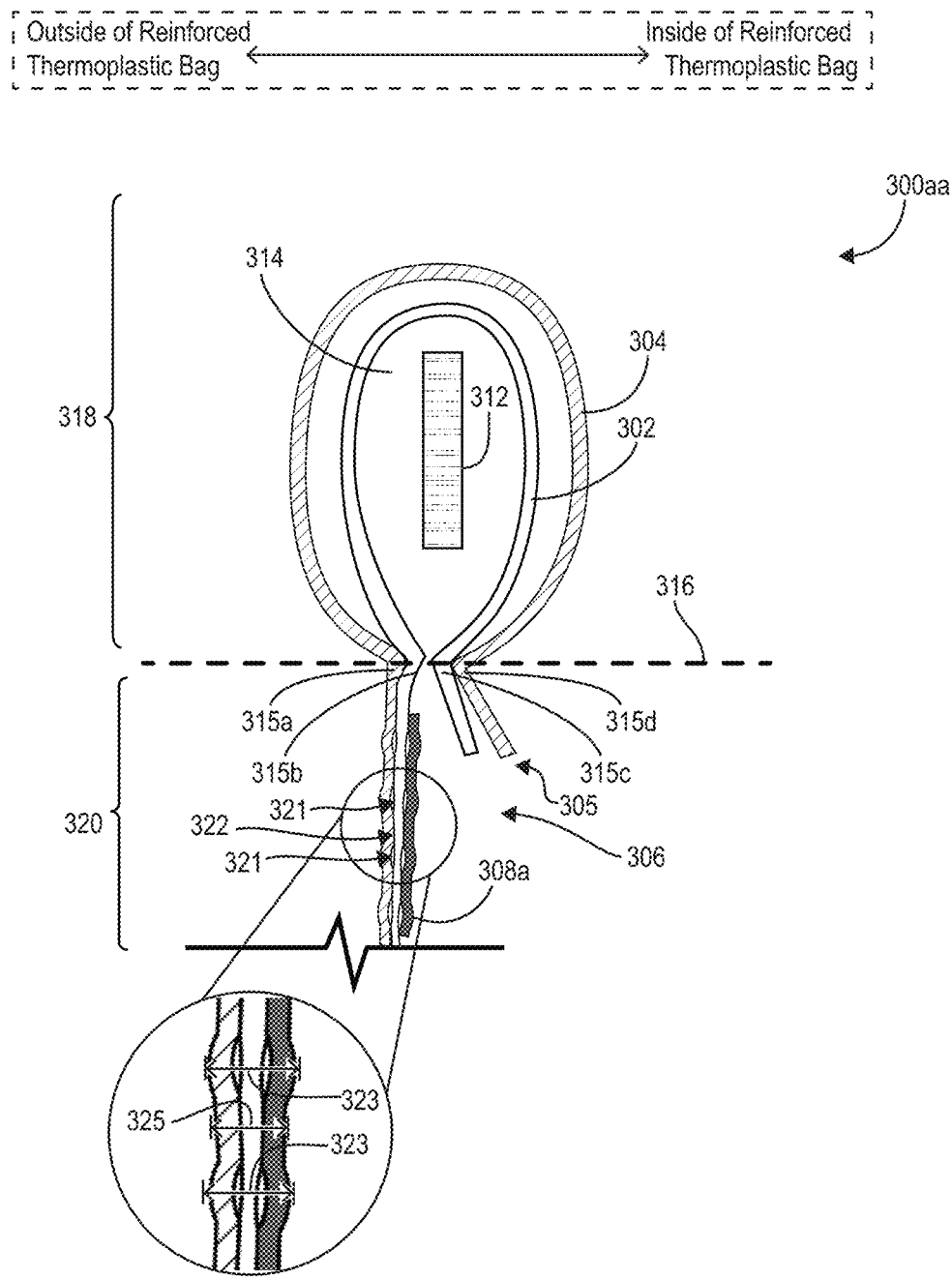
Figure 3B:
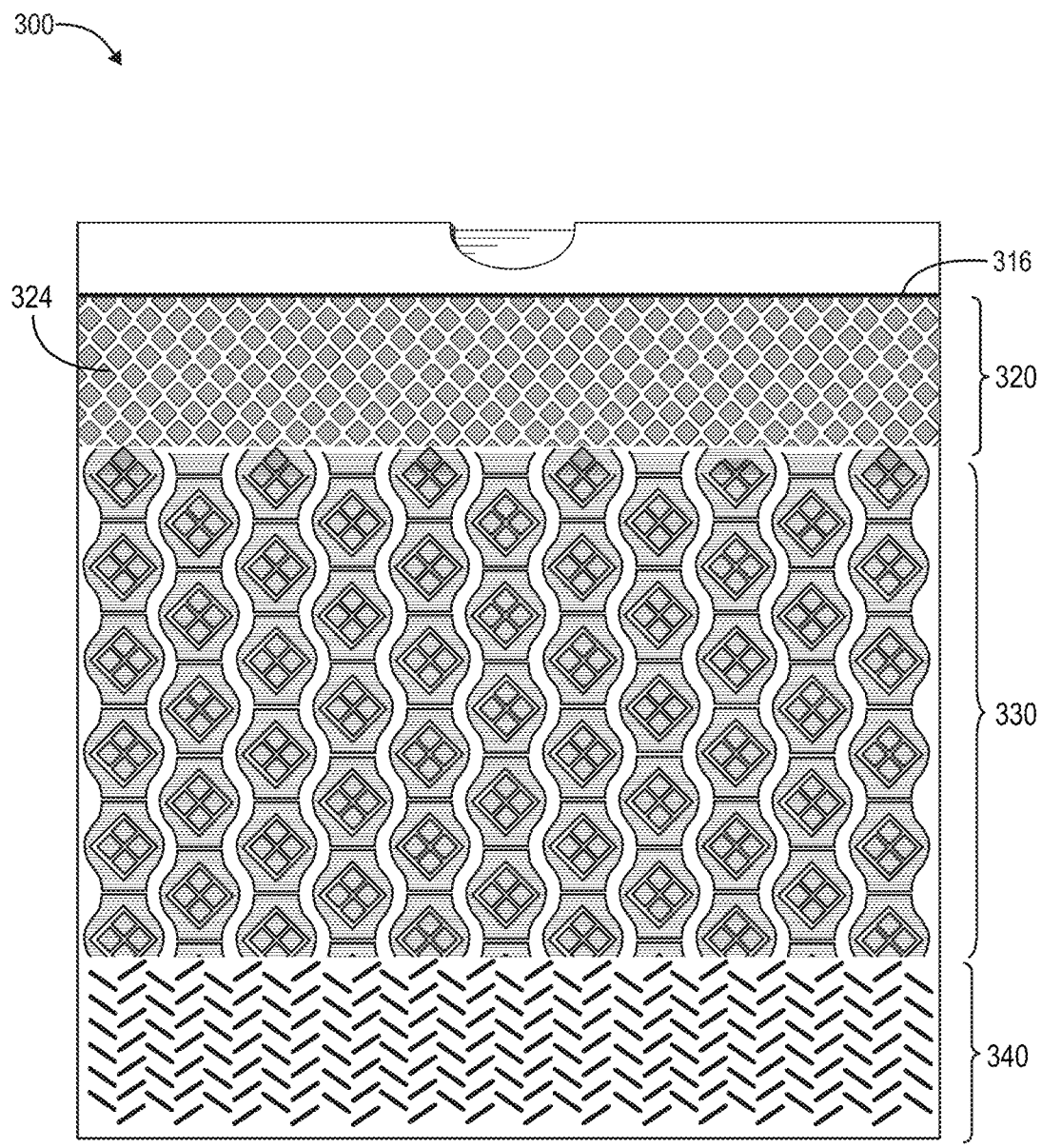

As shown in FIG. 3Z, the sidewall 300z comprises a 5-ply strata in the grab-zone 320 to provide increased reinforcement. Specifically, a first reinforcement layer 308a of the grab-zone reinforcement structure 306 provides a single layer of reinforcement to the grab-zone 320 (e.g., as similarly described above in relation to FIG. 3W) by spanning between attachment points 315b, 315g at the hem seal 316 and hem seal 317, respectively. Additionally, like FIGS. 3X and 3Y, the sidewall 300z comprises an extended hem skirt to provide additional reinforcement. In particular, the first layer 302 forms part of an extended hem skirt by spanning between attachment points 315d, 315i at the hem seal 316 and hem seal 317, respectively. Similarly, the second layer 304 forms part of the extended hem skirt by spanning between attachment points 315e, 315j at the hem seal 316 and hem seal 317, respectively.

In these or other embodiments, securing the extended hem skirt via the hem seal 317 (and in some cases, additional hem seals) can provide increased TD strength to the reinforced thermoplastic bag. Additionally or alternatively, implementing both the hem seal 316 and the hem seal 317 in some cases allows contact forces (e.g. from grasping fingers) to be better distributed across the grab-zone 320.

As mentioned above, in one or more implementations the grab-zone reinforcement structure 306 is secured to the inside surface of the reinforced thermoplastic bag (e.g., the inner surface of the first layer 302) using one or more bonds as described above in relation to the plurality of non-continuous bonds 150 of FIGS. 1-2. For example, FIG. 3AA illustrates an embodiment in which the grab-zone reinforcement structure 306 comprises a first reinforcement layer 308a secured to the sidewall 300aa by a plurality of bonds at the contact areas 322. The bonds can comprise adhesive bonds, thermal bonds, ultrasonic bonds, ring rolling bonds, SELFing bonds, contact areas, or other bonds.

Thus, in one or more implementations bonds secure the layer(s) of the thermoplastic bag together with the grab-zone reinforcement structure 306 in the grab-zones. For example, the bonds can comprise contact areas 322 as shown in FIG. 3AA. The contact areas 322 comprise areas in which the grab-zone reinforcement structure 306 is in intimate contact with the sidewall 300aa. The contact areas 322 can help reinforce the top-of-bag due to increased stiffness provided by the contact areas 322, and thereby, help reduce tearing or other damage by stresses/strain from grasping fingers (e.g., during a grabbing motion to lift or carry) applied to the grab-zone. Additionally, the increased stiffness can provide a tactile feel that connotes strength to a user grasping the grab-zone 320. Thus, by positioning the contact areas 322 in the grab-zone 320, (a high-touch area) the contact areas 322 provide tactile cues to the consumer about the strength and quality of the reinforced thermoplastic bag. More specifically, the contact areas 322 can comprise contact areas as described in International Application No. PCT/US2020/24143, filed on Mar. 23, 2020 and entitled: MULTI-FILM THERMOPLASTIC STRUCTURES AND BAGS HAVING VISUALLY-DISTINCT CONTACT AREAS AND METHODS OF MAKING THE SAME, which claims the benefit of and priority to U.S. Provisional Application No. 62/825,520, filed Mar. 28, 2019 and entitled: MULTI-FILM THERMOPLASTIC STRUCTURES AND BAGS HAVING VISUALLY-DISTINCT CONTACT AREAS AND METHODS OF MAKING THE SAME, the contents of the these two patent applications are hereby incorporated by reference in their entirety.

The contact areas 322 secure the grab-zone reinforcement structure 306 to the sidewall 300aa such that the thickness of the layers 302, 304, 308a is substantially unchanged at each of the contact areas 322. In other words, each of the layers 302, 304, 308a can have a substantially uniform gauge (e.g., are substantially flat). In other words, the gauge of the layers 302, 304, 308a in separated areas 321 between the contact areas 322 is substantially the same as the gauge of the layers 302, 304, 308a in the contact areas 322. This is in contrast to ring rolled, SELF'ed, conventional embossing, or other processes that can bond film layers together, while also deforming portions of the films. The heat, pressure, and depth of engagement during creation of the contact areas can control to what extent, if any, the thermoplastic films are deformed when forming the contact areas 322. In one or more implementations, the process of forming the contact areas 322 does not deform, or does not substantially deform, the thermoplastic films such that they are flat, or appear flat, despite the presence of contact areas 322. In alternative implementations, the portions of the first and second thermoplastic films comprising the contact areas 322 create an increase or decrease in the gauge or loft of the reinforced thermoplastic bag.

In one or more implementations, the creation of the contact areas 322 does not weaken the layers 302, 304, 308a. For example, in one or more implementations, film strength in the portions of the layers 302, 304, 308a comprising the contact areas 322 is not significantly lower than the portions of the layers 302, 304, 308a in the areas of separation. In particular, in one or more implementations, the layers 302, 304, 308a in the contact areas 322 have transverse direction tensile strength that is the same as the film in the separated areas 321 between the contact areas 322.

Moreover, the creation of the contact areas 322 can create other tactile features in the reinforced thermoplastic bag. For example, regions of the reinforced thermoplastic bag including the contact areas 322 can have an increased rigidity over other regions of the reinforced thermoplastic bag without contact areas. In some implementations, the contact areas 322 may increase the rigidity of the reinforced thermoplastic bag by a factor of one. In other implementations, the contact areas 322 may increase the rigidity of the reinforced thermoplastic bag by as much as a factor of three. Alternatively, the contact areas 322 may not increase the rigidity of the reinforced thermoplastic bag at all.

For example, in one or more implementations, the grab-zone reinforcement structure 306 can comprise a pigmented film and have a black appearance while the sidewall 300aa is substantially un-pigmented or lightly pigmented and have a clear, transparent, or cloudy appearance. When combined to form a reinforced thermoplastic bag in accordance the principles described herein, the contact areas 322 in the sidewall 300*aa* can have a color or appearance that differs from the color of the rest of the sidewall 300*aa*. For example, the sidewall 300*aa* can have a metallic, silvery metallic or light grey color rather than a black appearance or color as would be expected (i.e., due to viewing the grab-zone reinforcement structure 306 through a clear or transparent film). The regions or areas of the two films in intimate contact with each other create contact areas that have a color or appearance that differs from the color or appearance of the sidewall 300*aa*. For example, the contact areas 322 can have the color or appearance of the grab-zone reinforcement structure 306 (e.g., black).

In one or more alternative implementations, the sidewall 300*aa* comprises a light colorant while the grab-zone reinforcement structure 306 comprises a dark colorant. As used herein, a light colorant is a color with a brightness closer to the brightness of white than the brightness of black. As used herein, a dark colorant is a color with a brightness closer to the brightness of black than the brightness of white. In one or more embodiments, the sidewall 300*aa* has a concentration of light colorant between about 1% by mass and about 15% by mass. More particularly, in one or more embodiments, the sidewall 300*aa* has a concentration of light colorant between about 2% by mass and about 12% by mass. In still further embodiments, the sidewall 300*aa* has a concentration of light colorant between about 5% by mass and about 10% by mass.

Still further, the grab-zone reinforcement structure 306 has a concentration of dark colorant between about 1% by mass and about 15% by mass. More particularly, in one or more embodiments, the grab-zone reinforcement structure 306 has a concentration of dark colorant between about 2% by mass and about 12% by mass. In still further embodiments, the grab-zone reinforcement structure 306 has a concentration of dark colorant between about 5% by mass and about 10% by mass.

The white colored sidewall 300*aa*, when part of the reinforced thermoplastic bag can have a gray appearance. The foregoing described color change may give the appearance of a third color without requiring the actual colorant mixture of the third color to be within the reinforced thermoplastic bag. In other words, the bag can be devoid of a gray pigment. For example, it may allow a film having a viewable black layer and a viewable white layer to have (i.e., mimic) a gray appearance (often a consumer preferred color). Furthermore, the foregoing described color change may allow the film to mimic a gray appearance without significantly increasing and/or reducing a transparency (i.e., light transmittance) of the film. In other words, the foregoing described color change may allow the reinforced thermoplastic bag to mimic a gray appearance without detrimentally affecting an appearance of quality of the film.

Thus, the contact areas have a color or appearance that differs from the color or appearance of the sidewall 300*aa*. For example, the contact areas 322 can have the color or appearance of the grab-zone reinforcement structure 306 (e.g., black) or another color. One will appreciate in light of the disclosure herein that black and white are used as exemplary colors for ease in explanation. In alternative embodiments, the films can comprise other color combinations such as white and blue, yellow and blue, red and blue, etc.

Irrespective of the specific colors of the first and second thermoplastic films, the contact areas 322 can have a substantial change in appearance compared to the separated areas 321 when viewed from the first thermoplastic film side of the reinforced thermoplastic bag. In some embodiments, for example, when using the LAB color space, a represents a measurement of green and magenta values, b represents a measurement of blue and yellow values, and L represents a measurement of lightness (i.e., white and back values). In some embodiments, the change in appearance of the contact areas 322 comprises a color change in which the L value decreases by at least five points. In some embodiments, the change in appearance of the contact areas 322 comprises a color change in which the L value decreases between five and forty points, between five and thirty points, or between five and twenty points.

For example, the change in appearance of the contact areas 322 may include a perceivable change of color from gray to black. In additional embodiments, the change in appearance of the contact areas 322 may include a perceivable change of color from a first relatively lighter color to a second darker color. For example, the change in appearance may include perceivable change of color from a first light gray to a second dark gray. In other implementations, the change in appearance may include perceivable change of color from a first lighter version of any color to a second darker version of the same color.

Still, in other embodiments, the change in appearance of the contact areas 322 may include a perceivable change of color from a first relatively lighter color to a second lighter color. For example, the change in appearance may include perceivable change of color from a first white color to a second white color even brighter than the first white color. To illustrate, the grab-zone 320 may appear (when viewed from the from the "white side") extra white or lighter where a white-colored grab-zone reinforcement structure 130 is positioned between a 2-ply sidewall comprising one white ply and one black ply. Outside of the grab-zone 320, however, the sidewall may appear grey due to the combination of white on black plies.

As another example, it may allow a film having a viewable blue layer (with a back yellow layer) to have (i.e., mimic) a green appearance. Furthermore, the foregoing described color change may allow the film to mimic a green appearance without significantly increasing and/or reducing a transparency (i.e., light transmittance) of the film. In other words, the foregoing described color change may allow the film to mimic a green appearance without detrimentally affecting an appearance of quality of the film. As a result of the foregoing, the multi-layer film of the present disclosure may provide a multi-layer film having a particular appearance (e.g., a green appearance) while reducing costs. One will appreciate that other color combination in addition to white/black producing grey and yellow/blue producing green are possible and the foregoing are provided by way of example and not limitation.

By way of illustration of the foregoing, FIG. 3BB illustrates a front view of a reinforced thermoplastic bag 300 having a sidewalls 300*aa* as described above in relation to FIG. 3AA. In particular, the grab-zone 320 below the hem seal 316 includes a pattern 324 of contact areas that have a gray appearance created by bringing the dark pigmented grab-zone reinforcement structure 306 into intimate contact with the translucent layer(s) of the sidewall 300*aa*. FIG. 3BB also illustrates that a bottom region 340 of the reinforced thermoplastic bag 300 can include a region of contact areas. As shown the contact areas of the bottom region 340 can differ from the contact areas of the grab-zone 320.

As shown by FIG. 3BB, the reinforced thermoplastic bag 300 includes a middle region 330 extending from below the grab-zone a distance toward the bottom edge of the reinforced thermoplastic bag 300. The middle region 330 includes a plurality of deformations (e.g., SELFing). As shown, the middle region 330 includes a pattern of elements that includes diamonds and wavy lines. Additionally, the pattern of elements can take up any percentage of the middle region 330. For example, the pattern of elements in the middle region 330 can be a SELF'ing or ring rolling pattern. In particular, the middle region 330 includes a SELFing pattern of bulbous areas with nested diamonds. Wavy land areas separate the SELFing patterns. In some implementations, the wavy land areas may be contact areas in addition to the contact areas in the grab-zone 320. The SELFing pattern of the middle region 330 can be formed using the techniques described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety.

As mentioned above, the grab-zone reinforcement structure can include a non-woven material. For instance, by utilizing a non-woven material, the reinforced thermoplastic bag can include increased puncture-toughness properties or tensile-strength properties in comparison to other portions of the reinforced thermoplastic bag. The non-woven grab-zone reinforcement structure can comprise spun bond polymer fibers. The spun bond polymer fibers can be elastic so as to be able to stretch with the bag to an extent that the non-woven grab-zone reinforcement structure does not cause stress concentrations, particularly where connected to the bag (e.g., the hem seal or side seals). Additionally or alternatively, the non-woven material can include additional material for increased thickness and/or for visually signaling strength reinforcement to a grab-zone. More specifically, any of the grab-zone reinforcement structures described above in relation to FIGS. 1A-3BB can comprise a non-woven material.

In one or more implementations the non-woven grab-zone reinforcement structure is positioned between the layers of the sidewalls as shown in FIGS. 3A and 3N. In alternative embodiments, the non-woven grab-zone reinforcement structure reinforces only the grab-zone 320 like the grab-zone reinforcement structures of FIGS. 3Q-3S albeit that unlike the grab-zone reinforcement structures of FIGS. 3Q-3S the non-woven grab-zone reinforcement structure is positioned between the layers of the sidewalls rather than to an inner layer of the sidewall. In one or more embodiments, the thermoplastic layers in between which the non-woven grab-zone reinforcement structure is positioned are translucent such that the non-woven grab-zone reinforcement structure is visible through the layers. The visibility of the non-woven grab-zone reinforcement structure can provide a cue to the user of increased strength of the grab-zone. To increase the visibility of the non-woven grab-zone reinforcement structure, the non-woven grab-zone reinforcement structure can comprise a dark color or other color that differs from the color of the translucent layers between which the non-woven grab-zone reinforcement structure is positioned.

FIGS. 4A-4C illustrate example embodiments of a reinforced thermoplastic bag 400a-400c implementing a non-woven grab-zone reinforcement structure 402 comprising a non-woven material in accordance with one or more embodiments. For example, in certain embodiments, the reinforced thermoplastic bags 400a-400c include drawstring bags similar to the reinforced thermoplastic bag 100 of FIG. 1A or 1B. As shown in FIG. 4A, the reinforced thermoplastic bag 400a comprises the non-woven grab-zone reinforcement structure 402 positioned between side seals 410 and 412 with fibers oriented in a variety of directions for multi-directional material properties. Further, the non-woven grab-zone reinforcement structure 402 is positioned across a portion of a grab-zone below a hem seal 404 such that an upper portion 406 is sandwiched in between the hem seal 404 and the non-woven grab-zone reinforcement structure 402. In these or other embodiments, the non-woven grab-zone reinforcement structure 402 increases an average gauge or thickness relative to an area 408 and/or an upper portion 406 (e.g., that is not incrementally stretched and is devoid of bonding). Additionally or alternatively, the non-woven grab-zone reinforcement structure 402 in certain implementations comprises a particular density (e.g., of about 10 grams per square meter).

As further shown in FIG. 4A, the non-woven grab-zone reinforcement structure 402 is positioned above the area 408 comprising a portion of thermoplastic film arranged in a particular bonding pattern (e.g., a fenced diamond bonding pattern) for imparting additional or alternative material properties as described above in relation to SELFing methods. Inside each fenced diamond of the area 408, the reinforced thermoplastic bag 400a comprises horizontal lines or "fences" disposed between non-bonded portions. Additionally as shown, the area 408 comprises landing portions defining a spatial region between each of the fenced diamond patterns that are devoid of bonding. In general, the fenced diamonds of the area 408 are spatially configured relative to each other to allow about 1/16 of an inch, about 1/8 of an inch, or about 1/4 of an inch of a landing portion between discrete fenced diamonds. Below the area 408, the reinforced thermoplastic bag 400a comprises a lower portion 414 that (like the upper portion 406) is devoid of bonding.

In more detail with respect to the upper and lower portions 406, 414, each of the upper portion 406 and the lower portion 414 in one or more implementations is between $1/16^{th}$ of an inch and 8 inches in height and extends in length from the side seal 410 to side seal 412. In other embodiments, each of the upper portion 406 and the lower portion 414 is between 1 inch and 4 inches in height. In one or more embodiments, the heights of the upper portion 406 and the lower portion 414 are equal. In alternative embodiments, the heights of the upper portion 406 and the lower portion 414 are unequal.

Similar to FIG. 4A, the reinforced thermoplastic bag 400b in FIG. 4B alternatively comprises a non-woven portion 416 at the lower portion 414 shown in FIG. 4A. By utilizing the non-woven portion 416 positioned below the area 408 adjacent to a bottom fold 418, the reinforced thermoplastic bag 400b additionally imparts material properties for a bottom-of-bag portion. For example, when the reinforced thermoplastic bag 400b fills with garbage or is lifted/carried, the non-woven portion 416 can improve multi-directional strength (from the multi-directional fibers), support increased payloads, and prevent overstretching.

Additionally, in at least one embodiment, the height of the non-woven portion 416 is taller than the non-woven grab-zone reinforcement structure 402. For instance, the non-woven portion 416 is three inches in height, while the non-woven grab-zone reinforcement structure 402 is two inches in height. Of course, in other embodiments, the heights are the same or else comprise other heights within the scope of the present disclosure.

Additionally or alternatively, as shown in FIG. 4C, the reinforced thermoplastic bag 400c comprises no hem seal or draw tape. Rather, the non-woven grab-zone reinforcement structure 402 spans across a grab-zone by extending between an adjustable boundary 422 and a top portion 420 proximate an opening of the reinforced thermoplastic bag 400c. By extending to the top portion 420 in the absence of a draw tape, the non-woven grab-zone reinforcement structure 402 helps to provide additional strength and durability at portions where grasping fingers may otherwise comprise portions above the non-woven grab-zone reinforcement structure 402 shown in FIG. 4A.

In one or more implementations, the reinforced thermoplastic bags 400a-400c can include multiple non-woven portions (e.g., a first non-woven portion and a second non-woven portion) that are superimposed (i.e., overlapping) on top of each other. By superimposing multiple non-woven portions (e.g., as part of the non-woven grab-zone reinforcement structure 402 described above), the reinforced thermoplastic bags 400a-400c can impart differing material properties. For instance, the multiple non-woven portions may differ in thickness, fiber length, fiber direction, fiber coarseness, fiber diameter, etc. Additionally or alternatively, the multiple non-woven portions may comprise different colors (e.g., to create a blend of colors at an overlapping portion) and thereby improve visual signaling of increased strength/durability at the grab-zone.

Figure 5:
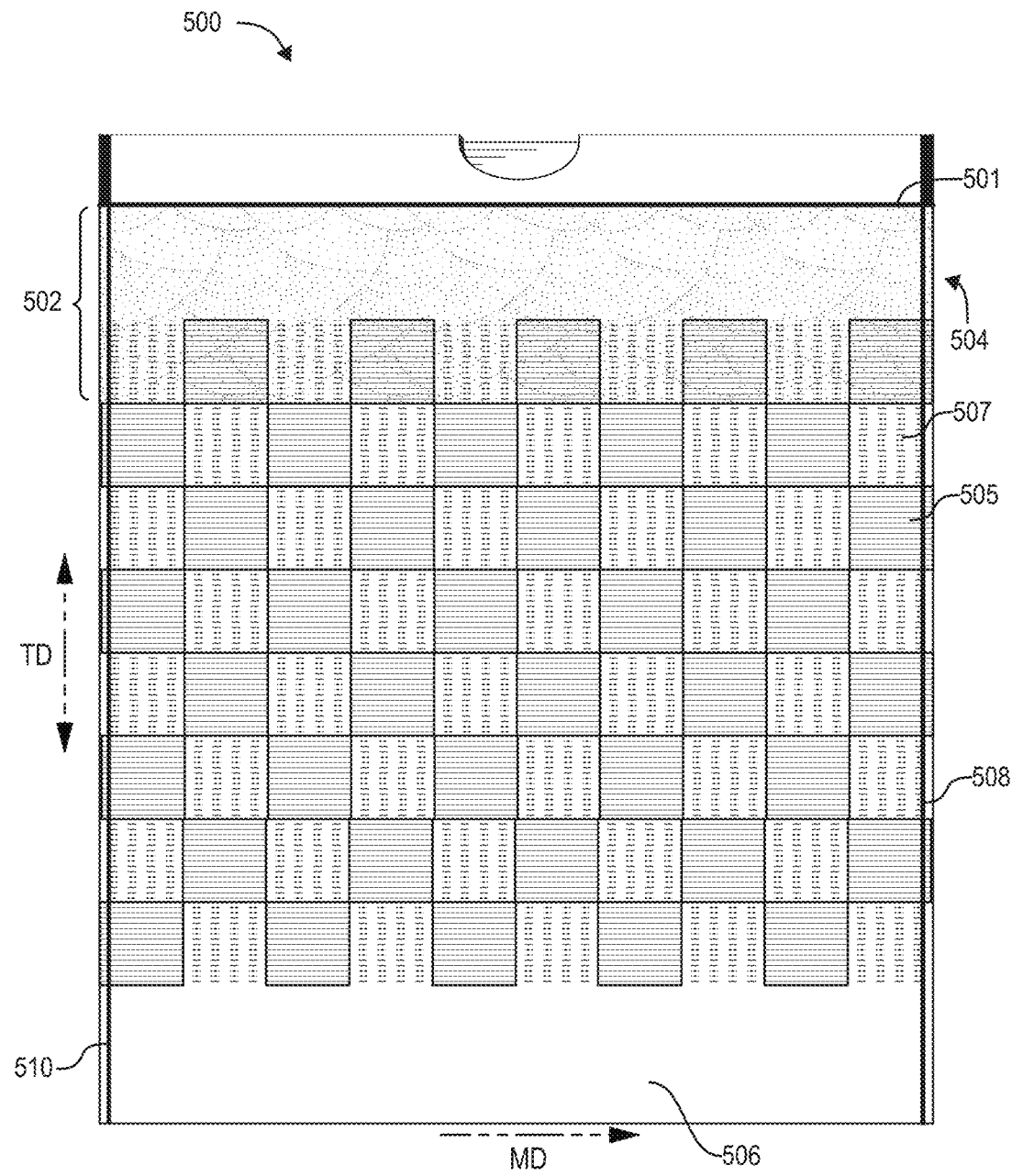
FIG. 5 illustrates a reinforced thermoplastic bag in accordance with one or more embodiments.

The reinforced thermoplastic bags 400a-400c of FIGS. 4A-4C include non-woven grab-zone reinforcement structures secured to the reinforced thermoplastic bags 400a-400c at the side seals and/or hem seal. In alternative embodiments, the non-woven grab-zone reinforcement structures are secured to the reinforced thermoplastic bag by alternative or additional bonds. For example, FIG. 5 illustrates a reinforced thermoplastic bag 500 comprising a non-woven grab-zone reinforcement structure 504 secured to the reinforced thermoplastic bag 500 across the grab-zone 502. More specifically, the non-woven grab-zone reinforcement structure 504 is secured to the reinforced thermoplastic bag at the hem seal 501, sides seals 508, 510, and by SELFing bonds.

In one or more embodiments, the non-woven grab-zone reinforcement structure 504 is secured to the reinforced thermoplastic bag 500 across the grab-zone 502 prior to formation of the SELFing patterns 505, 507 such that when formed, the SELFing of the sidewall and the non-woven grab-zone reinforcement structure 504 form pressure bonds between the non-woven grab-zone reinforcement structure 504 and the sidewall of the reinforced thermoplastic bag 500.

Additionally, FIG. 5 illustrates the reinforced thermoplastic bag 500 includes a middle section including deformations such as raised rib-like elements in a strainable network. In particular, the raised rib-like elements are arranged in macro pattern regions 505 and micro pattern regions 507, which alternate and form a checkerboard pattern. The raised rib-like elements can overlap at least a portion of the grab-zone 502. The overlap can include a length that is any percentage of the length of the grab-zone 502. Thus, in some implementations, the length of the overlap may be very small (e.g., 1-3 centimeters), while in other implementations, the length of the overlap may be the same as the length of the grab-zone 502. For example, the overlap can be a length within a first range of about 0.1 inch (0.254 cm) to about 10 inches (25.4 cm), within a second range of about 0.5 inches (1.27 cm) to about 4 inches (10.16 cm), within a third range of about 1 inches (2.54 cm) to about 3 inches (7.6 cm), or longer or shorter distances. In one or more implementations, the overlap adds to the tactile and visual cues of strength and durability in the "grab-zone" of the multi-film thermoplastic bag 500.

Below the middle section, the reinforced thermoplastic bag 500 comprises a lower section 506 that is devoid of bonding. Depending on the desired size of the middle section, the lower section 506 is size-configurable.

Figure 6:
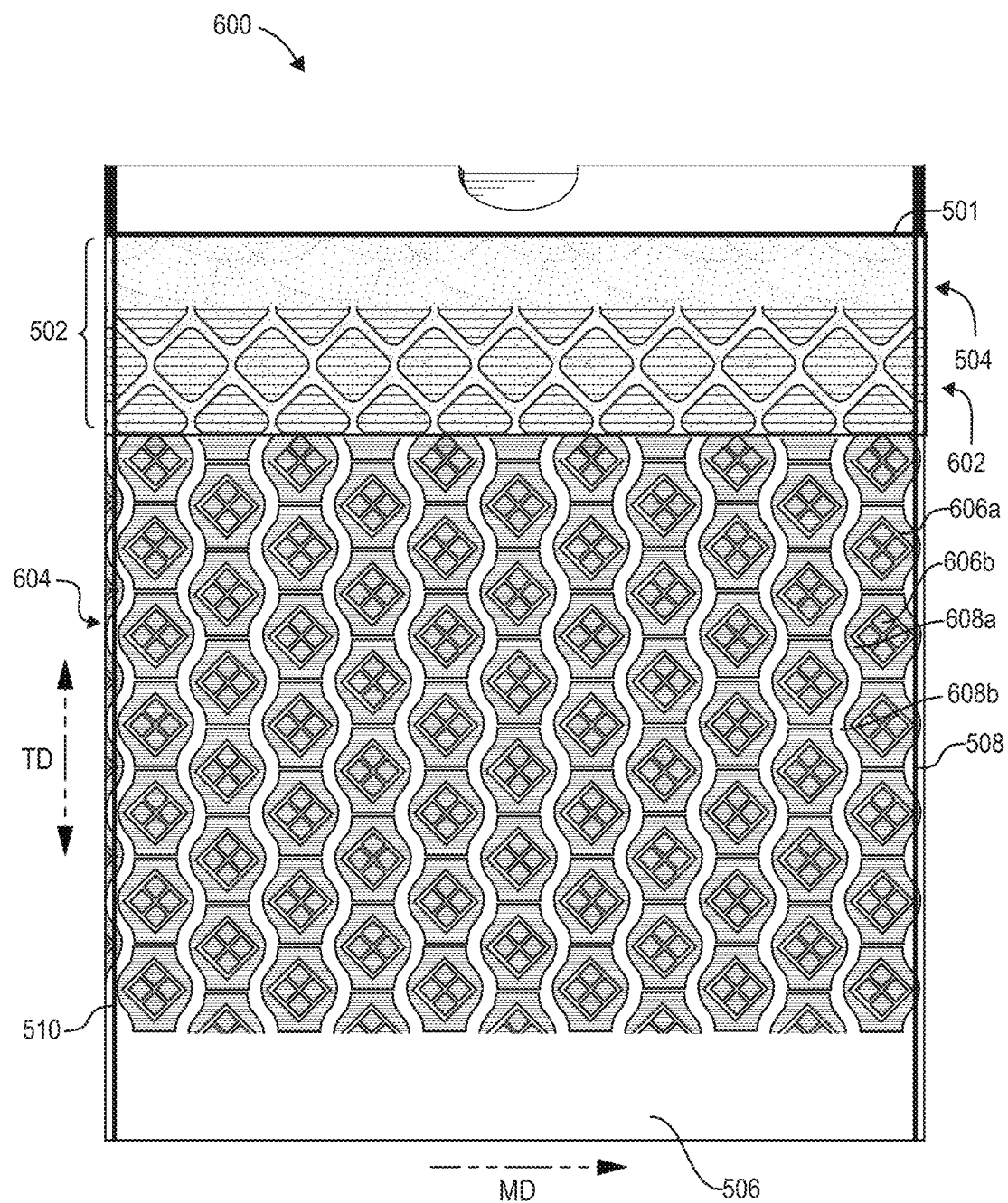
FIG. 6 illustrates another reinforced thermoplastic bag in accordance with one or more embodiments.

One will appreciate that the non-woven grab-zone reinforcement structure 504 can be secured to the sidewall using various SELFing patterns, ring rolling patterns, contact area patterns, or embossing patterns. For example, FIG. 6 illustrates a reinforced thermoplastic bag 600 including the non-woven grab-zone reinforcement structure 504 and an overlap region comprising a SELFing pattern 602 of a fenced diamond pattern, which is the same as or similar to the fenced diamond pattern described above in relation to FIGS. 4A-4C. In these or other embodiments, the fenced diamond pattern can comprise raised-rib-like elements arranged in diamond patterns where the intersections of the sides of the diamond are rounded rather than ending in corners.

Additionally shown, the sidewalls of the reinforced thermoplastic bag 600 a middle section 604 comprising a first plurality of raised rib-like elements 606a in a macro pattern (e.g., a bulbous pattern) and a second plurality of raised rib-like elements 606b in a micro pattern (e.g., four diamonds). As shown, the second plurality of raised rib-like elements 606b in the micro pattern are nested within the macro patterns. Furthermore, the reinforced thermoplastic bag 600 includes web areas 608a, 608b.

Figure 7:
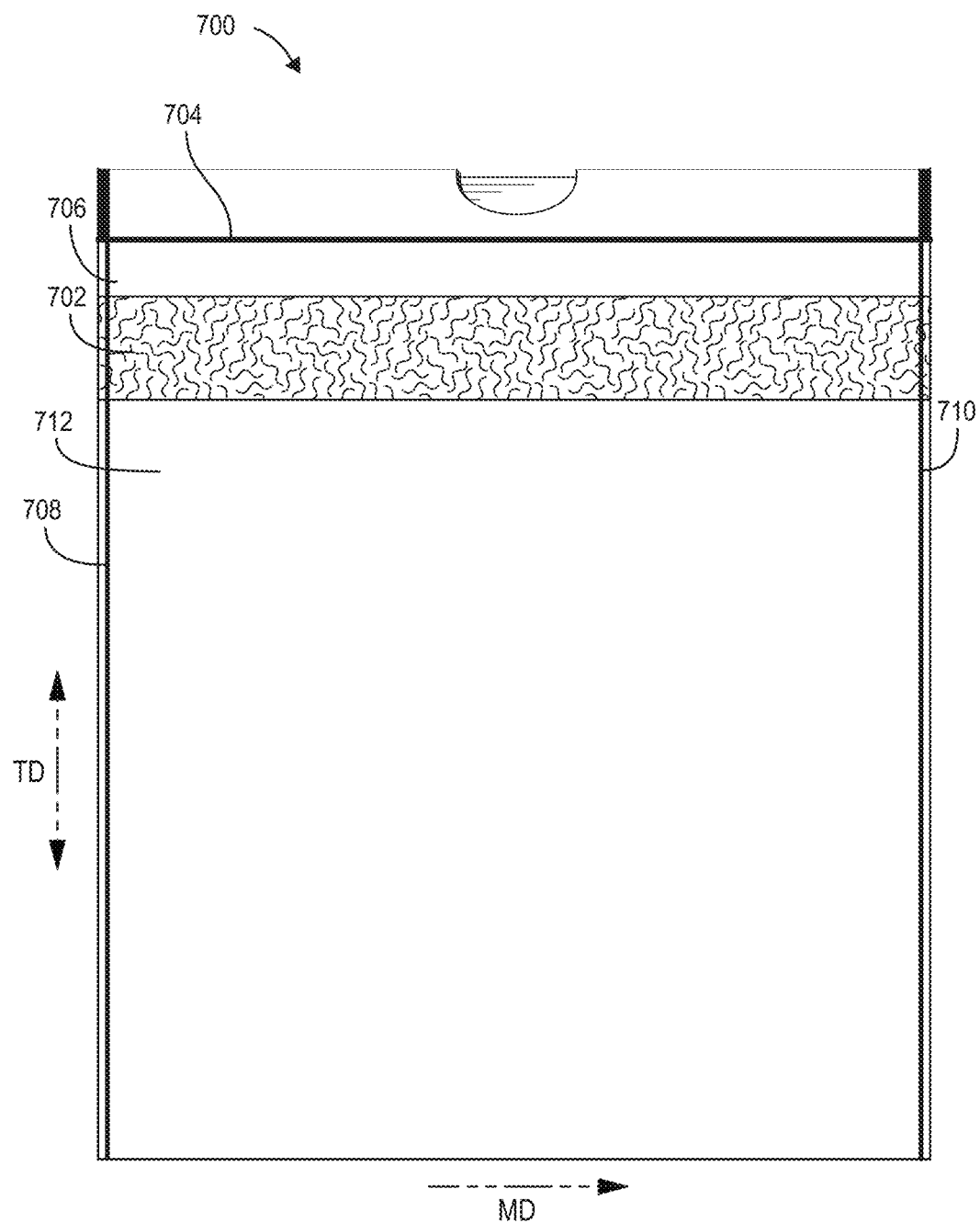
FIG. 7 illustrates yet another reinforced thermoplastic bag in accordance with one or more embodiments.

As mentioned above, reinforced thermoplastic bag can utilize stretch wrap or shrink wrap as the grab-zone reinforcement structure (e.g., to advantageously improve puncture toughness at a grab-zone). FIG. 7 illustrates a reinforced thermoplastic bag 700 implementing a wrap grab-zone reinforcement structure 702 in accordance with one or more embodiments. In particular, the wrap grab-zone reinforcement structure 702 as shown in FIG. 7 comprises a stretch-wrap material or shrink-wrap material. The wrap grab-zone reinforcement structure 702 forms a durable layer of protection across a grab-zone of the reinforced thermoplastic bag 700 (e.g., to protect against finger pokes when grasping, pulling, or lifting the reinforced thermoplastic bag 700). Moreover, as shown in FIG. 7, the wrap grab-zone reinforcement structure 702 is positioned below a hem seal 704 extending between side seals 708, 710 and between upper and lower portions 706, 712 that comprise areas devoid of bonding (as similarly described above).

However, the wrap grab-zone reinforcement structure 702 can be implemented in a variety of different ways due to the manufacturing flexibility afforded by utilizing a strip of shrink-wrap material or stretch-wrap material that is separate from webbing used to make the sidewalls. For example, the wrap grab-zone reinforcement structure 702 can be applied in conjunction with existing manufacturing assemblies (e.g., at or near final stages of manufacturing) to myriad positions across the reinforced thermoplastic bag 700, thereby spanning a configurable width or height of the grab-zone or other areas of the reinforced thermoplastic bag 700.

For instance, utilizing one or more attachment means (e.g., thermal, ultrasonic, cross-linking by irradiation, adhesives, extrusion coatings, ring-rolling, and/or combinations thereof), the wrap grab-zone reinforcement structure 702 can be attached to the reinforced thermoplastic bag 700 without use of the side seals 708, 710, the hem seal 704, etc. To illustrate, in one or more implementations, the wrap grab-zone reinforcement structure 702 is positioned between the side seals 708, 710, but does not extend a full distance therebetween. Additionally or alternatively, the wrap grab-zone reinforcement structure 702 can be positioned on top of any of the side seals 708, 710, the hem seal 704, etc. (e.g., when applying the wrap grab-zone reinforcement structure 702 to the reinforced thermoplastic bag 700 after such processes). In these or other embodiments, the wrap grab-zone reinforcement structure 702 (like the grab-zone reinforcement structures 130 and 306 described above) can be sandwiched between plies of the reinforced thermoplastic bag 700, located on an inside wall of the reinforced thermoplastic bag 700, or located on an outside wall of the reinforced thermoplastic bag 700.

In one or more embodiments, the wrap grab-zone reinforcement structure 702 comprising shrink wrap or stretch wrap allows the reinforced thermoplastic bag 700 to leverage material properties particular to this material. For instance, shrink-wrap film or stretch-wrap film of the wrap grab-zone reinforcement structure 702 can be processed by compression molding or by varying plastic extrusion processes such as blown film extrusion, coextrusion, sheet/film extrusion and combinations thereof. If the wrap film material is processed by blown film process, the blow-up ratio (BUR) for the wrap film can be lower, at par, or greater than the BUR of the bag film of similar or dissimilar material composition. Accordingly, the stretch wrap or shrink wrap of the wrap grab-zone reinforcement structure 702 can apply a variety of different material properties lending to strength, color (for improved visual-signaling of strength) and/or utilization of post-consumer reclaim (PCR) (e.g., to support sustainability initiatives).

Albeit not illustrated, in one or more embodiments, the wrap grab-zone reinforcement structure 702 can be implemented with one or more bonding patterns. For example, the wrap grab-zone reinforcement structure 702 can be implemented with a fenced diamond bonding pattern, a bulbous bonding pattern, etc. as described above in relation to the foregoing figures. In these or other embodiments, the wrap grab-zone reinforcement structure 702 can be applied as an overlay over such bonding patterns. Additionally or alternatively, the wrap grab-zone reinforcement structure 702 can be applied adjacent to such bonding portions. Further, in other embodiments, the wrap grab-zone reinforcement structure 702 can be applied in non-draw tape bags, in which case the wrap grab-zone reinforcement structure 702 can be extended up to a top portion proximate an opening of the reinforced thermoplastic bag.

As shown by FIG. 7, the wrap grab-zone reinforcement structure 702 can vary in appearance from the rest of the thermoplastic bag 700. For example, in implementations in which a form of heat is used to cause the wrap grab-zone reinforcement structure 702 to shrink and bond to the sidewall of the reinforced thermoplastic bag 700, the wrap grab-zone reinforcement structure 702 can have a non-uniform appearance compared to the rest of the reinforced thermoplastic bag 700. The non-uniform nature of the wrap grab-zone reinforcement structure 702 can also provide the wrap grab-zone reinforcement structure 702 with texture that is rougher and more varied than the rest of the sidewalls of the reinforced thermoplastic bag 700. The varied appearance and texture of the wrap grab-zone reinforcement structure 702 can signal strength to a user. Additionally, the texture of the wrap grab-zone reinforcement structure 702 can prevent a user's fingers from sliding or slipping when grabbing the grab-zone of the reinforced thermoplastic bag 700.

Still further, as alluded to above, in one or more implementations, the wrap grab-zone reinforcement structure 702 comprises a color differing from the color of the sidewalls of the reinforced thermoplastic bag 700. The differing color of the areas of the reinforced thermoplastic bag 700 including the wrap grab-zone reinforcement structure 702 can serve to visually indicate to a consumer that such areas of the reinforced thermoplastic bag 700 are provided additional strength. By visibly including color in the wrap grab-zone reinforcement structure 702 to show through one or more sidewall layers from outside and/or inside viewing perspectives, the reinforced thermoplastic bag 700 specifically addresses a current consumer perception of conventional thermoplastic liners that use less material being insufficiently strong.

One or more implementations of the present invention can also include methods of forming reinforced thermoplastic bags with grab-zone reinforcement structures. In accordance with one or more embodiments, a process 800 in FIG. 8 and the accompanying description describe one or more embodiments of such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Figure 8:
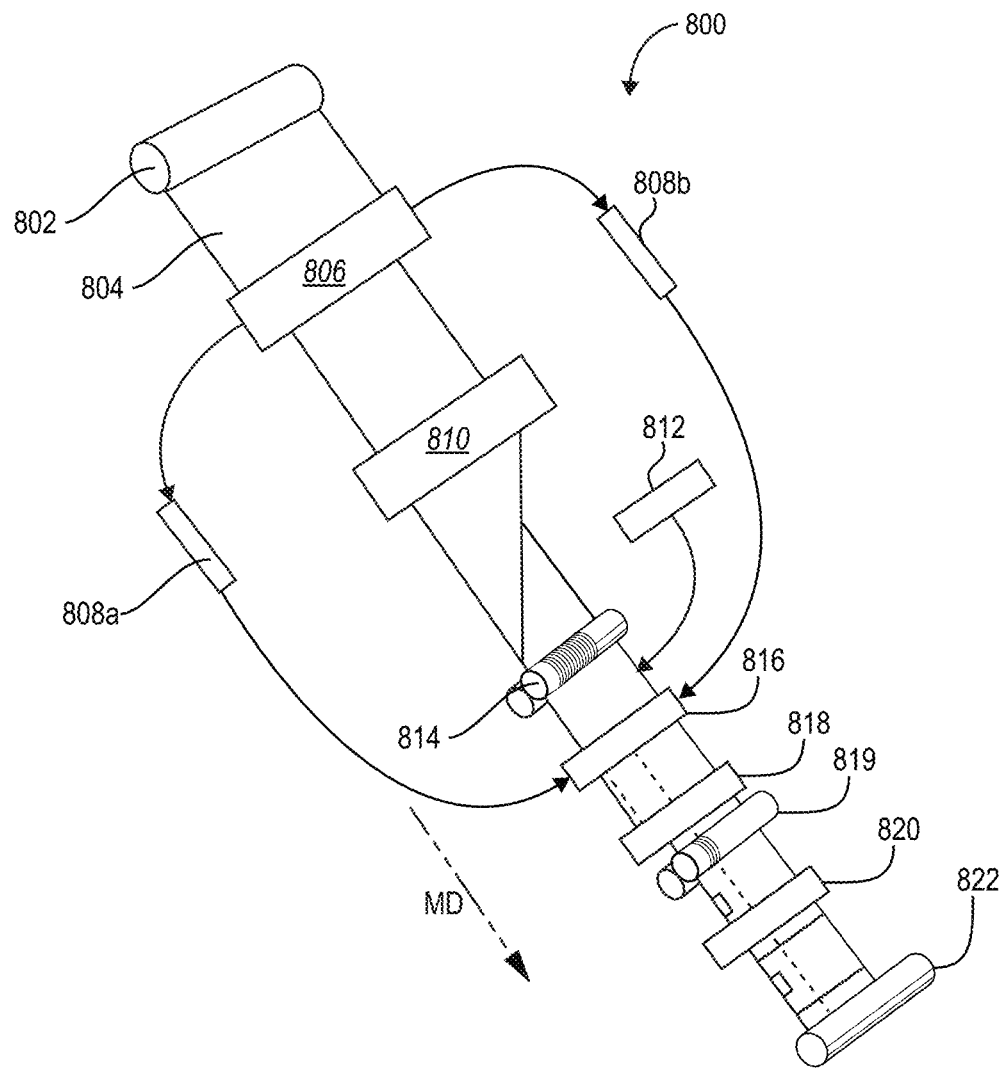
FIG. 8 illustrates an example manufacturing process for forming a reinforced thermoplastic bag in accordance with one or more embodiments.

As shown for the process 800 in FIG. 8, production may begin by unwinding a first continuous web or film 804 of a first thermoplastic material from a roll 802 and advancing the film 804 along a machine direction. The film 804 may have an initial width that is perpendicular to the machine direction. In other manufacturing environments, the film 804 may be provided in other forms or even extruded directly from a thermoplastic forming process.

FIG. 8 illustrates unwinding a single film, which results in a single layer reinformed thermoplastic bag, such as those shown and described in FIGS. 3C, 3D, 3G, 3H, 3M, and 3P. Alternative methods involve unwinding a second film and layering the second film on top of the first film 804 to film stack prior to folding operation 810, which results in a multi-layered or bag-in-bag reinforced thermoplastic bag such as those shown and described in FIG. 3A, 3B, 3E, 3F, 3I, 3J, 3K, 3L, 3N, 3O, or 3Q-3AA.

At operation 806, one or more reinforcing strips (in this case, reinforcing strips 808a, 808b) are cut for subsequent application to the reinforced thermoplastic bag as a grab-zone reinforcement structures. For example, at shown at operation 806, the reinforcing strips 808a, 808b are separated from the film 804 by a cutting action along the machine direction (e.g., from one or both edges of the film 804, thereby reducing the initial width of the film 804). Sourcing the reinforcing strips 808a, 808b from the film 804 can provide cost-savings. In particular, by sourcing the reinforcing strips 808a, 808b from the film 804 reduce the cost of the reinforcing strips to the material of construction. In particular, because the manufacturing cost of the film 804 is already associated the bag making process only cutting the reinforcing strips from the film 804 is needed. This is in contrast to outsourcing the reinforcing strip, which can require extrusion, slitting, winding, packaging, and shipping.

Subsequently, at the folding operation 810, the film 804 is folded in half to form a bottom fold and both sidewalls of a reinforced thermoplastic bag. In turn, the film 804 as folded can be fed into one or more rollers 814 for incrementally stretching at least a portion of the film 804 by one or more of MD ring rolling, TD ring rolling, SELFing, contact areas, or other methods. In one or more implementations, the rollers 814 are intermeshing rollers comprising a particular design to impart a bonding pattern (e.g., as described in relation to the foregoing figures). To facilitate such a bonding pattern, the rollers 814 may be forced or directed against each other by, for example, hydraulic actuators. The pressure at which the rollers 814 are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

At operation 816, the one or more reinforcing strips cut at operation 806 are inserted at a position on and/or between the layers of the sidewalls of the film 804 corresponding to a grab-zone (e.g., as described above in relation to the foregoing figures). Optionally, the reinforcing strips 808a, 808b are folded (e.g., to form the grab-zone reinforcement structures described above in relation to FIGS. 3A-3M. For example, the reinforcing strips 808a, 808b are positionally inserted so as to reinforce the grab-zone below a hem seal (and in some cases, reinforce a hem channel as well) as denoted, for instance, by the dashed lines. The reinforcing strips 808a, 808b are aligned at a predetermined distance from or at the top edge prior to hem-folding at operation 818. Additionally, by inserting the reinforcing strips 808a, 808b before hem folding and hem sealing at operation 818, the reinforcing strips 808a, 808b can be optionally secured to the respective sidewalls of the film 804 via a hem seal and side seals.

At operation 818, a hem fold is created by folding a top edge for each sidewall onto corresponding interior surfaces of the sidewalls, thereby encasing a draw tape inserted at operation 818. Accordingly, the width of the film 804 is further reduced as a result of the hem-folding. Moreover, as just mentioned, the reinforcing strips 808a, 808b in one or more implementations are integrated in the hem folding of operation 818. This integration allows the reinforcing strips 808a, 808b to provide reinforcement to the hem-channel, particularly where the reinforcing strips 808a, 808b are also folded over (e.g., on top of the draw tape and/or one or more sidewall layers). In these or other embodiments, the formed hem is secured in place at operation 818 by producing a hem seal that affixes the top edges of the respective sidewalls to the interior surfaces via heat bars. Additionally, as mentioned above, the reinforcing strips 808a, 808b can be secured at the hem seal (albeit in other embodiments positioned exclusively below the hem seal).

Alternatively, in certain embodiments, the reinforcing strips 808a, 808b are not integrated in the hem folding or hem sealing of operation 818. For example, in one or more embodiments after operation 818, rollers 819 conjoin the reinforcing strips 808a, 808b to the hem skirt such that the reinforcing strips 808a, 808b are positioned over the hem skirt (e.g., as shown in relation to FIG. 3T). In at least some embodiments, using the rollers 819 to conjoin the reinforcing strips 808a, 808b to the hem skirt provides increased TD strength to the reinforced thermoplastic bag and/or stronger hem seals. Additionally, in certain implementations, securing the hem skirt via the reinforcing strips 808a, 808b applied by the rollers 819 can hide mis-matched ply edges visible after the operation 818.

At operation 820, the side seals are created perpendicular to the machine direction in a same or similar manner as done for producing the hem seal). In particular, the side seals join together the sidewalls of the film 804. In one or more implementations, the side seals secure the reinforcing strips 808a, 808b to the film 804 in addition to, or alternatively to, the hem seal. Of course, in other embodiments, reinforcing strips 808a, 808b are not secured at the hem seal.

In some embodiments the reinforcing strips 808a, 808b are secured to the side walls by another means in addition or alterative to the hem and side seals. In particular, the reinforcing strips 808a, 808b can be secured by non-continuous bonds (SELFing bonds, ring rolling bonds, contact areas, embossing, etc.), chemical bonding, adhesive bonding, thermal bonding, or ultrasonic bonding.

Subsequently, the film 804 (now formed into discrete, reinforced thermoplastic bags) can be wound into a roll 822 for packaging and distribution. In these or other embodiments, the reinforced thermoplastic bags can be perforated for (e.g., via a perforating device) to facilitate easier separation of the reinforced thermoplastic bags. Additionally or alternatively, the reinforced thermoplastic bag can be completely separated by a cutting device and wound in an interleaved fashion into the roll 822 for packaging and distribution.

Between operations 820 and 822, the process 800 can involve forming break-away perforations as described above in relation to FIG. 1A. As mentioned above, the break-away perforations are advantageous because the forces required to stretch the bag in the machine direction (MD) will increase due to the presence of the reinforcing strip. To make stretching the bag hem easier during use, the 'break-away' feature reduces the MD load required to stretch the bag because a portion of the bag or reinforcing strip film easily tears when such a load is applied. The break-away feature can be a single notch, slit, or perforation in the bag hem or reinforcing strip film located preferentially away from the center of the bag and a distance from the side seals. The break-away feature can be a series of these notches, slits, or perforations.

Additionally or alternatively to the foregoing description, the process 800 in one or more implementations provides a non-woven strip for application as a grab-zone reinforcement structure. Accordingly, operation 806 may be omitted in one or more embodiments utilizing non-woven strips instead of a thermoplastic film from the film 804. Additionally, at operation 816, a reinforcement structure 812 of differing material from the film 804 (e.g., non-woven strips) can be inserted in a same or similar manner as described above.

Similarly, the process 800 in one or more implementations provides shrink-wrap strips or stretch-wrap strips for application as a grab-zone reinforcement structure instead of a thermoplastic film from the film 804. For example, the shrink-wrap strips or stretch-wrap strips inserted at operation 816. Alternatively, the shrink-wrap strips or stretch-wrap strips may be applied to a grab-zone of the reinforced thermoplastic bag after operation 820 or as part of one or more operations described above. As described above, the shrink-wrap strips or stretch-wrap strips can be applied to an outer surface of the bag, between inner and outer layers of the sidewalls, or to an inner surface of the bag. After applying the shrink-wrap strips or stretch-wrap strips to the bag, the shrink-wrap strips or stretch-wrap strips are attached to the bag via thermal, ultrasonic, cross-linked by irradiation, or adhesive. In any event, the shrink-wrap strips or stretch-wrap strips can be without having to retrofit existing manufacturing assemblies.

Modifications, additions, or omissions may be made to the embodiments illustrated and described in relation to the figures without departing from the scope of the present disclosure. For example, in one or more embodiments, the process 800 may be modified to ensure proper placement and position of the reinforcing strips 808a, 808b during high speed tracking and manipulation during aggressive operations. For instance, the reinforcing strips 808a, 808b may be inserted between plies so as to trap the reinforcing strips 808a, 808b in place prior to certain operations (e.g. hem folding). Similarly, in certain implementations, the process 800 includes laminating (or other means disclosed herein for attaching) the reinforcing strips 808a, 808b immediately after insertion if the reinforcing strips 808a, 808b are not trapped between plies. As another example modification to the process 800, additional or alternative thermoplastic films and/or grab-zone reinforcement structure layers are implemented in any suitable configuration, among other different embodiments than may be explicitly illustrated or described.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A reinforced thermoplastic bag comprising:
    a first sidewall of a thermoplastic material comprising a first side edge, an opposing second side edge, and a first hem channel housing a draw tape;
    a second sidewall of the thermoplastic material comprising a first side edge, an opposing second side edge, and a second hem channel housing a draw tape;
    a top opening formed by the first and second sidewalls, wherein:
    the second sidewall is connected to the first sidewall at a bottom fold,
    the first and second sidewalls each comprise a grab-zone extending from the first side edge to the opposing second side edge and from proximate the top opening a first distance toward the bottom fold; and
    a grab-zone reinforcement structure secured to the first sidewall and positioned across the grab-zone of the first sidewall, wherein the grab-zone reinforcement structure comprises a first reinforcement layer, a second reinforcement layer, and a fold connecting the first reinforcement layer and the second reinforcement layer, wherein the fold is positioned below the draw tape such that the grab-zone of the first sidewall between the first hem channel and the bottom fold is covered by a portion of the first reinforcement layer and a portion of the second reinforcement layer folded over the portion of the first reinforcement layer.

2. The reinforced thermoplastic bag of claim 1, further comprising:
a first hem seal; and
the first hem channel comprising a fold-over of a top edge of the first sidewall into the top opening of the first sidewall, the fold-over being secured to an inner surface of the first sidewall by the first hem seal.

3. The reinforced thermoplastic bag of claim 2, wherein the grab-zone reinforcement structure is secured to the reinforced thermoplastic bag by one or more of the first hem seal or side seal.

4. The reinforced thermoplastic bag of claim 2, wherein the grab-zone reinforcement structure extends around the first hem channel and is secured to the reinforced thermoplastic bag by the first hem seal at a first attachment point and a second attachment point.

5. The reinforced thermoplastic bag of claim 4, wherein an end portion of the second layer of the grab-zone reinforcement structure is secured to the reinforced thermoplastic bag by the first hem seal.

6. The reinforced thermoplastic bag of claim 2, wherein the grab-zone reinforcement structure is positioned within the reinforced thermoplastic bag and extends across the inner surface of the first sidewall.

7. The reinforced thermoplastic bag of claim 2, wherein the grab-zone reinforcement structure is positioned between first and second layers of the first sidewall.

8. The reinforced thermoplastic bag of claim 2, wherein the grab-zone reinforcement structure is positioned outside of the reinforced thermoplastic bag and extends across an outer surface of the first sidewall.

9. The reinforced thermoplastic bag of claim 2, wherein the grab-zone reinforcement structure comprises a hem channel reinforcement portion that:
extends around the first hem channel of the first sidewall;
is secured to the reinforced thermoplastic bag by the first hem seal; and
is either positioned inside the first hem channel or across one or more layers of the first sidewall.

10. The reinforced thermoplastic bag of claim 9, wherein the hem channel reinforcement portion of the grab-zone reinforcement structure comprises a break-away feature configured to allow the hem channel reinforcement portion to separate from the grab-zone reinforcement structure when a load is applied to stretch the top opening of the reinforced thermoplastic bag.

11. The reinforced thermoplastic bag of claim 1, wherein the grab-zone reinforcement structure is secured to the reinforced thermoplastic bag exclusively via a bonding mechanism other than heat seals.

12. A multi-layer thermoplastic bag comprising:
an outer first thermoplastic bag comprising first and second opposing sidewalls joined together along a first side edge, an opposite second side edge, an open first top edge, and a closed first bottom edge;
an inner second thermoplastic bag positioned within the outer first thermoplastic bag, the inner second thermoplastic bag comprising third and fourth opposing sidewalls joined together along a third side edge, an opposite fourth side edge, an open second top edge, and a closed second bottom edge, wherein:
a hem seal secures a fold-over of the open first top edge and the open second top edge forming a hem channel, wherein a draw tape is positioned within the hem channel;
the outer first thermoplastic bag and the inner second thermoplastic bag each comprise a grab-zone extending from the first and third side edges to the opposite second and fourth side edges and from the hem seal a first distance toward the first and second closed bottom edges; and
a grab-zone reinforcement structure secured to at least one of the outer first thermoplastic bag or the inner second thermoplastic bag and positioned across the grab-zone of one or both of the outer first thermoplastic bag or the inner second thermoplastic bag, wherein:
the grab-zone reinforcement structure comprises a first reinforcement layer and a second reinforcement layer, and the first reinforcement layer and the second reinforcement layer are formed by a fold connecting the first reinforcement layer and the second reinforcement layer, wherein the fold is positioned below the hem channel such that the grab-zone between the first and second bottom edges and the hem channel is covered by a portion of the first reinforcement layer and a portion of the second reinforcement layer folded over the portion of the first reinforcement layer, wherein the portion of the second reinforcement layer extends, from the fold positioned between the first and second bottom edges and the hem channel over the first reinforcement layer, towards the hem seal.

13. The multi-layer thermoplastic bag of claim 12, wherein the outer first thermoplastic bag comprises a first extended hem skirt extending from the hem seal into the grab-zone within an interior of the multi-layer thermoplastic bag.

14. The multi-layer thermoplastic bag of claim 13, wherein the inner second thermoplastic bag comprises a second extended hem skirt extending from the hem seal into the grab-zone within an interior of the multi-layer thermoplastic bag.

15. The multi-layer thermoplastic bag of claim 14, wherein an end portion of the second layer of the grab-zone reinforcement structure is secured, via the hem seal, to at least one of the outer first thermoplastic bag, the inner second thermoplastic bag, or a body portion of the grab-zone reinforcement structure.

16. The multi-layer thermoplastic bag of claim 12, wherein the grab-zone reinforcement structure is positioned either:
within the multi-layer thermoplastic bag and extends across an inside surface of the inner second thermoplastic bag;
between the outer first thermoplastic bag and the inner second thermoplastic bag; or
outside of the multi-layer thermoplastic bag and extends across an outside surface of the outer first thermoplastic bag.

17. The multi-layer thermoplastic bag of claim 12, wherein the grab-zone reinforcement structure comprises a non-woven material.

18. The multi-layer thermoplastic bag of claim 12, wherein the grab-zone reinforcement structure comprises a hem channel reinforcement portion that:
extends around the hem channel from a first hem seal portion to a second hem seal portion;

is secured to the multi-layer thermoplastic bag by the hem seal at the first hem seal portion and the second hem seal portion; and is either positioned inside the hem channel or across one of the outer first thermoplastic bag or the inner second thermoplastic bag.

19. The multi-layer thermoplastic bag of claim 18, wherein an end portion of the second layer of the grab-zone reinforcement structure is secured to the multi-layer thermoplastic bag by the hem seal.

20. The multi-layer thermoplastic bag of claim 18, wherein an end portion of the second layer of the grab-zone reinforcement structure is secured by the hem seal to at least one of the first hem seal portion or the second hem seal portion.

* * * * *